United States Patent
Vits et al.

(10) Patent No.: US 7,029,067 B2
(45) Date of Patent: Apr. 18, 2006

(54) VEHICLE SEAT INCLUDING AN INTEGRATED CHILD SEAT

(75) Inventors: Charles G. Vits, Carmel, IN (US); Christopher W. Foye, Indianapolis, IN (US); Larry E. Gray, Brownsburg, IN (US); Donald C. Boyle, Indianapolis, IN (US); John David Scelsi, Westfield, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 11/121,335

(22) Filed: May 3, 2005

(65) Prior Publication Data

US 2005/0269861 A1   Dec. 8, 2005

Related U.S. Application Data

(60) Division of application No. 10/245,983, filed on Sep. 17, 2002, now Pat. No. 6,886,889, which is a continuation-in-part of application No. 09/734,361, filed on Dec. 11, 2000, now Pat. No. 6,485,098, which is a continuation of application No. 09/479,197, filed on Jan. 7, 2000, now abandoned, which is a continuation-in-part of application No. 09/183,088, filed on Oct. 30, 1998, now Pat. No. 6,123,388.

(51) Int. Cl.
   *B60N 2/26* (2006.01)

(52) U.S. Cl. ............... 297/238; 297/484; 297/216.13; 297/216.12

(58) Field of Classification Search ............ 297/238, 297/250.1, 216.1, 216.13, 484
See application file for complete search history.

(56) References Cited

U.S. PATENT DOCUMENTS

| | | |
|---|---|---|
| 3,873,155 A | 3/1975 | Barecki |
| 4,540,216 A | 9/1985 | Hassel, Sr. |
| 4,609,205 A | 9/1986 | McKeever |
| 4,648,625 A | 3/1987 | Lynch |
| 4,690,455 A | 9/1987 | Bailey et al. |
| 4,756,573 A | 7/1988 | Simin et al. |
| 4,784,352 A | 11/1988 | Smith et al. |
| 4,840,404 A | 6/1989 | Falterman |
| 4,919,488 A | 4/1990 | Deegener et al. |
| 4,938,535 A | 7/1990 | Condon et al. |
| 4,943,112 A | 7/1990 | Law |
| 5,015,010 A | 5/1991 | Homeier et al. |
| 5,135,257 A | 8/1992 | Short |
| 5,186,520 A | 2/1993 | Whitaker et al. |
| 5,246,271 A | 9/1993 | Boisset |
| 5,383,708 A | 1/1995 | Nagasaka et al. |
| 5,385,384 A * | 1/1995 | Gierman et al. ............ 297/238 |
| 5,398,997 A | 3/1995 | McFalls |
| 5,464,273 A | 11/1995 | Makoto |
| 5,468,044 A | 11/1995 | Coman |
| 5,472,236 A | 12/1995 | Gray |

(Continued)

FOREIGN PATENT DOCUMENTS

DE       23 57 307       5/1975

(Continued)

*Primary Examiner*—Anthony D. Barfield
(74) *Attorney, Agent, or Firm*—Barner & Thornburg LLP

(57) ABSTRACT

A passenger vehicle seat and restraint system comprising a frame mountable to a vehicle and a restraint member and a seat member coupled to the frame to form a seat for supporting an occupant. The vehicle seat may further comprise a seat back frame movably attached to the frame and a restraint harness affixed to the frame and the seat back frame for securing the occupant thereto.

52 Claims, 42 Drawing Sheets

U.S. PATENT DOCUMENTS

| | | |
|---|---|---|
| 5,487,588 A | 1/1996 | Burleigh et al. |
| 5,511,854 A | 4/1996 | Cordia |
| 5,575,533 A | 11/1996 | Glance |
| 5,603,550 A * | 2/1997 | Holdampf et al. .......... 297/238 |
| 5,641,198 A | 6/1997 | Steffens, Jr. |
| 5,645,316 A | 7/1997 | Aufrere et al. |
| 5,695,243 A | 12/1997 | Anthony et al. |
| 5,716,097 A * | 2/1998 | Peck et al. ................. 297/238 |
| 5,746,476 A | 5/1998 | Novak et al. |
| 5,782,537 A | 7/1998 | Leistra et al. |
| 5,797,654 A | 8/1998 | Stroud |
| 5,823,627 A | 10/1998 | Viano et al. |
| 5,882,072 A | 3/1999 | Morlock |
| 5,915,789 A | 6/1999 | Ponce De Leon, III |
| 5,979,982 A | 11/1999 | Nakagawa |
| 6,017,087 A | 1/2000 | Anthony et al. |
| 6,027,171 A | 2/2000 | Partington et al. |
| 6,050,637 A | 4/2000 | H.ang.land et al. |
| 6,089,662 A * | 7/2000 | Lambert et al. ............ 297/238 |
| 6,491,346 B1 | 12/2002 | Gupta et al. |

FOREIGN PATENT DOCUMENTS

| | | |
|---|---|---|
| DE | 3422 695 A1 | 12/1985 |
| EP | 0 619 202 A1 | 10/1994 |
| EP | 0 747 258 A1 | 12/1996 |
| GB | 1173891 | 12/1969 |
| GB | 2 023 415 A | 1/1980 |
| GB | 2 143 727 A | 2/1985 |
| JP | 06286509 A * | 10/1994 |

* cited by examiner

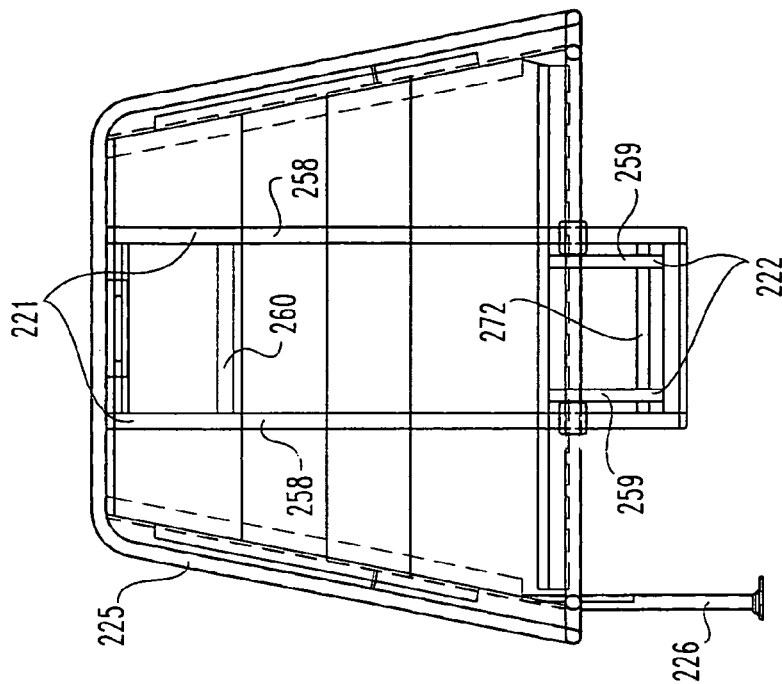
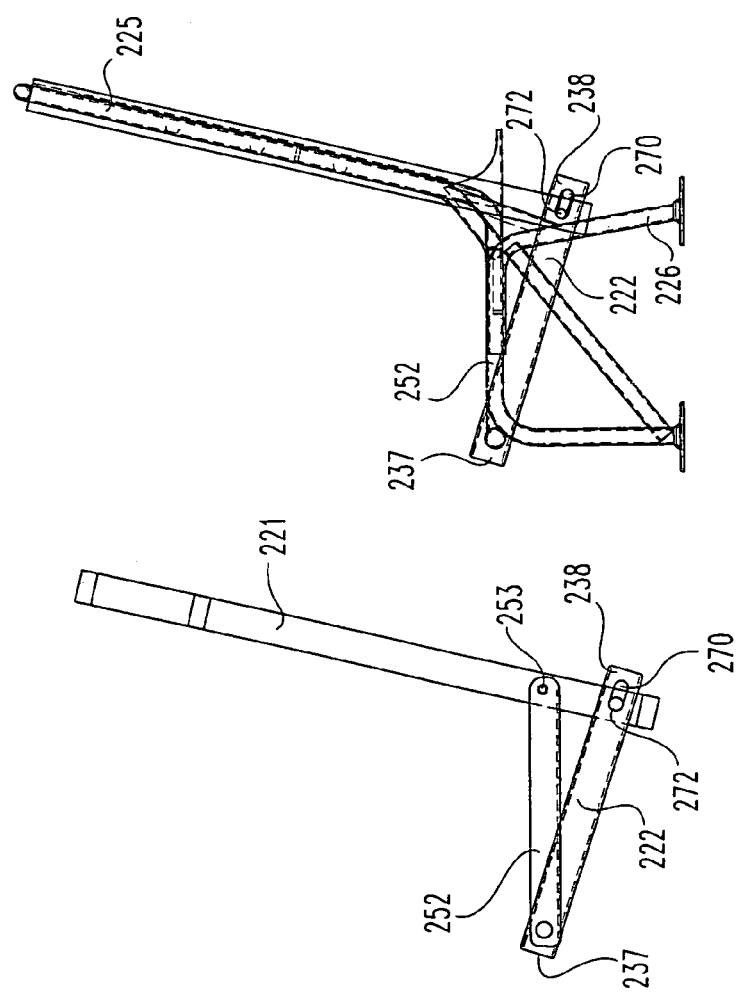
*Fig. 5c*
*Fig. 5b*
*Fig. 5a*

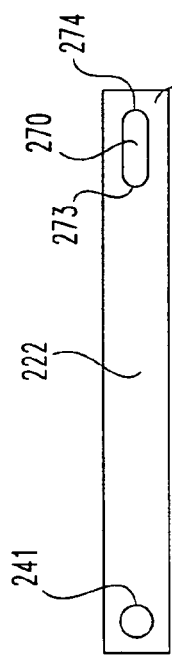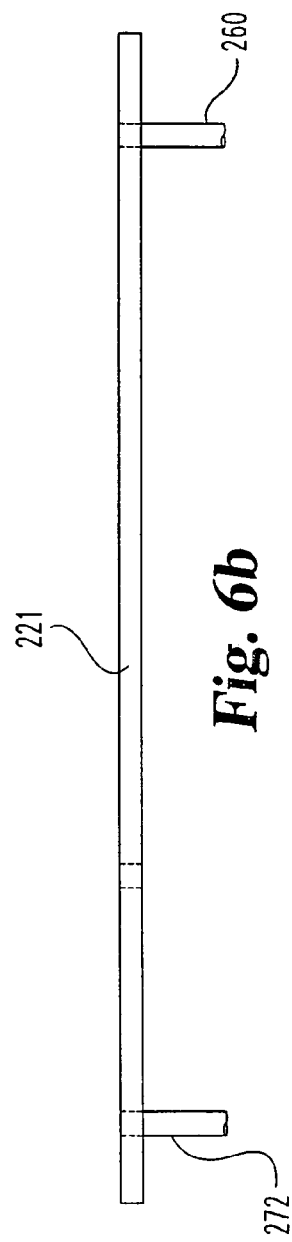
*Fig. 6a*
*Fig. 6b*
*Fig. 6c*

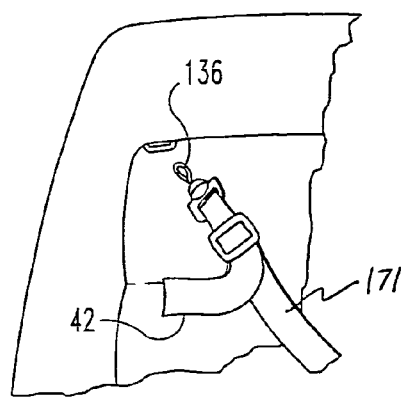
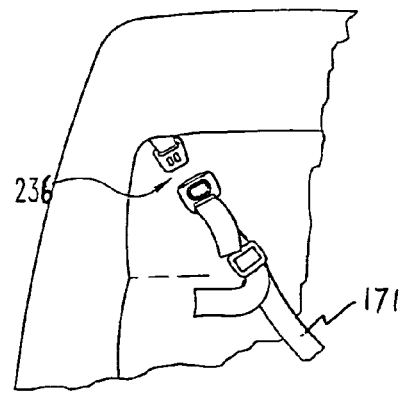
Fig.34    Fig.35
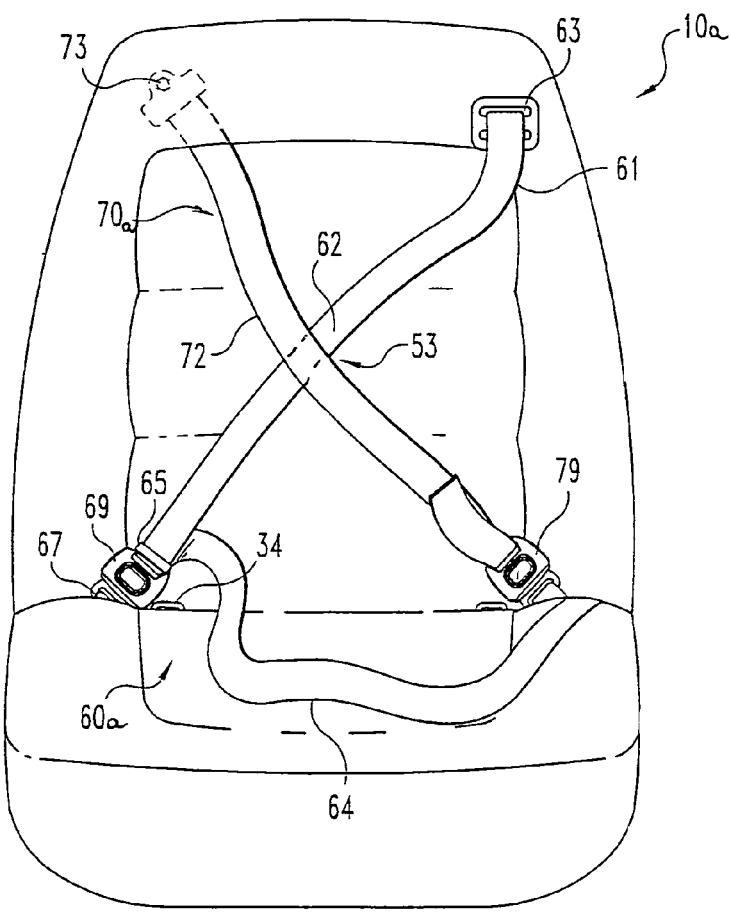
Fig.36

US 7,029,067 B2

VEHICLE SEAT INCLUDING AN INTEGRATED CHILD SEAT

CROSS-REFERENCE TO RELATED APPLICATIONS

This is a divisional of U.S. application Ser. No. 10/245,983, filed Sep. 17, 2002 now U.S. Pat. No. 6,886,889, which is a continuation-in-part of U.S. application Ser. No. 09/734,361, filed Dec. 11, 2000, now U.S. Pat. No. 6,485,098, which is a continuation of U.S. patent application Ser. No. 09/479,197, filed Jan. 7, 2000, now abandoned, which in turn is a continuation-in-part of U.S. application Ser. No. 09/183,088, filed Oct. 30, 1998, now U.S. Pat. No. 6,123,388, all of which are hereby incorporated herein by reference.

FIELD OF THE INVENTION

The present invention is in the field of passenger restraint systems used to provide a protective passenger environment

DESCRIPTION OF THE PRIOR ART

Conventional seat belt systems combining a lap belt and an upper torso belt are well known. These three-point restraint systems are usually used with seats offering rigid support for the belts. As typically used in a vehicle, the three-point restraint system consists of single belt having its opposite ends mounted to a pair of retractors with a seat belt tongue connected to the belt intermediate to the belt ends. The tongue may be swung across the person and engaged with a buckle affixed to the seat thereby positioning one portion of the belt across the lap and another portion of the belt across the upper torso. In some systems, only one end of the belt is mounted to a retractor while the other end is anchored to the seat or vehicle. Seat belts are active restraint devices, requiring a passenger to actively engage the restraints for them to be effective.

School bus passenger seats usually do not employ active restraint safety devices, but instead rely on a passive restraint seat design. School bus passenger seats are built to specifications conforming to the safety standards set by the National Highway Traffic Safety Administration, DOT. These are codified as 49 C.F.R. Ch.V, .sctn. 571.222, Standard No. 222, and require that the seat back bend or deflect forward when a force is applied to the rear of the seat back. The code further specifies that 4000 W inch-pounds of energy must be absorbed within a maximum forward deflection of the seat back of 14 inches and 2800 W inch-pounds be absorbed within a maximum rearward deflection of the seat back of 10 inches where W represents the number of seating positions for which the seat is designed. 49 C.F.R., Ch.V, .sctn. 571.222, S5.1.3–5.1.4. The code specifies a passive restraint system, and does not require any sort of active restraints, such as a two-point passenger restraining lap belt or a three-point passenger restraining lap belt and torso harness combination. Children riding the school bus are protected in head-on collisions by the seat back in front of them deflecting forward and absorbing some of their forward momentum.

Vehicles with deforming or deflecting seats provide special problems regarding the integration of active restraint seat belt systems. Passive restraint systems are designed to protect a passenger who has been thrown forward by having the impacted seat back deflect upon impact of the thrown passenger and absorb some of their momentum. In a school bus seat combining active and passive restraint systems, both of the restraint systems have to be able to perform their functions and the seat must still conform to the regulations set forth in 49 C.F.R.

In U.S. Pat. No. 5,746,476, there is disclosed an automotive seat having a tower frame associated with the harness to transmit impact loads to the floor. Despite the prior devices, there is still a need for increased protection for children riding the school bus in an emergency or crash situation. The addition of an active restraint system, such as a three-point lap belt and torso harness combination, would provide enhanced passenger protection in a head-on crash as well as providing passenger protection in a broadside collision and/or roll situation. Disclosed herein is a three-point lap belt and torso harness passenger restraint system that is compatible with the pivoting and deflecting seats required by 49 C.F.R.

Conventional seat belt systems combining a lap belt and an upper torso belt are well known. These three-point restraint systems are usually used with seats offering rigid support for the belts. As typically used in a vehicle, the three-point restraint system consists of single belt having its opposite ends mounted to a pair of retractors with a seat belt tongue connected to the belt intermediate to the belt ends. The tongue may be swung across the person and engaged with a buckle affixed to the seat thereby positioning one portion of the belt across the lap and another portion of the belt across the upper torso.

Three-point seat belt systems installed in vehicles by the original manufacturer may be ineffective or unsafe when used by, for example, infants, children, or those with physical handicaps. Various types of add-on child restraint systems and harness positioning restraint systems have been fashioned for use by these users. For example, portable child seats for infants and children up to about 50 pounds and booster seats for children between 30 and 60 pounds, mount to a vehicle for restraint of a child. Examples of booster seats are disclosed in U.S. Pat. No. 5,797,654 to Stroud, U.S. Pat. No. 5,829,834 to Silverman, and U.S. Pat. No. 5,685,604 to Kain, which are incorporated by reference herein The federal government has mandated that child restraint anchorage systems be installed in most vehicles, including cars, trucks, and certain school buses. These regulations, codified at 49 C.F.R. § 571.225 (Federal Motor Vehicle Safety Standards 225 or FMVSS 225), incorporated herein by reference, require two lower anchorages and an upper tether anchorage of specified configuration, location and strength parameters. Similarly, 49 C.F.R. § 571.213 (FMVSS 213), incorporated herein by reference, specifies the dimensions of tether hooks used to attach a tether strap to a tether anchorage. Disclosed herein are supplemental restraint systems configured to mount to vehicles in accordance with 49 C.F.R. §§ 571.225 and 571.213. These supplemental restraint systems may also be compatible with the aforementioned 49 C.F.R. Ch.V, § 571.222, Standard No. 222 (FMVSS 222), which is incorporated herein by reference, and which is applicable to school bus seats.

SUMMARY OF THE INVENTION

In one embodiment of this invention a modular vehicle seat comprises a frame defining a seat support surface, the frame configured for mounting to a frame support structure of a vehicle. The modular vehicle seat further comprises first and second posts extending away from the seat support surface of the frame and adjacent opposite ends of the frame. A seat member is mounted to the seat support surface. A panel defining first and second channels adjacent opposite edges of the panel defines a seat back with the first and second posts received within the first and second channels respectively.

In another embodiment, a modular vehicle seat comprises a frame defining a seat support surface, the frame configured for mounting to a frame support structure of a vehicle. The modular vehicle seat further comprises first and second posts extending away from the seat support surface of the frame and adjacent opposite ends of the frame. A seat member is mounted to the seat support surface. A panel is mounted to the first and second posts and defines a seat back. The panel has a front surface adjacent the seat member. The modular vehicle seat further comprises a seat back frame member movably attached to the frame adjacent opposite ends of the frame. The front surface of the panel is configured to receive the seat back frame member therein. The seat back frame member is movable away from the panel toward the seat member upon a vehicle impact with sufficient severity.

In another embodiment a modular vehicle seat comprises a frame defining a seat support surface, the frame configured for mounting to a frame support structure of a vehicle. The modular vehicle seat further comprises first and second posts extending away from the seat support surface of the frame and adjacent opposite ends of the frame. A seat member is mounted to the seat support surface. A panel is mounted to the first and second posts and defines a seat back. The panel has a front surface adjacent the seat member. The modular vehicle seat further comprises a seat back frame member movably attached to the frame adjacent opposite ends of the frame. A seat base is movably mounted to the seat back frame adjacent the seat member and is movable downwardly toward the seat member to form a child seat. The front surface of the panel is configured to receive the seat back frame member and the seat base therein. The seat back frame member and the seat base are movable away from the front surface of the panel toward the seat member upon a vehicle impact with sufficient severity.

Additional features will become apparent to those skilled in the art upon consideration of the following detailed description of illustrative embodiments and features exemplifying the best mode of carrying out the invention as presently perceived and various combinations thereof.

BRIEF DESCRIPTION OF THE DRAWINGS

FIG. 3b is an enlarged side fragmentary elevation view of the slot in the tower member of FIG. 3a.

FIG. 5a is a side elevation view of the embodiment of FIG. 4a.

FIG. 5b is a side elevation view of the embodiment of FIG. 4b.

FIG. 5c is a partial front elevation view of the embodiment of FIG. 4b.

FIG. 6a is a side elevation view of the connecting member of the embodiment of FIG. 4a.

FIG. 6b is a front elevation view of one vertical piece of the tower member of FIG. 4a.

FIG. 6c is a side elevation view of one vertical piece of the tower member of FIG. 4a.

FIG. 7 an enlarged perspective view of the crossbar member of the second embodiment of FIG. 4a.

FIG. 34 is a partial front view of an alternative connector for use with any of the embodiments depicted in FIGS. 29–31 and 36–44.

FIG. 35 is a partial front view of another alternative connector for use with any of the embodiments depicted in FIGS. 29, 31, 33 and 36–44.

FIG. 36 is a front view of a seat having one illustrative embodiment of a supplemental restraint incorporating the present invention mounted thereto.

DESCRIPTION OF THE ILLUSTRATIVE EMBODIMENTS

Figure 1A:
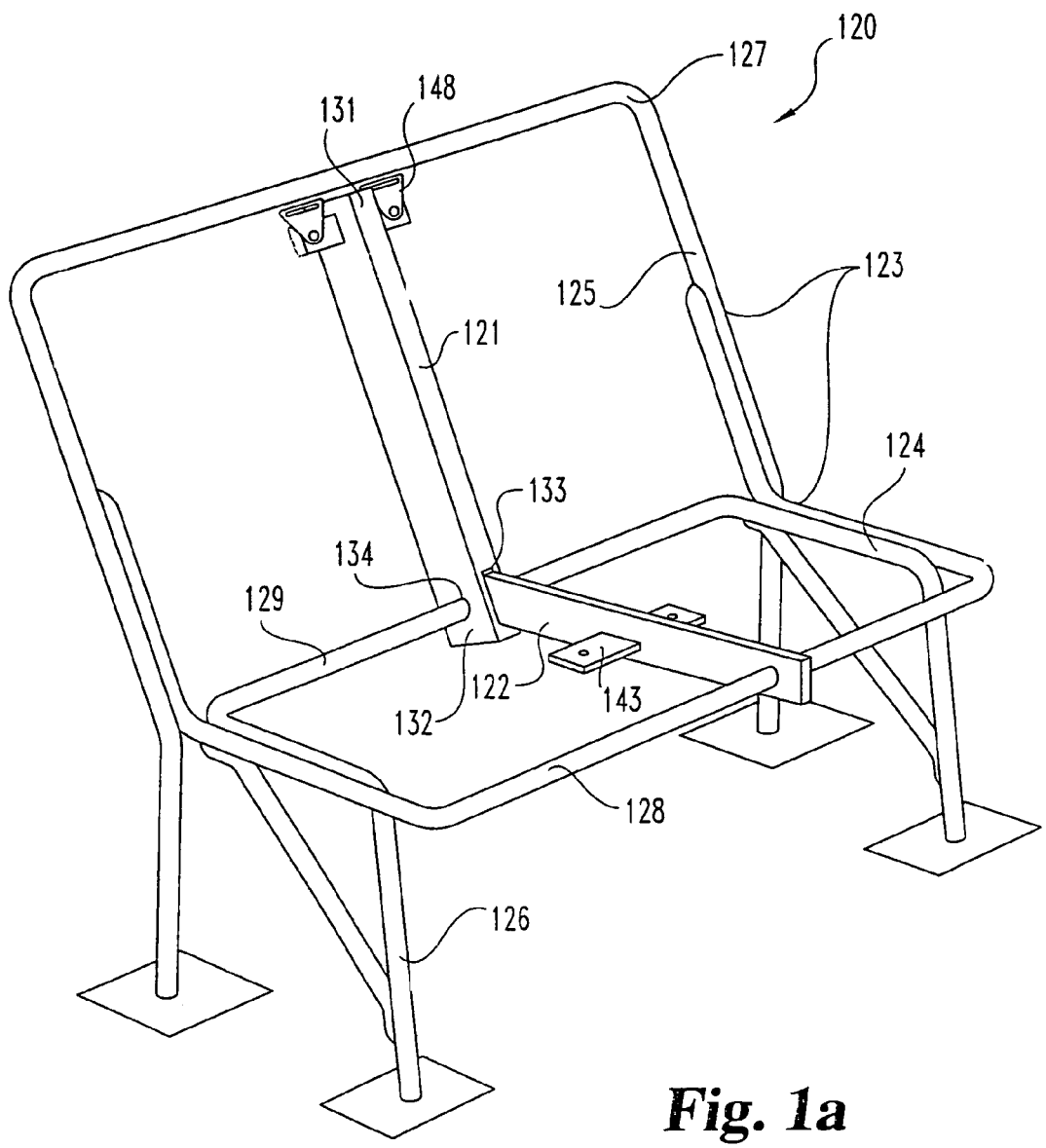
FIG. 1a is a perspective view of a bench seat frame incorporating a first embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1B:
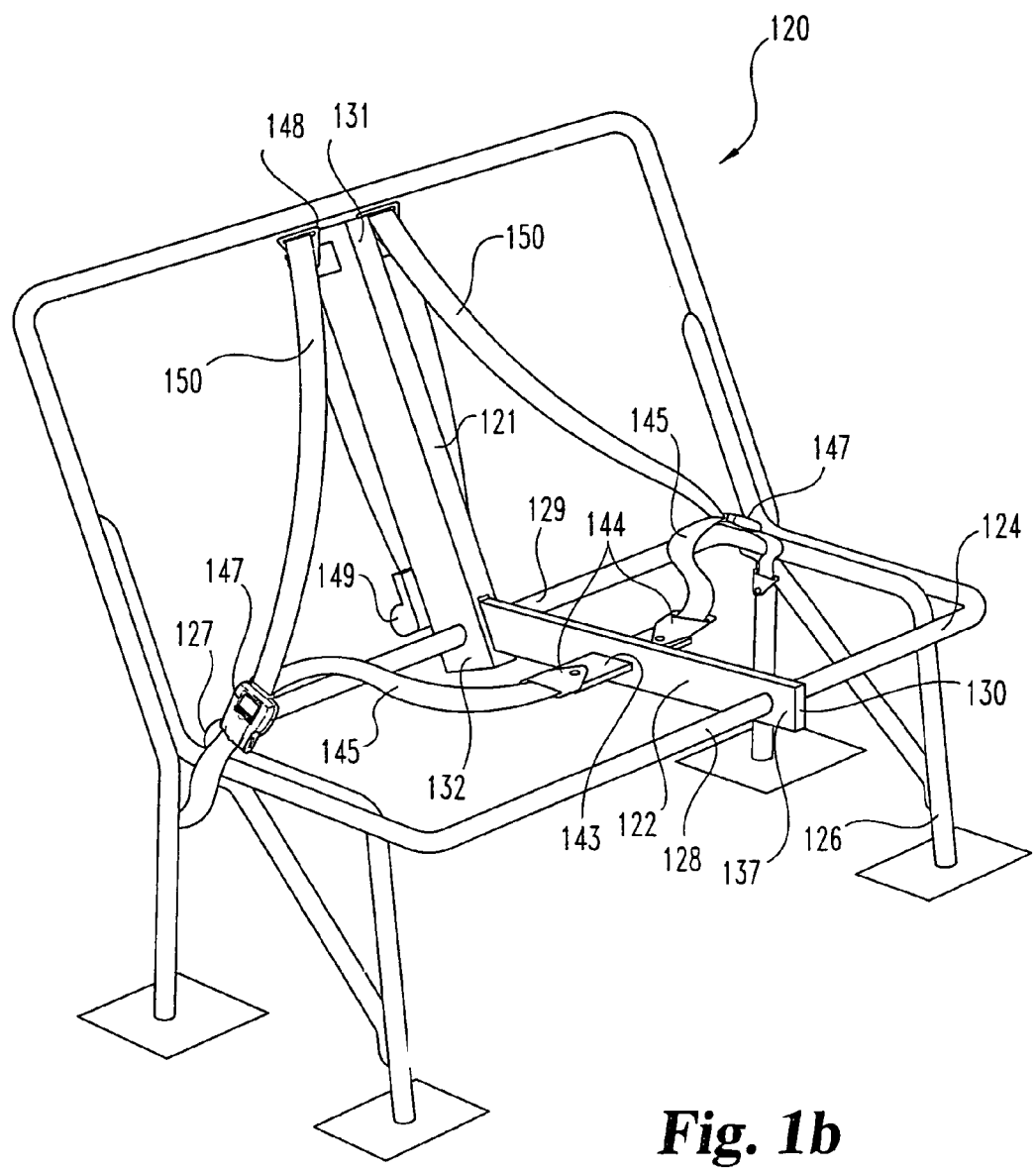
FIG. 1b is the same view as FIG. 1a with the addition of an attached seat belt assembly.
Figures 2A, 2B:
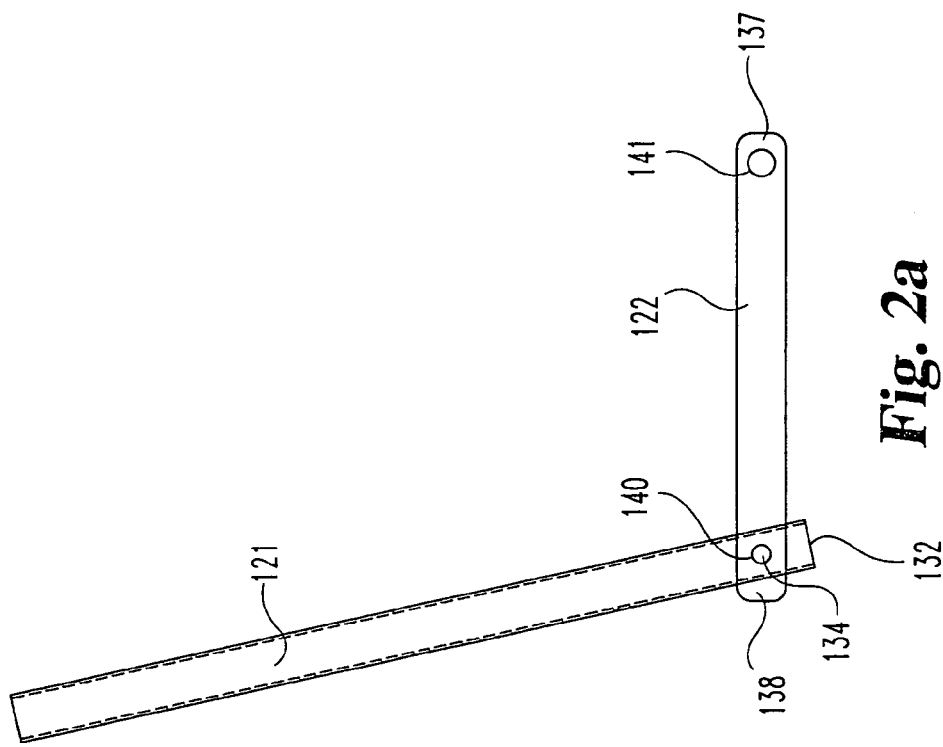
FIG. 2a is a partial side elevation view of the embodiment of FIG. 1.
FIG. 2b is a front elevation view of the tower member of the embodiment of FIG. 1.
Figure 2C:
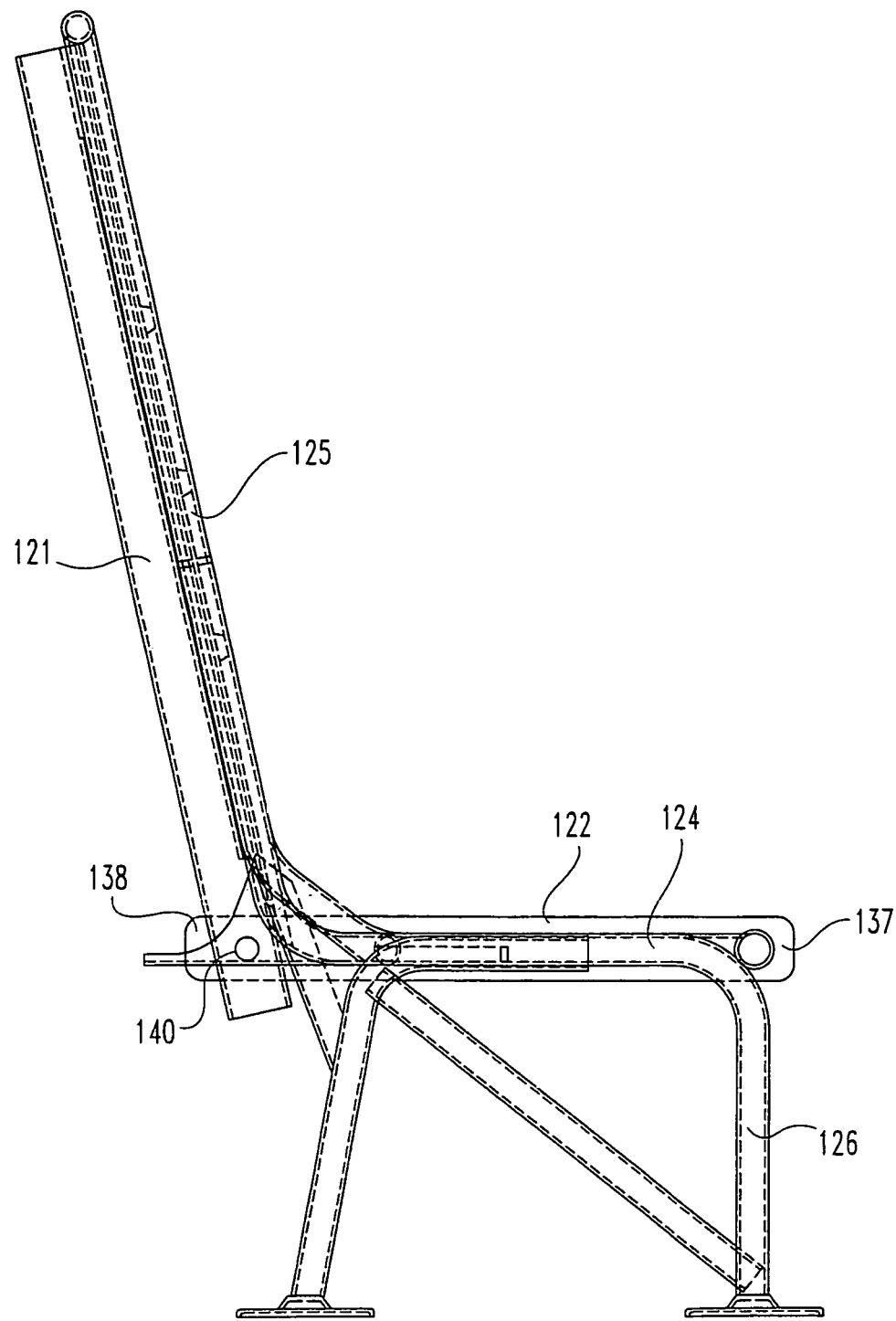
FIG. 2c is a side elevation view of the embodiment of FIG. 1 coupled to a bench seat frame.
Figure 2D:
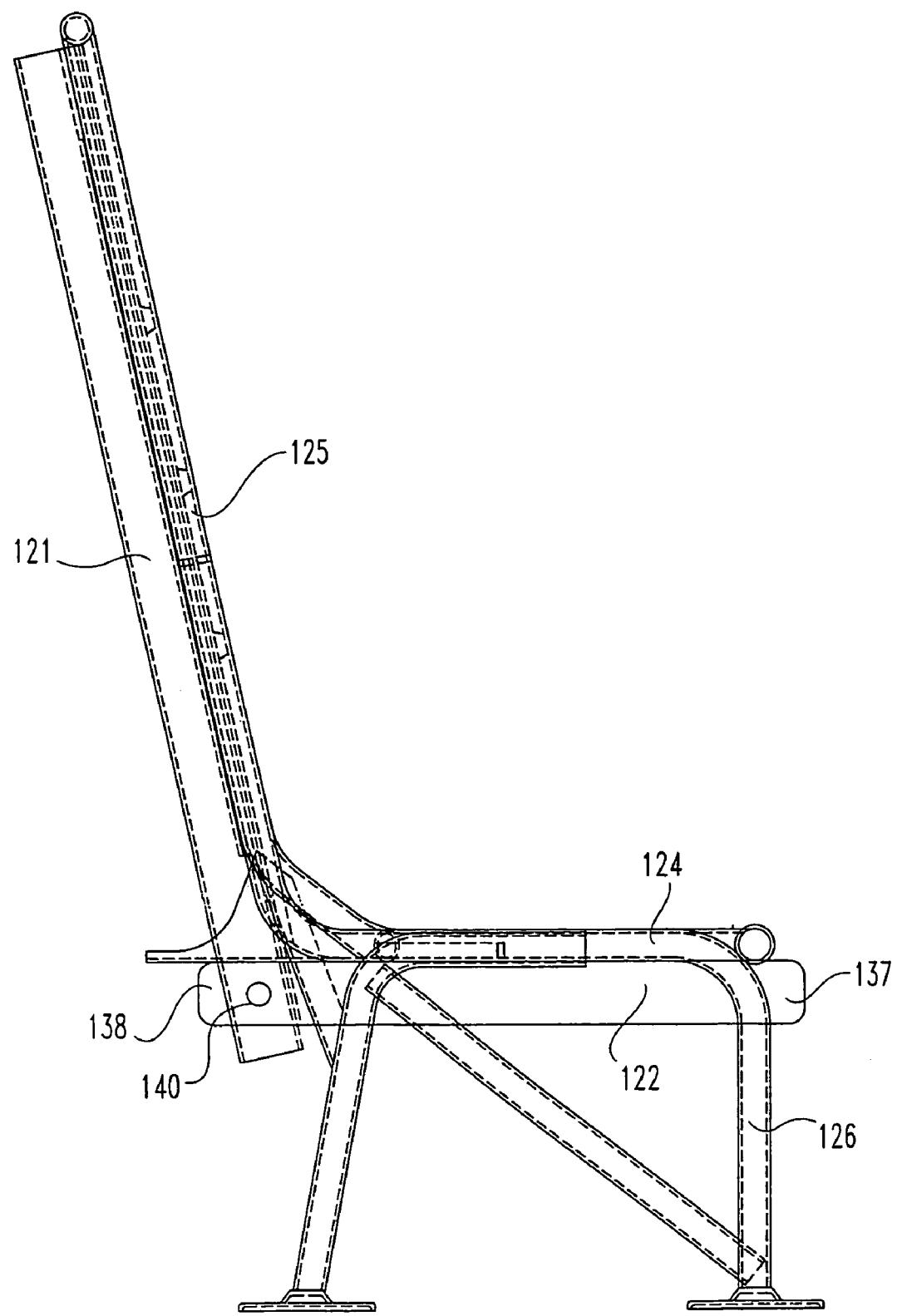
FIG. 2d is a side elevation view of the embodiment of FIG. 1 mounted below a bench seat frame.
Figure 3C:
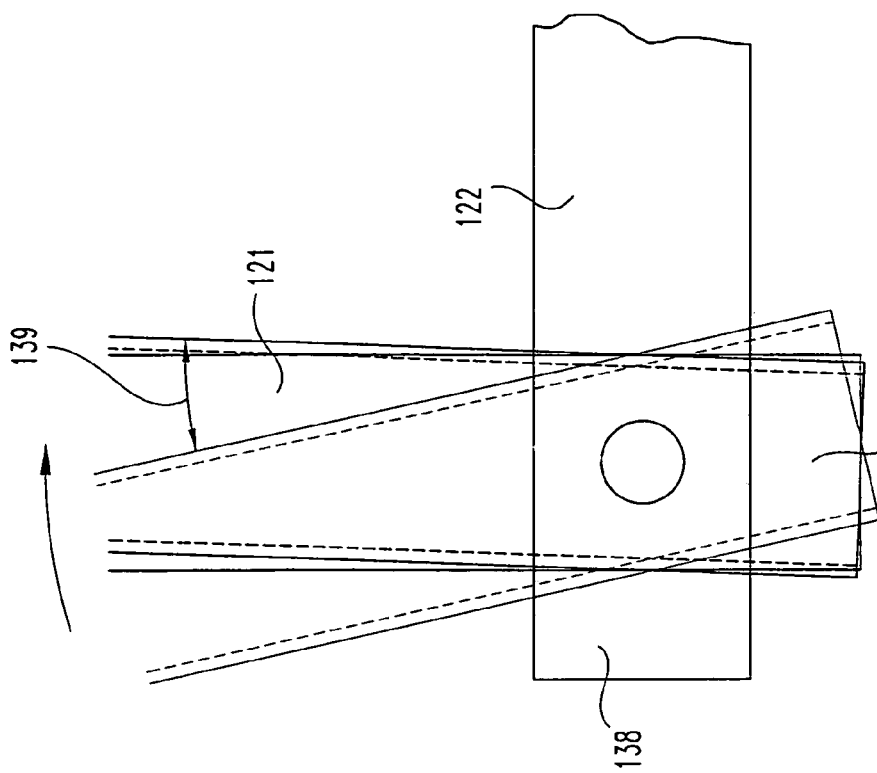
FIG. 3c is an enlarged side fragmentary elevation view of the intersection of the tower member and the connecting member, showing the rotation of the tower member.
Figure 3B:
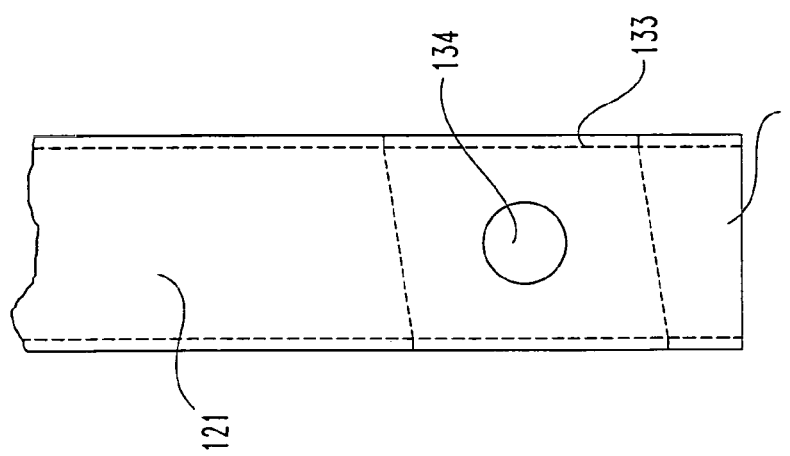
Figure 3A:
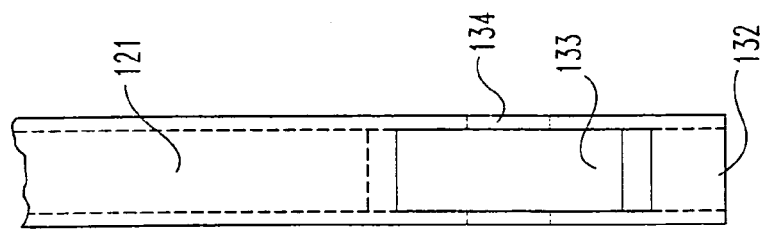
FIG. 3a is an enlarged fragmentary front elevation view of the slot in the tower member of the embodiment of FIG. 1.
Figure 4A:
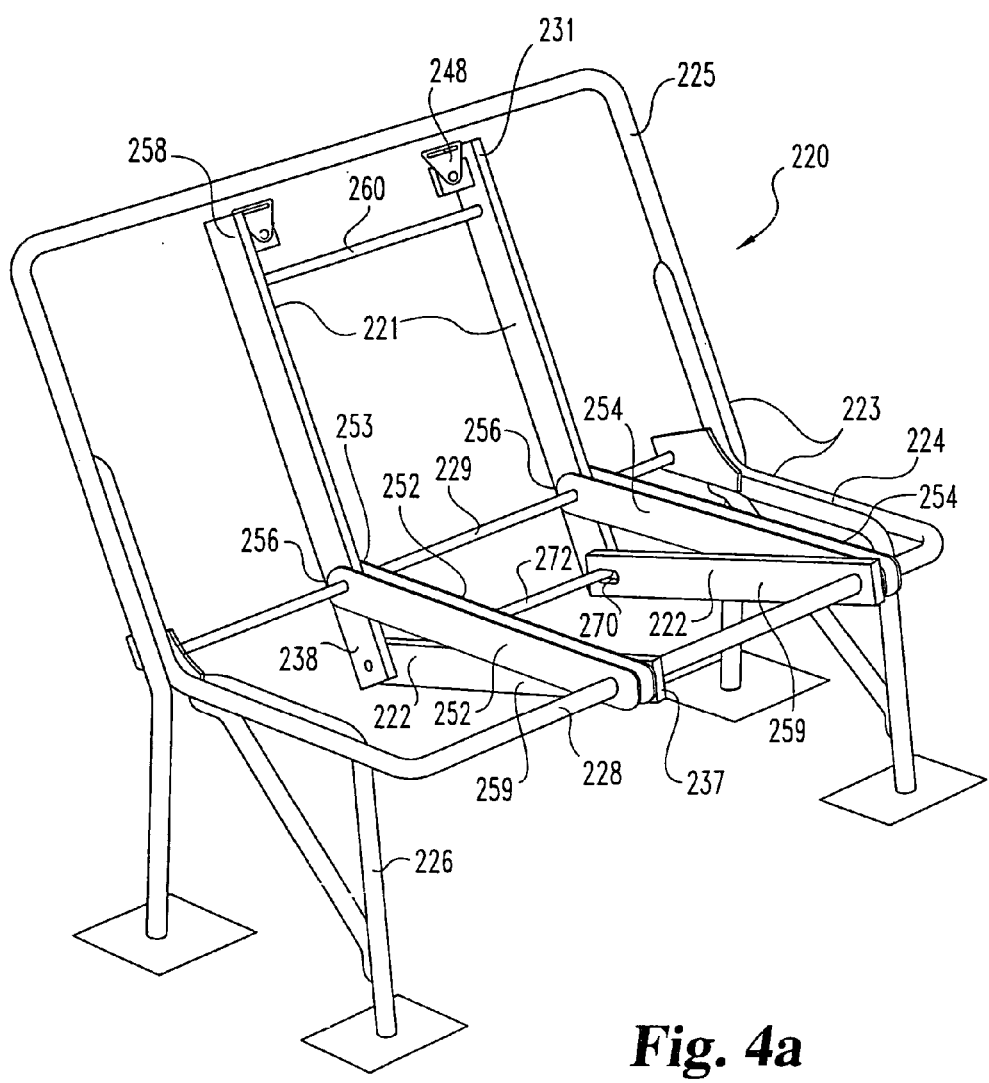
FIG. 4a is a perspective view of a bench seat frame incorporating a second embodiment of the present invention.
Figure 4B:
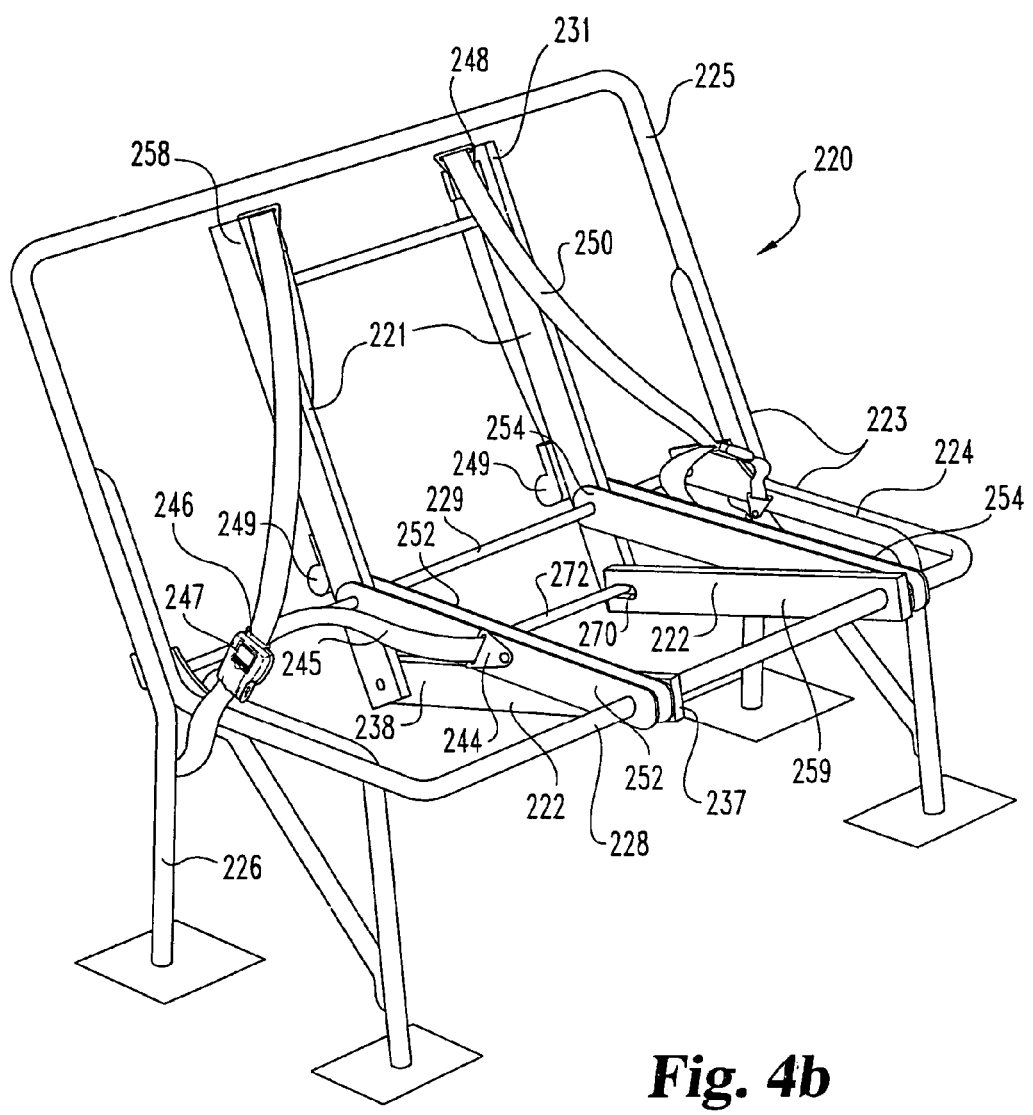
FIG. 4b is the same view as FIG. 4a with the addition of an attached seat belt assembly.
Figure 7:
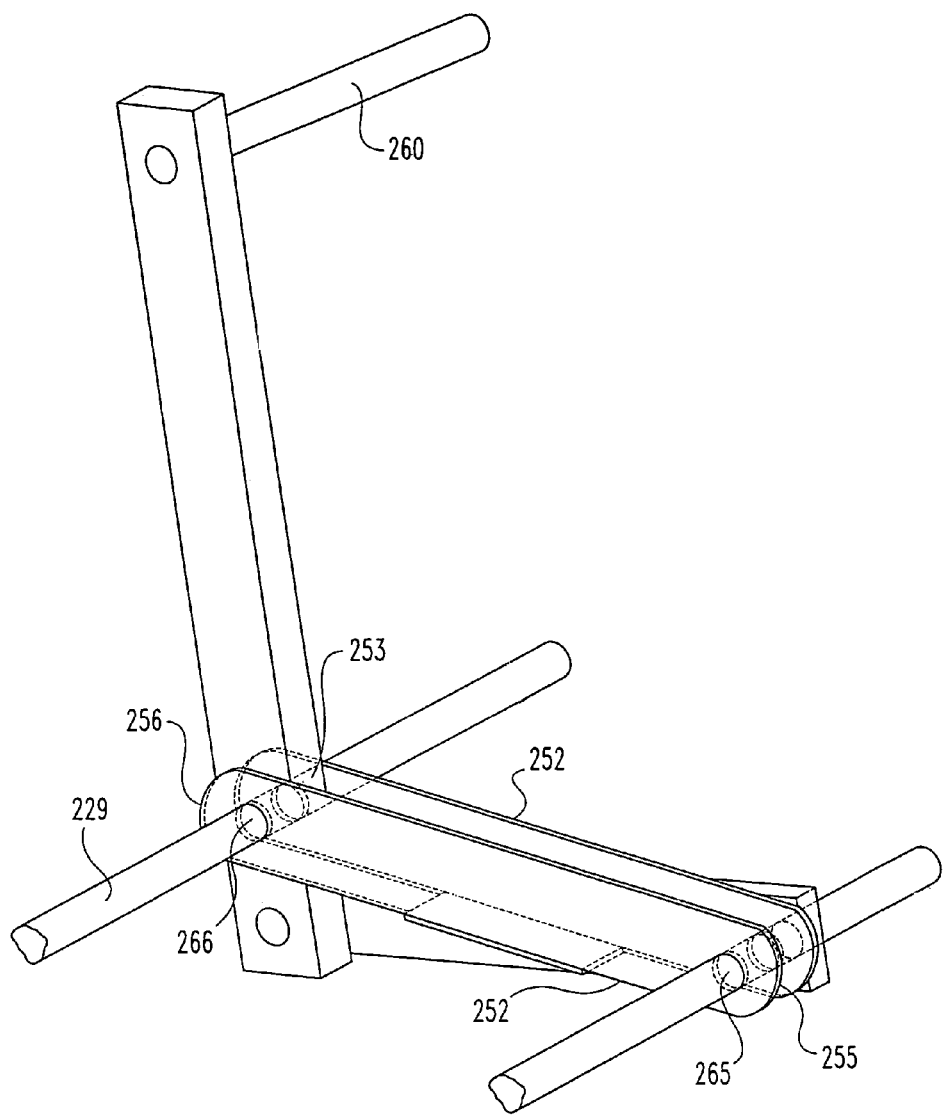
Figure 8:
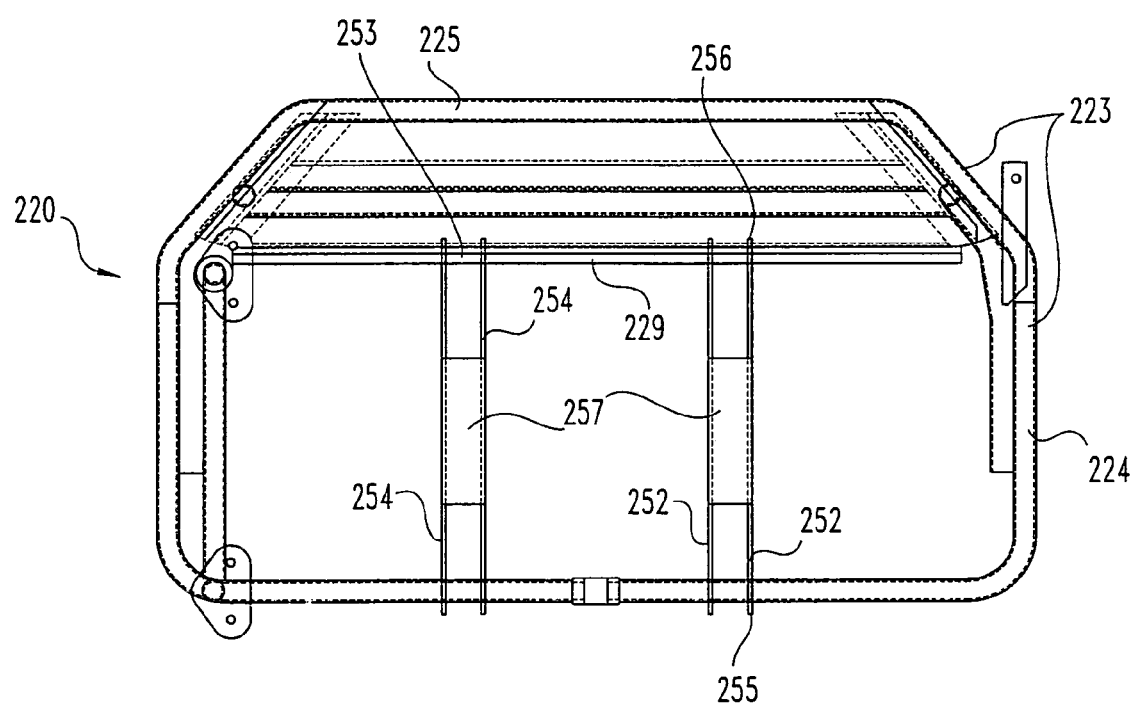
FIG. 8 is a top plan view of the embodiment of FIG. 4b.

Referring now more particularly to the drawings, FIGS. 1 through 3 show a three-point restraint system 120 incorporating a first and illustrative embodiment of the present invention. The restraint system 120 is designed to restrain two passengers sitting side by side. The restraint system 120 includes a tower member 121 movably coupled to a connecting member 122, and is adapted to be mounted to a conventional school bus passenger seat frame 123. Tower member 121 is adapted to move independently relative to seat frame 123. Preferably, tower member 121 is adapted to pivot relative to seat frame 123. The members comprising restraint system 120 are formed from steel or any convenient structural material. Seat frame 123 includes a seat support portion 124 connected to a seat back portion 125 and also connected to a leg portion 126 adapted to be affixed to a surface, such as the floor of a school bus. Seat support portion 124 is typically formed from one or more bent metal tubes 127 and includes a front portion 128 and a rear portion 129. Seat support portion 124 may be wrapped or embedded in a cushion upon which a passenger may sit. Seat back 125 portion, also formed from bent metal tubes 127, may likewise be cushioned.

Connecting member 122 is formed having a rectangular cross-sectional shape 130, although in other embodiments connecting member 122 may have any convenient cross-sectional shape. Tower member 121 has a top end 131 and a bottom end 132. Bottom end 132 includes a slot 133 shaped to accept connecting member 122 and a pair of parallel apertures 134 perpendicular to slot 133 through which rear portion 129 of seat support portion 124 may pass to couple tower member 121 to seat frame 123. Tower member 121 lies in the plane defined by seat back portion 125 with the top end of tower member 121 extending substantially into seat back portion 125.

Connecting member 122 has a front end 137 and a rear end 138, and includes a rear aperture 140 through which rear portion 129 may extend to mount connecting member 122 to seat 123. Connecting member 122 is inserted into slot 133 in tower member 121. In operation, tower member apertures 134 may be aligned coincident with connecting member rear aperture 140 enabling rear metal tube 129 to be passed therethrough, coupling tower member 121 and connecting member 122 to seat support portion 123 and to each other. Connecting member 122 further includes front aperture 141 through which front portion 128 extends, mounting connecting member 122 to seat 123. (See FIG. 2c) Alternatively, connecting member 122 may be affixed to seat support portion 124 by any convenient fastening means (See FIG. 2d)

In operation, connecting member 122 lies in the plane defined by seat support portion 124. Both tower member 121 and connecting member 122 may be embedded in cushions that simultaneously provide passenger comfort and prevent restraint system 120 from moving or jiggling. In the illustrative embodiment, tower member 121 is pivotally coupled to seat support portion 124. A stop means operable to limit the movement of tower member 121 is provided by the presence of connecting member 122 in slot 133, which limits the pivot angle 139 (see FIG. 3c) through which tower member 121 may be rotated. While the illustrative stop means is connecting member 122 filling slot 133, any convenient stop means may be used. It is preferable that the pivot angle 139 through which tower member 121 may pivot is acute. It is more preferable that the pivot angle 139 be about 17 degrees, corresponding to the maximum allowed deflection of seat back portion 125 caused by two unbelted passengers striking seat back 125 from behind and two belted passengers pulling on tower member 121 from the front. Slot 133 preferably extends through tower member 121 at a slight angle to the normal, such that when connecting member 122 engages tower member 121 connecting member 122 may rest in the horizontal plane of seat support portion 124 while tower member 121 remains tilted backwards a few degrees to the vertical. (See FIG. 3c) In this embodiment, the dimensions of connecting member 122 and slot 133 are sized relative to each other such that tower member 121 may rotate forward through a maximum of 17 degrees. (See FIG. 3c)

Restraint system 120 also includes anchor wing 143 connected to connecting member 122. A seat belt anchor 144 is fixedly attached to anchor wing 143, becoming one point of a three-point restraint. (See FIG. 1b) Seat belt anchor 144 connects lap belt 145 terminating in a tongue 146 to seat frame 123. Alternatively, two seat belt retractors could be attached to both anchor wings 143, retractably connecting lap belts 145 thereto. Restraint system 120 further includes a buckle 147 fixedly attached to seat support portion 124 and adapted to lockingly engage tongue 146. Restraint system 120 further includes a pair of guides 148, such as, a conventional D-loop, attached near the top of tower member 121. A pair of torso belt retractors 149 are connected to tower member 121, each housing a torso belt 150 and becoming the second point of the three-point restraint. The torso belt 150 is extended upwardly through guide 148 and downwardly across the torso of a seated passenger. The extending end of torso belt 150 also connects to tongue 146. When tongue 146 is locked in buckle 147, buckle 147 becomes the third point of the three-point restraint. Alternatively, a single belt (not shown) may extend between retractor 149 and anchor 144 with a tongue (not shown) slideably mounted intermediate thereto. In operation, the invention adds active passenger restraint protection to the passive restraint already provided by the deflecting school bus seats. Tower member 121 does not interfere with the passive restraint function of the seat back 125, since tower member 121 is adapted to pivot forward along with the seat back 125 in response to a rear impact. Seat back portion 125 deflects forward in response to a forward force applied thereto consisting of a passenger located rearward of the seat back portion 125 impacting seat back portion 125 and/or a forward force applied to support tower 121 via torso belt 150 by a seated passenger pulling against the torso belt 150.

Another embodiment of the present invention is shown in FIGS. 4 through 8. In this embodiment, the restraint system 220 includes a tower member 221, a connecting member 222, and a crossbar member 252 and is adapted to be mounted to a seat frame 223. Seat frame 223 includes a seat support portion 224 connected to a seat back portion 225. Seat frame 223 is also connected to a seat leg portion 226 adapted to be affixed to a surface, such as a school bus floor. Seat support portion 224 is made of bent metal tubing and includes a front portion 228. Rod member 229 extends transversely across seat back portion 225 substantially within the plane defined by seat support portion 224. Seat frame 223 may be wrapped or embedded in cushioning material to provide passenger comfort.

Harness support assembly is made up of tower member 221, connecting member 222, and crossbar member 252, and is mountable to seat frame 223. When so mounted, tower member 221 lies substantially in the plane defined by seat back portion 225, and extends through the plane defined by the seat support portion 224. Rear end 238 of connecting member 222 connects to tower member 221 below the plane defined by seat support portion 224. Front end 237 of connecting member 222 connects to front portion 228 of seat support portion 224. In this embodiment, front end 237 of connecting member 222 features front aperture 241 (FIG. 6a) through which front portion 228 of seat support portion 224 extends. Tower member 221 is pivotally mounted to seat support portion 224 at pivot point 253. In order to accommodate two passengers, a pair of harness assemblies is provided, each with a tower member 221, connecting member 222 and crossbar members 252 and 254.

Rod member 229 extends through tower member 221 and crossbar members 252 and 254. In the illustrative embodiment, crossbar member 252 includes two parallel plates lying substantially within the plane of the seat support portion 224 and extending from the front portion 228 to the rod member 229. Proximal end 255 (FIG. 7) of crossbar member 252 includes substantially circular apertures 265 through which front portion 228 of seat frame 223 extends. Distal end 256 of crossbar member 252 includes circular apertures 266 through which rod member 229 extends at pivot point 253. In this embodiment a crossbar coupling member 257 (FIG. 8) connects the plates of member 252. Likewise, a second connecting member 254 is provided consisting of two plates being connected to the second tower member in the same manner as described for member 252.

Tower member 221 comprises a pair of substantially vertically disposed members 258 (FIG. 5c), connected by tower coupling member 260. In other embodiments, tower member 221 may comprise a different number of vertical members. Likewise, in this embodiment connecting member 222 comprises two interconnected portions 259 (see FIG. 5c).

Each connecting member 222 includes a slot 270 (see FIG. 4a) at rear end 238. A pin 272 extends through slots 270 with the opposite pin ends fixed to vertical members 258. The pin slideably connects members 222 to the tower 221. In normal operation, tower member 221 rests within the plane of the seat back 225, tilted slightly rearwards with the pin 272 positioned at the forward end 273 (see FIG. 6a) of the slot 270. As tower member pivots about pivot point 253, pin 272 moves towards the rear of slot 270. Pivoting of tower member 221 is halted when pin 272 reaches rear end 274 of slot 270. The length of slot 270 determines the maximum angle through which tower member 221 may pivot. In this embodiment, the length of the slot 270 is such that the maximum angle through which the tower member 221 may pivot is 17 degrees.

As in the previous embodiment, restraint system 220 also includes guides 248 connected near the top end 231 of tower member 221. Seat belt retractors 249 (FIG. 5b) are fixedly attached to the two vertical members of tower 221. Each seat belt retractor 249 house a torso belt 250, which connect to a tongue 246 in turn connected to lap belt 245. Restraint system 220 also includes a buckle 247 fixedly attached to seat support portion 224 and adapted to lockingly engage tongue 246. Torso belt 250 is extended upwardly from torso belt retractor 249 through guide 248 and downwardly across the torso of a seated passenger while lap belt 245 extends horizontally across the passenger's lap. Alternately, a single belt (not shown) may extend between retractor 249 to anchor 244 with a belt tongue slideably mounted intermediate thereto.

Many variations are contemplated and included in the present invention. In addition to those described in relation to the above embodiments, the present system contemplates including means for preventing premature forward deployment of the tower member 221 relative to the seat back. For example, the top end of tower 221 may be connected to seat back portion 225 limiting relative motion therebetween until sufficient force breaks the top end of the tower apart from the seat back portion.

The preferred embodiment of the restraint system is shown in FIGS. 9–15. School bus seat 300 includes a main frame 304 with a pair if front legs 301 and 302 and a pair of rear legs 303. The legs extend upwardly being joined to main frame 304 having a front member 305 integrally joined to a pair if rearwardly extending horizontal members 306, 307, and 309. A tubular member 308 has opposite ends integrally joined to side members 306 and 307 with center member 309 extending between and integrally joined to front member 305 and cylindrical member 308. A pair of flanges 310 and 311 are integrally joined tot he cylindrical member 38 and the opposite sides of member 309.

Frame 304 forms the frame for the seat portion of the seat whereas a second frame 312 forms the frame for the back portion of the seat. Frame 312 includes a horizontally extending tubular portion 313 integrally joined to a pair of downwardly extending tubular portions 314 and 315 forming a single frame, in turn, having bottom ends integrally joined to frame 304. Frames 304 and 312 are located within the cushion respectively of the seat portion and back portion of the seat tubular portions 314 and 315 are rigid; however, will bend forward as forward impact pressure is applied to the back portion of the seat forcing the back portion of the seat about its bottom end toward the seat portion of the seat.

Upwardly extending towers 316 and 317 are located immediately inward of frame portions 314 and 315. Tower 316 is mounted to and between plates 355 and 356 (FIG. 10) which have holes 380 (FIG. 9) through which tube 308 freely extends allowing the tower to pivot on tube 308 in the direction of arrow 322 to and from the seat portion of frame 304. Tower 317 is mounted in a similar manner. The top ends of towers 316 and 317 are joined together by horizontally extending member 323. Flanges 324 and 325 are integrally attached to the top ends of towers 316 and 317 and provide guides through which the webs extend. Wall 339 is fixedly mounted to frame 312 and member 323 preventing member 323 from moving behind frame 312. Wall 339 breaks when forward force is applied to either frame 312 or towers 316/317 allowing independent movement of towers 316/317 relative to frame 312.

Box constructions 381 and 382 extend between and are fixedly attached to rear member 308 and front member 305. Each box construction supports a plurality of stationary bearings and a web retractor. Box construction 381 and 382 include respectively inner plates 328 and 329 having rear ends integrally secured to member 308 and front ends fixedly secured to member 305. Likewise, box constructions 381 and 382 have outwardly located members, respectively 330 and 331 integrally secured and extending between members 308 and 305. Retractor plates 326 and 327 are secured respectively to members 328 and 330 and members 329 and 331. Two conventional inertia locking retractors are respectively mounted to and beneath plates 326 and 327 with the web of each retractor extending rearwardly toward tubular member 308.

Each box construction 381 and 382 have three stationary bearings with their opposite ends fixedly attached to the inner member and outer member of each box construction. For example, bearings 332, 333 and 334 (FIG. 10) have first ends fixedly attached to inner member 328 and second ends fixedly attached to outer member 330. Retractor 335 (FIG. 11) is fixedly attached to and beneath plate 326 and has web 336 extending rearwardly over stationary bearings 332–334 but beneath movable bearings 337 and 338. Web 336 continues around tubular member 308 extending upwardly behind tower 316 to the top of the tower. The web then extends over a bearing surface at the top of the tower and freely through a loop, such as flange 324 (FIG. 9) with the distal end 340 of web 336 being fixedly attached to the rear corner 341 of frame 304.

A conventional seat belt buckle tongue 342 is slidably mounted to web 336 and is lockingly engagable with a conventional seat belt buckle 343, in turn, attached by web 344 to flange 310. Thus, with web 344 extending upward through the seat cushion, tongue 342 may lockingly engage buckle 343 forcing the web across the shoulder and chest of the occupant residing on the seat and then across the lap of the occupant. Web 336 therefore includes a chest portion 395 and a lap portion 345 when the tongue is secured to the buckle. Web 336 extends outward of the cushion forming the back portion of the seat. An identical retractor web combination is provided on the right side of the seat as viewed in FIG. 9 relative to tower 317 and box construction 382.

When force is applied in a forward direction to the rear of the seat by a passenger located behind seat 300, frame portions 314 and 315 are pushed forward bending and pivoting about their bottom ends. Frame portions 314 and 315 are sufficiently rigid to hold the seat back portion in an upright position but sufficiently weak to bend when rearward force is applied thereto thereby being in compliance with the safety standards set by the National Highway Traffic Safety Administration as discussed in the Description of the Prior Art herein. If a seat 300 is occupied then the forward motion of the passenger on seat 300 will apply forward force via web 336 to tower 316 rupturing breakable wall 339 allowing the tower to pivot independent of frame 312. Towers 316 and 317 are pivotally mounted to tube 308 thereby allowing the towers to pivot forward towards the seat portion or frame 304 of the seat. A pair of stop flanges 350 and 351 are fixedly attached respectively to towers 316 and 317 and project forwardly of the towers. The stop Flanges are designed to allow only a limited amount of forward pivotal motion of the towers. Once the stop flanges contact members 330 and 331, additional forward pivotal motion of the towers and frame 312 is prevented.

Stop flange 350 will now be described it being understood that a similar description applies to stop flange 351. Stop flange 350 includes a pair of spaced apart walls 355 and 356 (FIG. 10) fixedly secured to the opposite sides of the bottom of tower 316. A wall 357 has opposite ends fixedly attached to walls 355 and 356 and extends therebetween. Wall 357 is elevated and spaced apart from the top surface of member 330 when the tower is in the erect or normal position. Wall 357 is spaced apart from the top surface of member 330 to only allow a predetermined amount of forward pivotal motion of the tower unit the wall contacts the top surface of member 330 thereby preventing further pivotal motion of the tower and frame 312. The amount of forward pivotal motion of the tower is designed to be in accordance with the deflection requirements of the National Highway Traffic Safety Administration specifications as previously discussed.

A web slack take-up device is mounted within each box construction 381 and 382. The web slack take-up device 360 (FIG. 13) positioned within box construction 381 will now be described it being understood that a similar description applies to the web slack take-up device positioned within box construction 382 device 360 includes a bottom wall 361 secured to a pair of upwardly extending side walls 362 and 363 between which are fixedly mounted a pair of bearings 337 and 338. Web 336 extends between bearings 337 and 338 and the three stationary bearings 332–334 (FIG. 1). The proximal ends of walls 362 and 363 are fixedly attached to sleeve 318 and are designed to pivot around tube 308. Tube 308 extends freely through sleeve 318 (FIG. 9) and sleeve 319 of the slack take up device mounted within box construction 382. Walls 362 and 363 have cut out portions 386 and 387 (FIG. 11) preventing interference of walls 362 and 363 with stationary bearings 333 and 332 when the tower is in the erect position.

Towers 316 and 317 cause the slack take-up device to pivot downwardly as the towers pivot toward the seat portion of the seat; however, pivotal movement of the towers in an opposite direction away from the seat portion does not cause the slack take-up devices to pivot to their original positions. Each tower includes a projection contactable with a projection extending outwardly from sleeves 318 and 319. For example, tower 316 includes projection 370 (FIG. 14) extending inwardly whereas sleeve 318 includes projection 371 extending outwardly toward tower 316. Thus, when tower 316 pivots in a counter clockwise direction, as viewed in FIG. 14, projection 370 contacts projection 371 causing sleeve 318 and bearings 337 and 338 to pivot therewith in a counter clockwise direction removing slack from the web. Movement of tower 316 in a clockwise direction simply moves projection 370 apart from projection 371 without moving sleeve 318.

Figure 12:
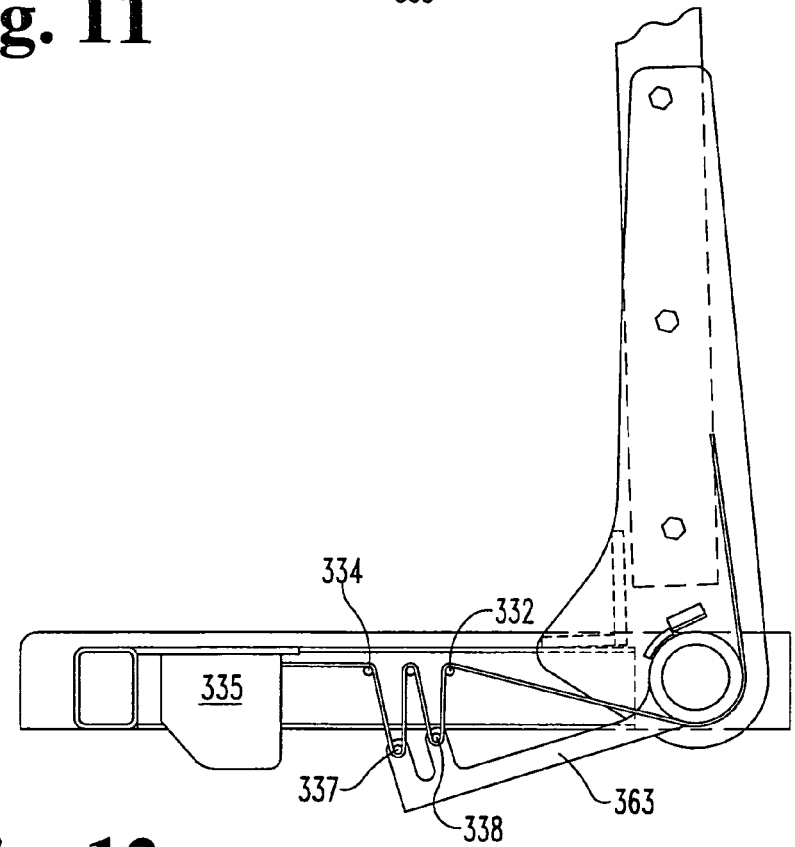
FIG. 12 is the same view as FIG. 11 only showing the back portion tilted forward in a crash condition with belt slack taken up.
Figure 13:
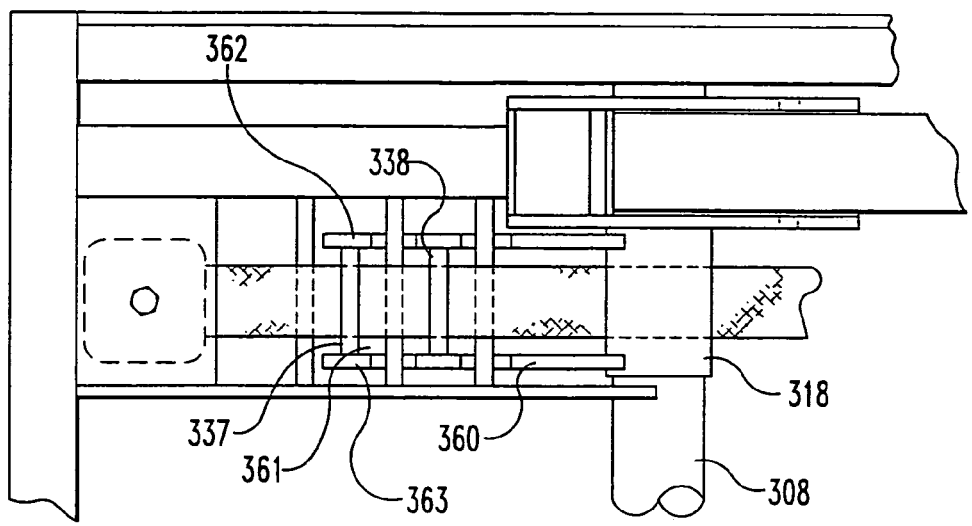
FIG. 13 is a fragmentary top view of the bench seat of FIG. 10.
Figure 14:
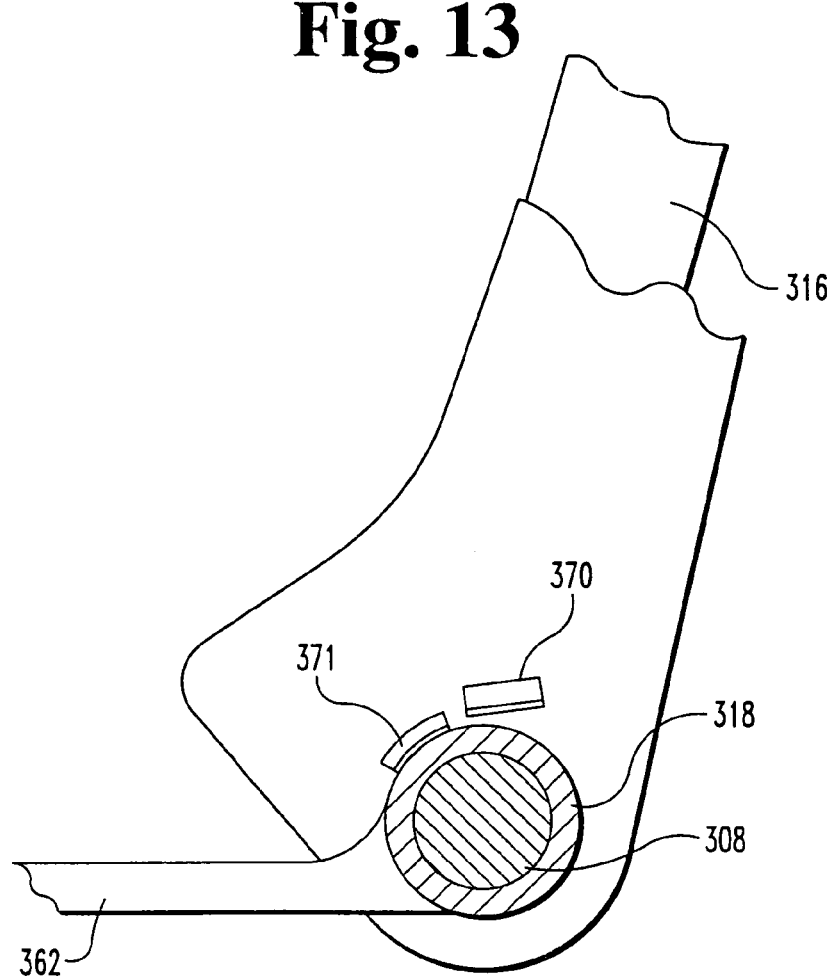
FIG. 14 is a cross sectional view taken generally along the line 14—14 of FIG. 10 and viewed in the direction of the arrows.

In operation, upon the occurrence of a crash, forward force may or may not be applied to the rear of the seat by the passenger located behind the seat. Forward force is applied however to web 336 by the occupant resting upon seat 300. With retractor 335 locked as the result of sensed deacceleration, forward force is applied via the web to towers 316 and 317 causing the towers to pivot forwardly toward the seat portion of the seat. Stops 350 and 351 of towers 316 and 317 limit the forward pivotal motion of the towers. Simultaneously, the web slack take-up devices within each box construction 381 and 382 pivot downward resulting in bearings 337 and 338 of each web slack take-up device contacting the respective web of each retractor forcing the webs into a serpentine path as depicted in FIG. 12 thereby removing any slack from the webs. Even if an occupant is not resting upon seat 300, impact of a passenger behind seat 300 upon the back portion of seat 300 will cause frame 312 to bend and pivot toward the seat portion of the seat to the maximum angle permitted by stops 350 and 351.

Figure 15:
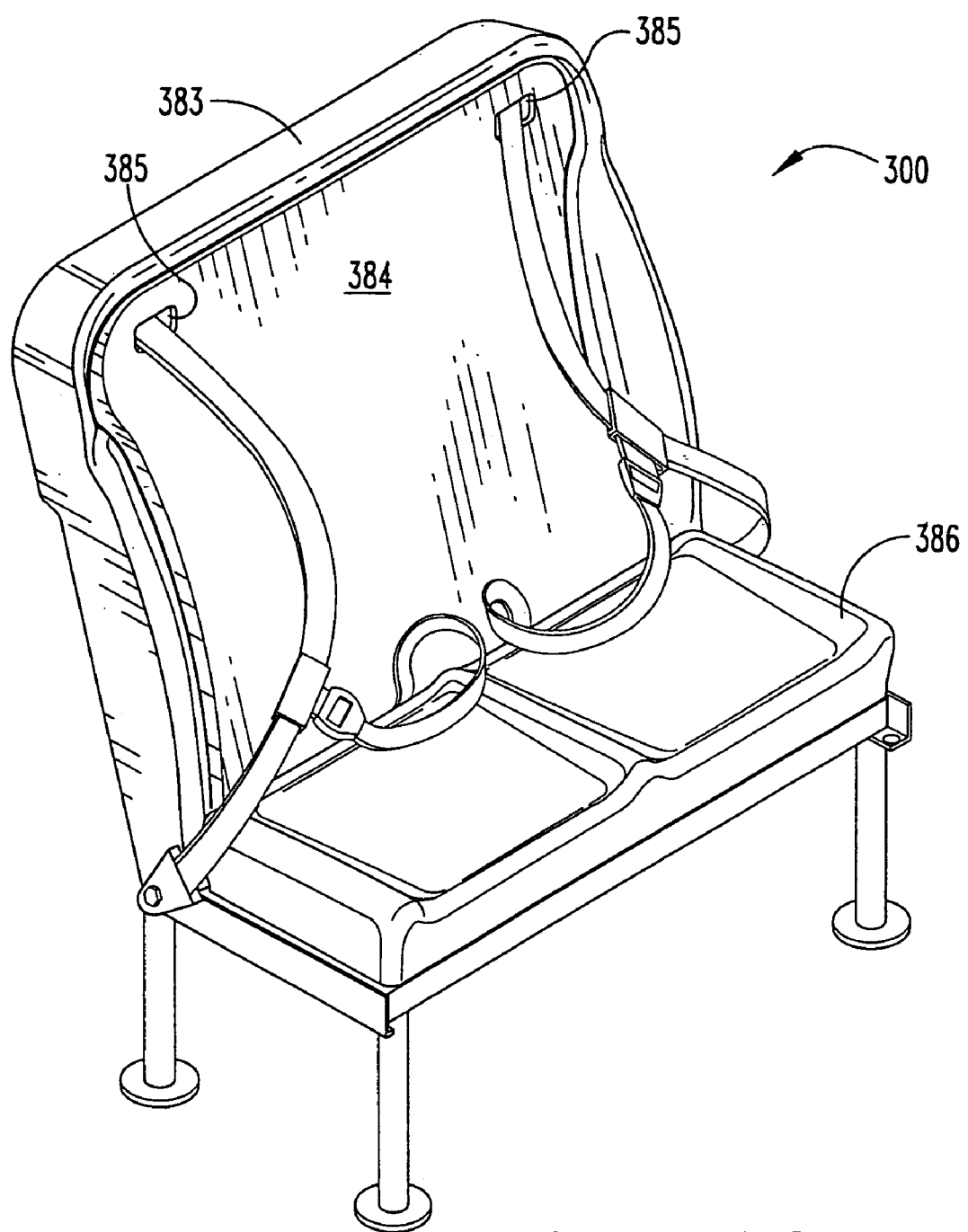
FIG. 15 is a perspective view of an illustrative embodiment of the seat including the seat cushion.

FIG. 15 illustrates seat 300 which has a seat cushion or other enclosure 386 enclosing frame 304, a passenger restraint cushion or other enclosure 383 enclosing frame 312 and a center cushion or other enclosure 384 enclosing towers 316 and 317 along with member 323. Slots 385 are provided in cushion 384 for the webs to extend through. Cushion 383 is indented to receive cushion 384 to allow the center cushion 384 to pivot forward independent of outer cushion 383 when force is applied to towers 316 and 317 by occupant force being applied to the webs.

Many advantages flow from use of the preferred embodiment of the invention. For example, webbing from a restrained occupant on seat 300 simultaneously applies load to towers 316 and 317 causing the towers to pivot forward while applying tension load to the entire webbing length. That is, slack is removed from the webbing surrounding the occupant by the downwardly pivoting slack take up devices. Tension of the restraint is therefore increased around the occupant. A large mechanical advantage is provided by the lengths of the towers which exceed the length of the slack take up devices. As the towers pivot downwardly along with bearings 337 and 338, the tension increases proportionately thereby decreasing the occupant forward acceleration rate proportionally. The increasing tension in the lap portion of the web centers the occupant in proper seating position during forward impact movement. Likewise, additional tension in the web controls kinematic motion of the restrained occupant so that the motion is straight during forward motion and straight during rebound motion. The added tension in the web will further cause the occupant to be in proper seating position after the occupant motion is complete.

Figure 9:
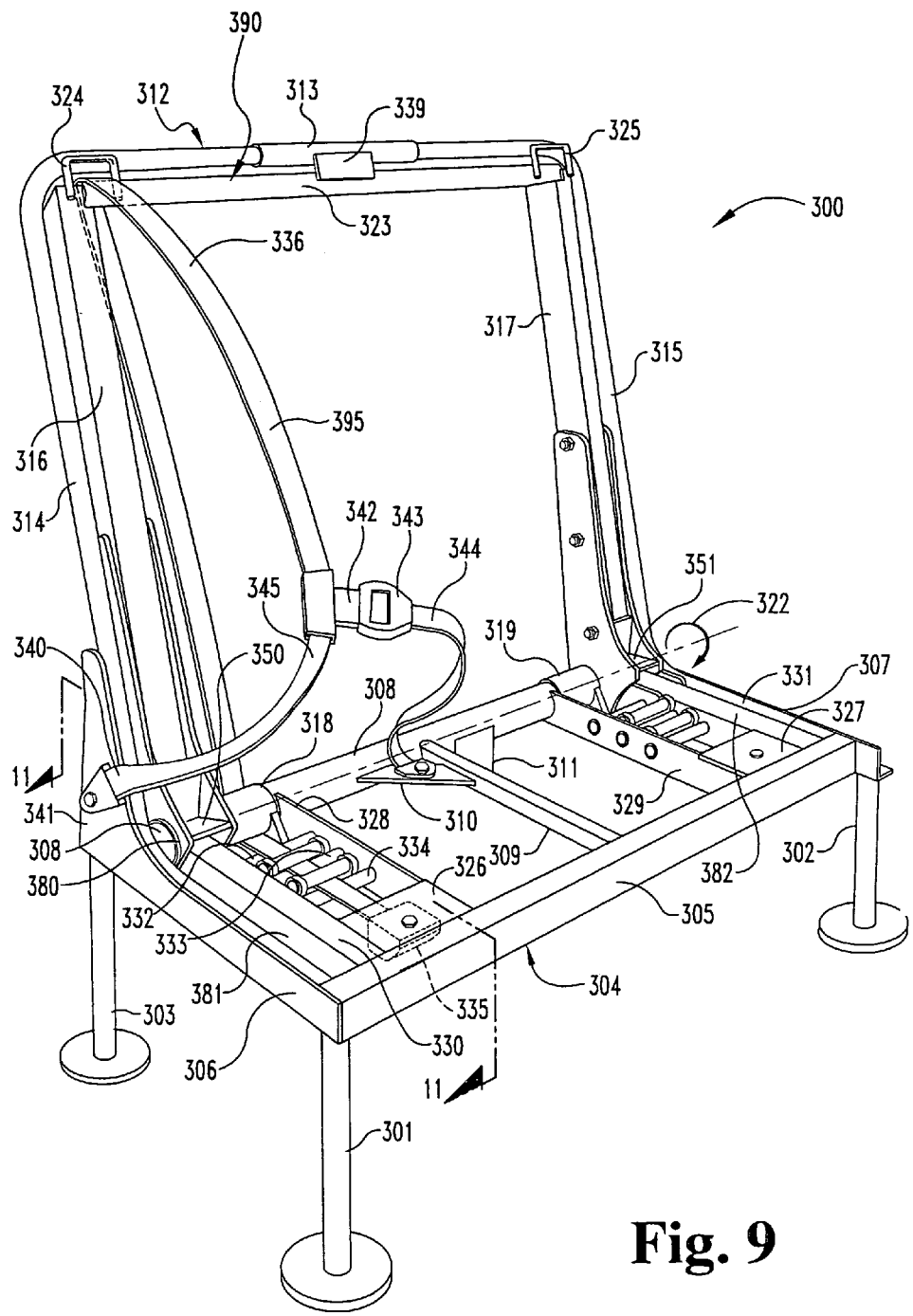
FIG. 9 is a perspective view of the illustrative embodiment of the bench seat frame with a belt slack take-up device.
Figure 10:
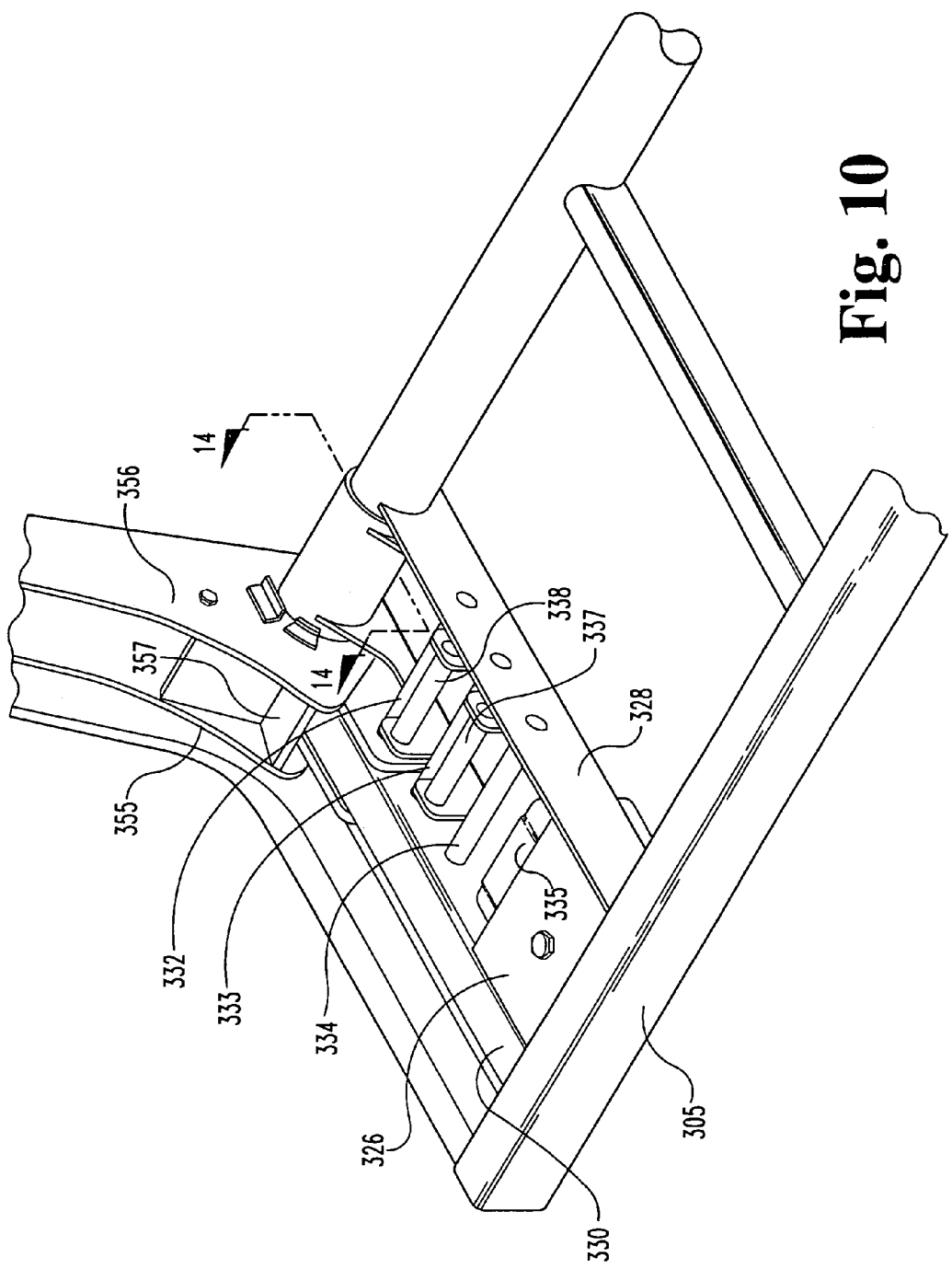
FIG. 10 is a fragmentary enlarged perspective view of the left side of the bench seat frame of FIG. 9.
Figure 11:
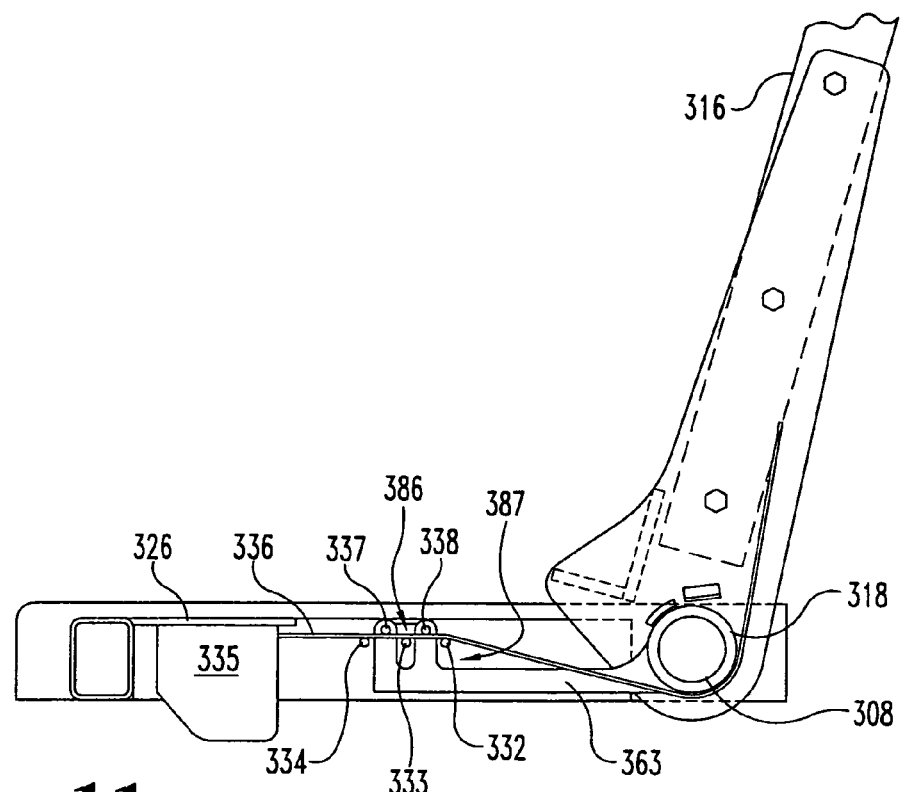
FIG. 11 is a fragmentary cross sectional view of the seat portion and back portion of the frame in a pre-crash condition taken generally along the line 11—11 of FIG. 9 and viewed in the direction of the arrows.

The system of FIG. 9 will not cause additional stiffness to the seat back when the occupant is unrestrained or the seat is unoccupied and thus, maintains the energy management capability for any unrestrained occupant located behind seat 300. The system preserves the under seat clearance for other vehicle features. Likewise, the system will not require additional structure to the seat back when the restrained or unrestrained occupant is forced rearward into the seat back during impact.

Figure 16:
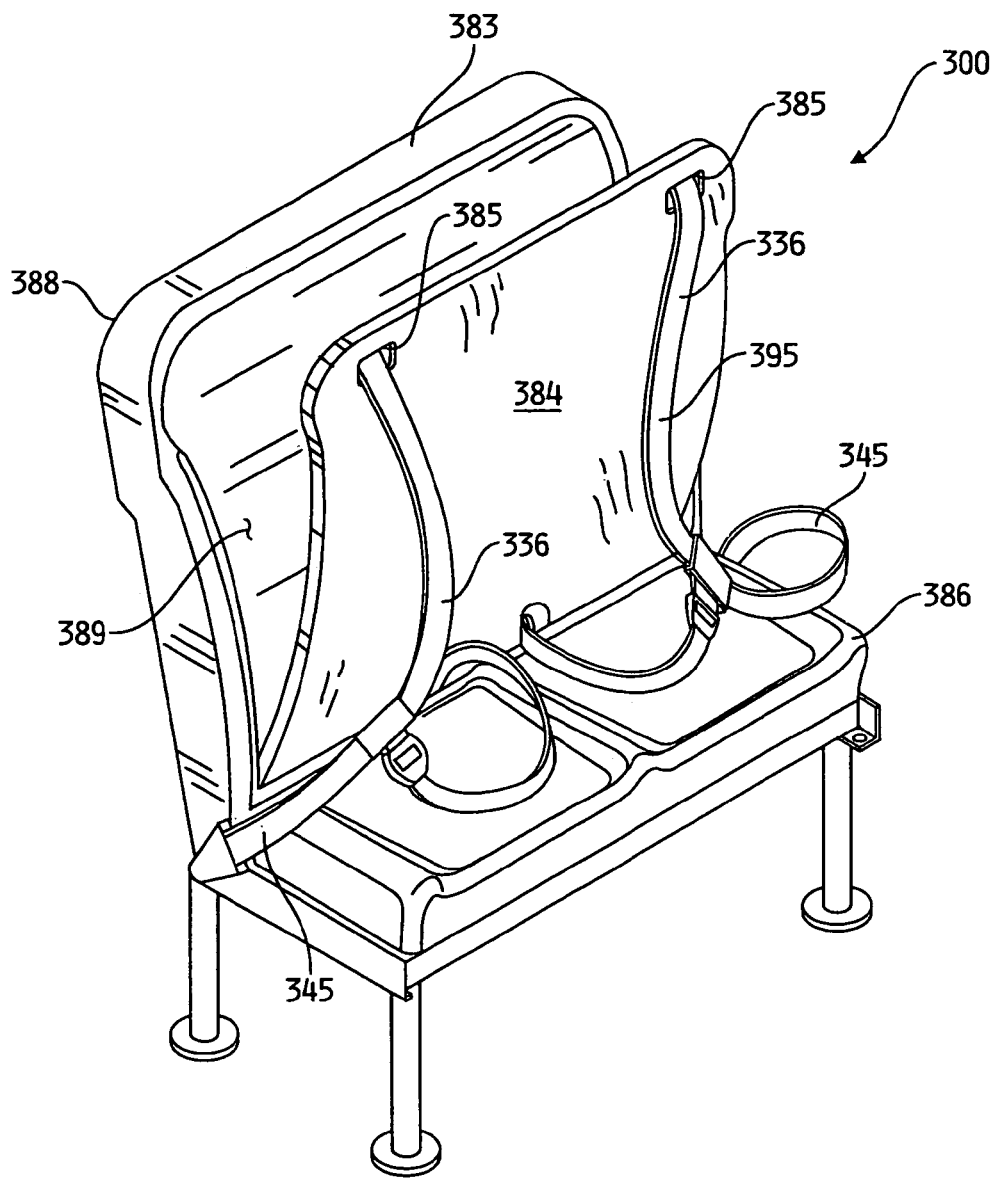
FIG. 16 is a side perspective view of the seats depicted in FIGS. 9 and 15.

FIG. 16 illustrates seat 300, as depicted in FIGS. 9 and 15, with the center cushion 384 pivoted forward of the outer cushion 383. As previously described, the center cushion 384 encloses upwardly extending towers 316 and 317, each tower having a top portion and a bottom portion, and horizontally extending member 323 therebetween, which together form a pivotable third frame or seat back frame 390 for supporting the center cushion 384 and for supporting and guiding the web belt 336 as depicted in FIGS. 9, 15 and 16. The frame 390 together with center cushion 384 form a seat back for supporting a passenger in seat 300, which seat back moves together substantially as a unit as shown in FIG. 16. As described above and depicted in FIGS. 9, 15 and 16, seat cushion 386 encloses frame 304 to form the seat portion or seat bottom for supporting a passenger.

Figure 17:
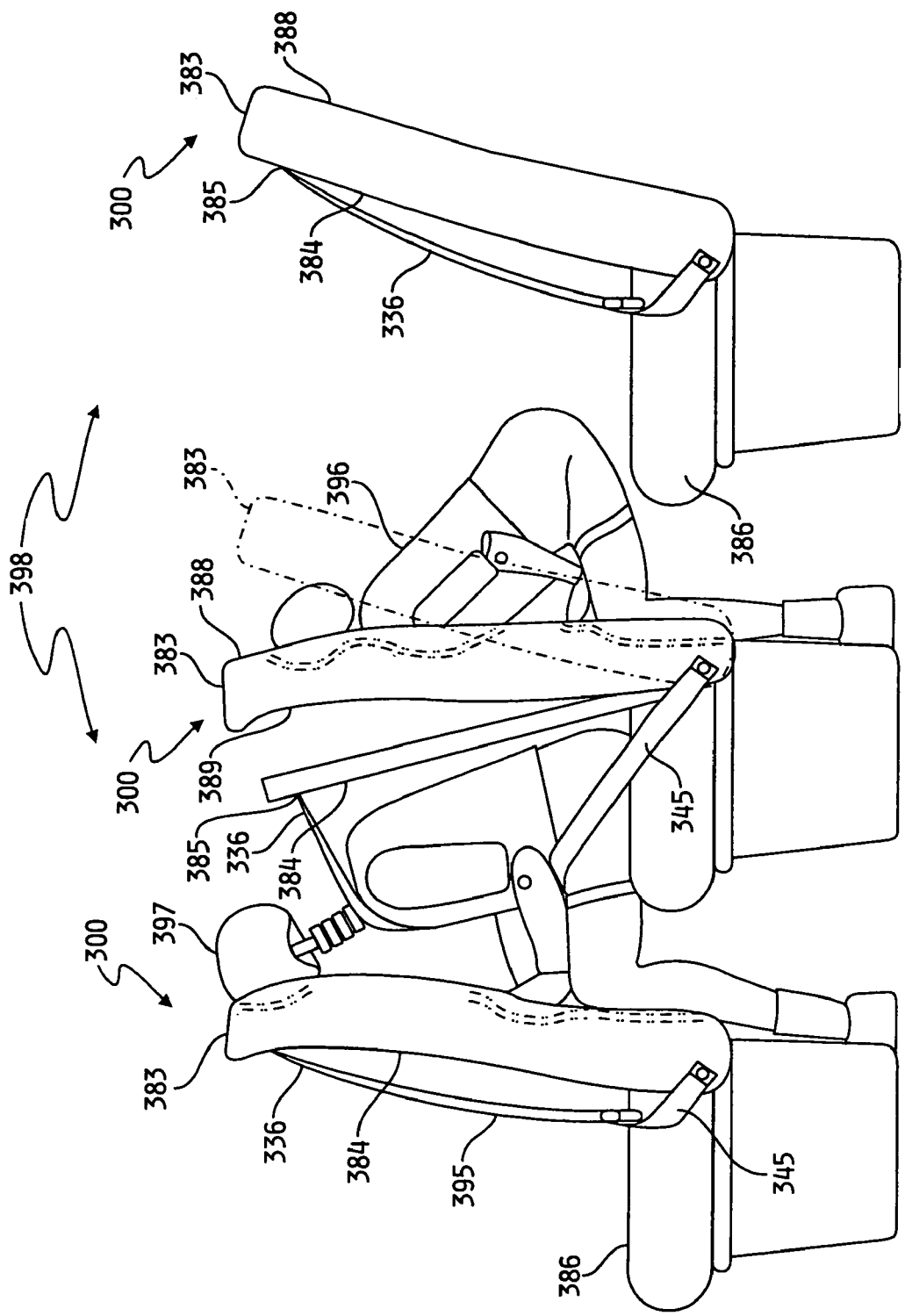
FIG. 17 is a side schematic view of an illustrative embodiment of a system of seats.

Referring to FIG. 17, a system 398 of seats 300, as previously described and depicted in FIGS. 9, 15 and 16, is illustrated with the seats in a longitudinally oriented row. The cushion 383 together with enclosed frame 312, as described and depicted in FIGS. 9 and 15–17, form a passenger restrainer for an unbelted passenger 396 or a belted passenger 397 sitting in any seat 300 situated behind any other seat 300 as depicted in FIG. 17. As illustrated in FIGS. 15 and 16, the cushion 383 has a rearwardly facing surface 388. As illustrated in FIGS. 16 and 17, the cushion 383 also has a forwardly facing surface 389 of the cushion 383 facing forward.

Referring to FIG. 17, the operation of system 398 will be expanded upon. As already noted, when a passenger 396, 397 sitting behind a seat 300 applies a force forwardly toward rearwardly facing surface 388 of seat 300, as in the event of a crash, then the frame portions 314 and 315 of frame 312 deform, thereby absorbing the energy of the forwardly moving passenger 396, 397. As previously explained, if a forwardly moving passenger 397 is wearing a seat belt 336, then the force of a crash will move the passenger 397 against web belt 336 with force sufficient to rupture breakable wall 339, or other frangible retaining means known to one skilled in the art, allowing frame 390 and associated enclosing cushion 384 to pivot forward independent of frame 312 until a stop mechanism, such as previously described stop flanges 350 and 351 in cooperation with contact members 330 and 331, stops the forward movement of frame 390 and cushion 384. As previously noted, although the belt 336 and associated take-up device 360 absorb some of the passenger's 397 forward momentum, it will be appreciated that, depending on the size of belted passenger 397 and the force that passenger 397 applies on the web 336, the passenger 397 may or may not impact surface 388 in a crash. It will also be appreciated that the frangible retaining means 339 may be designed to rupture at varying amounts of force. Also, because the forward movement of frame 390 and cushion 384 is independent of frame 312, frame 312 and associated cushion 383 remain in place to absorb the energy of a passenger 396 or 397, whether belted or not, sitting in the seat behind the seat of a belted passenger 397. The phantom rendition of cushion 383 in FIG. 17 depicts the cushion 383 prior to contact by the forwardly moving passenger 396.

If a passenger 396 is not wearing a belt 336, then a crash will not move the passenger 396 against the web 336 and the retaining means 339 will therefore not break. In such a case, cushion 384 will remain within cushion 383 thereby pivoting forward with frame portions 314 and 315 and cushion 383 in the event that a passenger sitting behind impacts the rearwardly facing surface 388. Similarly, if a passenger sitting behind an empty seat applies forward pressure against the rearwardly facing surface 388 of such an empty seat, then frame 390 and cushion 384 will remain within frame 312 and cushion 383 and will not impede the movement of, but rather, will move forward with, frame portions 314 and 315.

Figure 18:
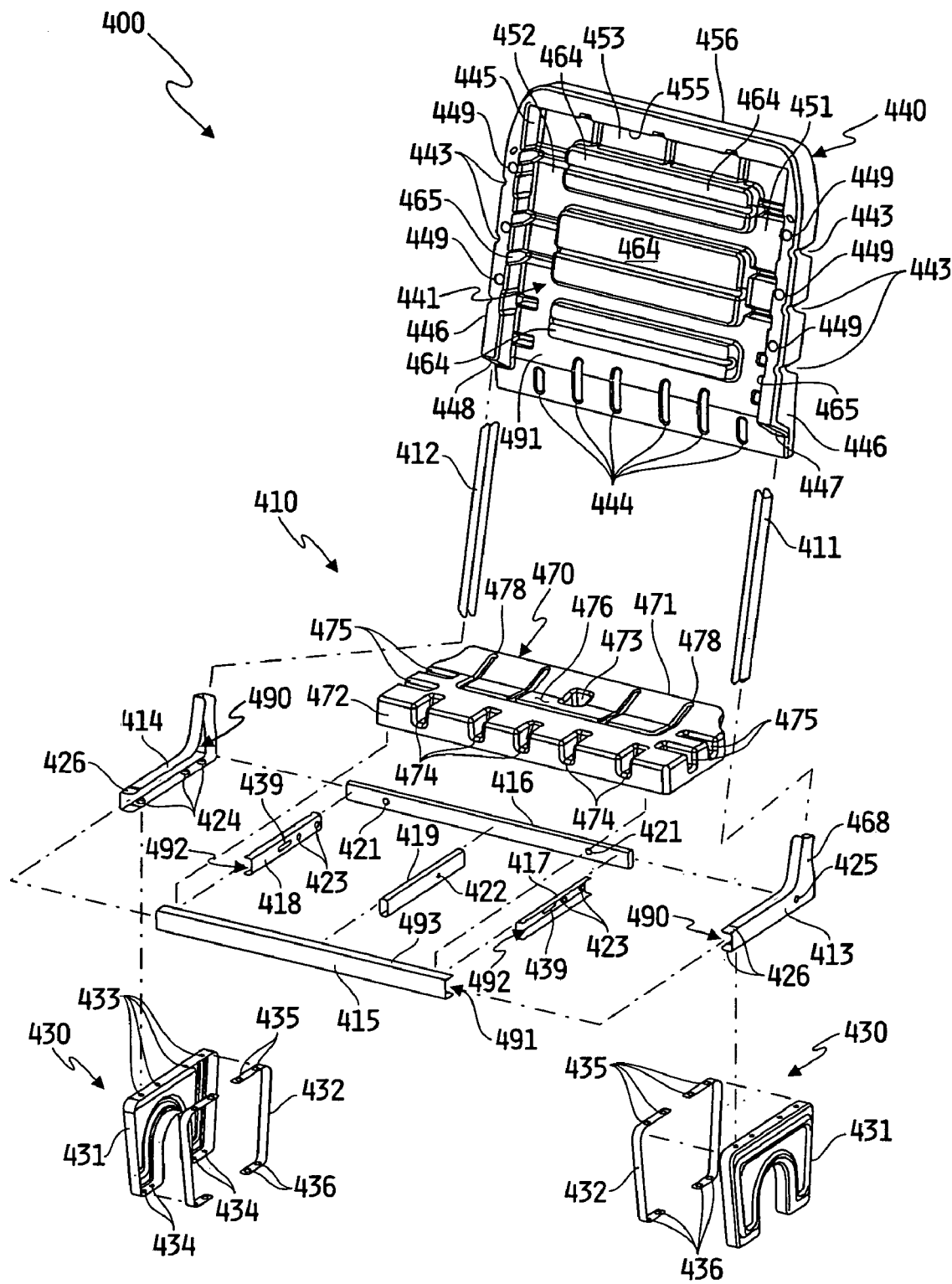
FIG. 18 is an exploded view of an illustrative embodiment of a passive restraint seat.
Figure 19:
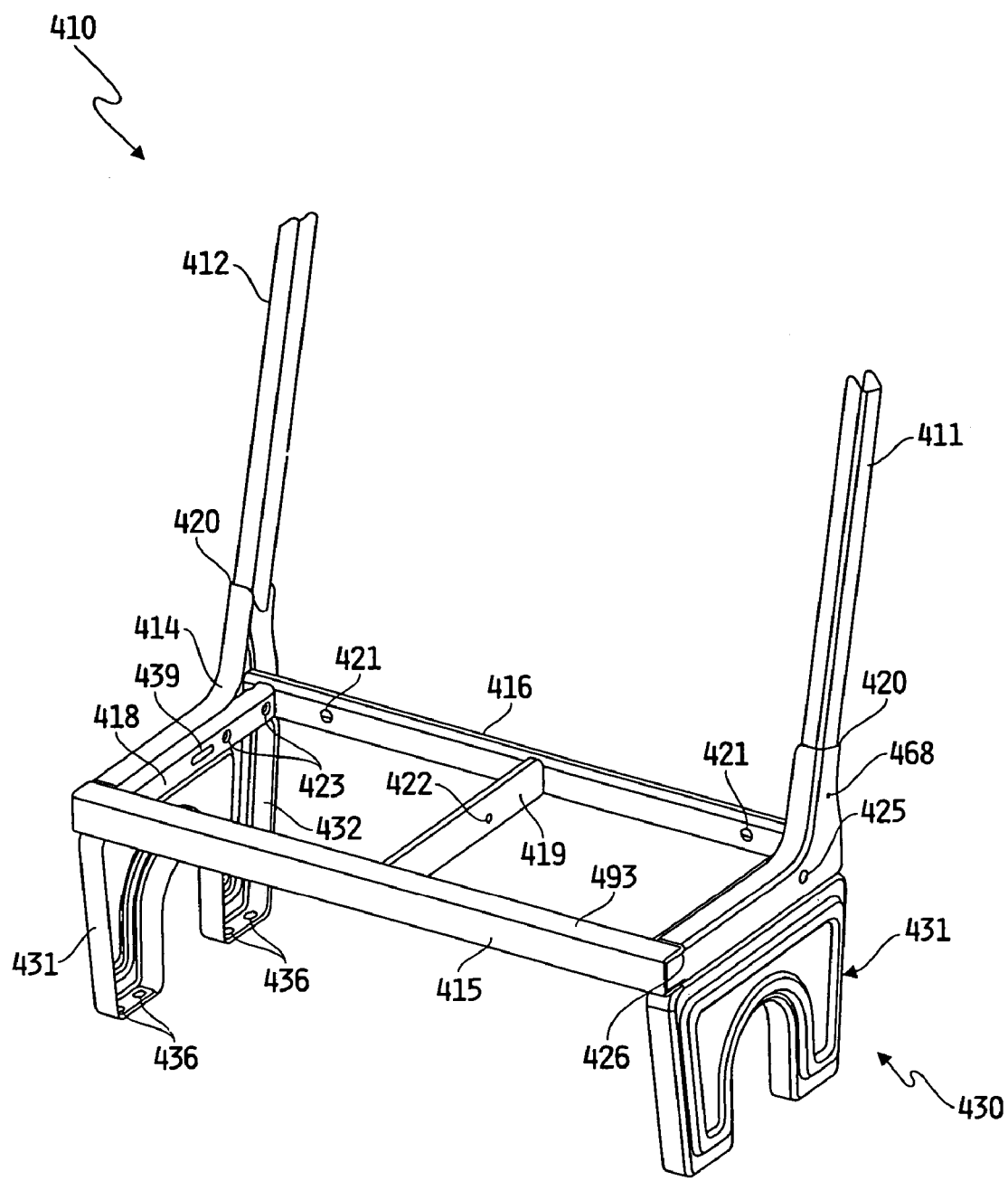
FIG. 19 is a perspective view of a frame assembly of the illustrative embodiment of FIG. 18.
Figure 20:
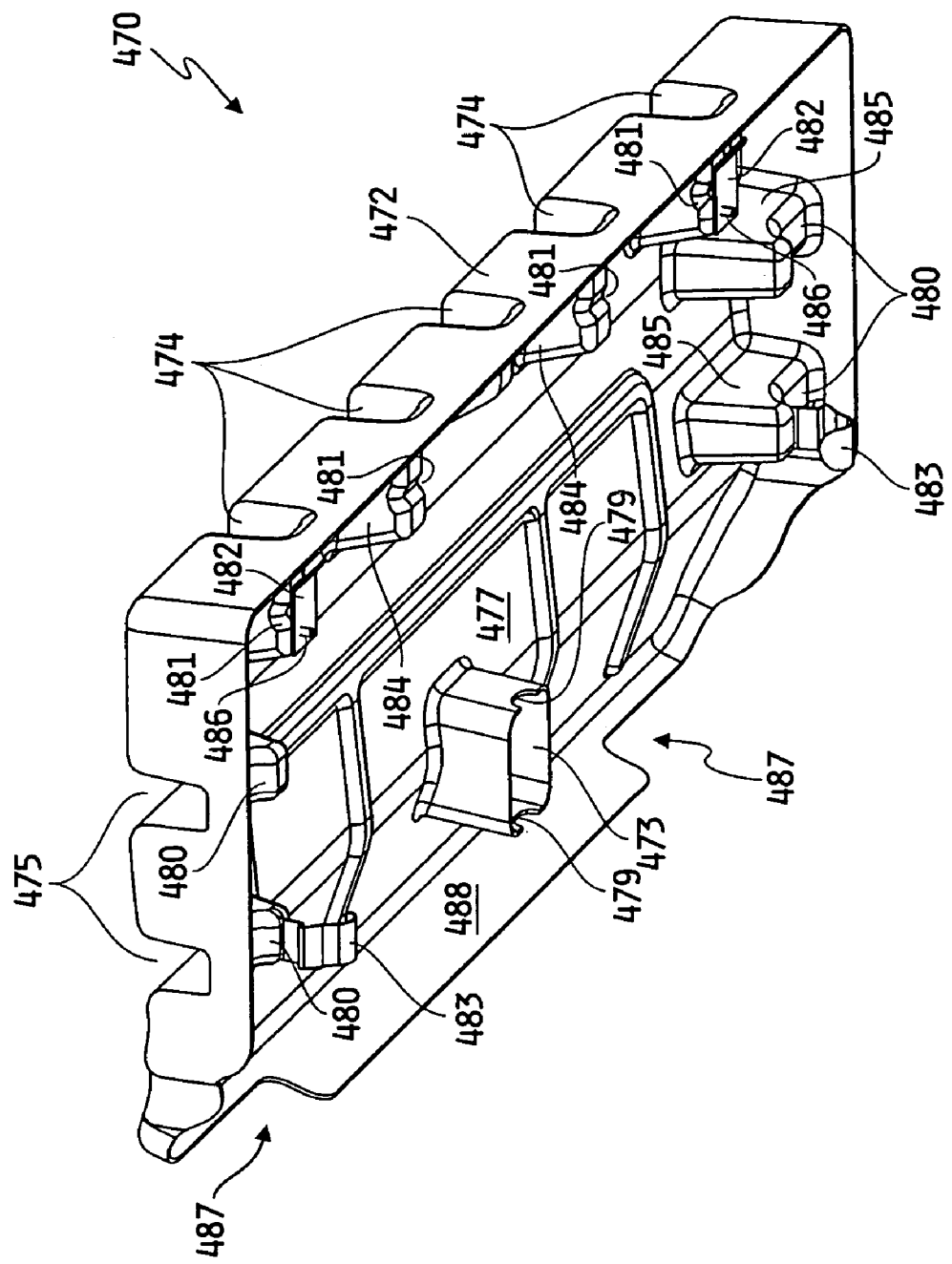
FIG. 20 is a bottom perspective view of an illustrative seat member.

Referring to FIGS. 18–20 another illustrative seat restraint is depicted. Vehicle seat restraint system 400 is an illustrative modular seat comprising a frame assembly 410, a floor mount assembly 430, a passenger restraint member or panel 440, and a seat member 470. Illustratively, frame 410 comprises a pair of spaced apart and generally vertically extending members or upright posts 411 and 412, sideform members 413 and 414, longitudinally extending front member or rail 415, longitudinally extending rear member 416, a pair of transversely extending side cross-member rails or struts 417 and 418, and a transversely extending central cross-member tube or strut 419. Sideforms 413, 414 are of a generally elbow-shaped and concave construction having an open sided L-shaped lodgment area 490 including a vertical portion extending upwardly from the bend in the elbow and having an open top end distal from the bend, and a horizontal portion extending transversely away from the bend and having an open reduced-neck end 426 distal therefrom. Each sideform includes a plurality of mounting apertures 423 and mounting slots 439. Posts 411 and 412, front member 415, and side cross-members 417, 418 each have a generally elongated and concave or C-shaped construction having open opposing ends and including a base wall with opposing lips protruding away therefrom and generally perpendicular thereto. Front member 415 thus has an open-sided and open-ended channel 491 extending the length of the member, and cross members 417, 418 each have an open-sided and open-ended channel 492 extending their respective lengths. Illustratively, the longitudinally extending rear member 416 and the center cross-strut 419 are of tubular construction characterized by a generally rectangular cross-section having a hollow core.

The L-shaped lodgment area is configured to receive into the open-ended vertical portion of the lodgment area 490 the posts 411, 412, and into the horizontal portion of the lodgment area 490 the rear member 416 and the side cross-struts 417, 418. Illustratively, the posts 411, 412 fit snugly into the vertical portion of the L-shaped lodgment area 490 of their respective sideforms 413, 414. In addition, the posts 411, 412 and their respective sideform 413, 414 are affixed or coupled together, as by, for example, welding at the point of intersection 420. It will be appreciated that the posts 411, 412 and sideforms 413, 414 alternatively could be of monolithic construction. It further will be appreciated that posts 411, 412 may but need not be parallel one to the other. It will be apparent to one skilled in the art that the posts 411, 412 need not be affixed to the opposite ends of the frame 410 as just described, but rather that they may be affixed to the frame 410 adjacent to its opposite ends.

The opposing ends of rear member 416 fit one each into the elbow portion of each sideform 413, 414 such that each opposing end is generally aligned below and distal from said open top end and is generally distal from said open transverse end as best seen in FIG. 19. Each side cross-strut 417, 418 fits into the horizontal portion of the L-shaped lodgment area 490 of its respective sideform 413, 414 with their respective open sides 490, 492 adjacent to and facing toward each other thereby forming a unified member characterized by a generally rectangular cross section having a hollow core. Each cross-member 417, 418 is affixed or coupled to its respective sideform 413, 414 and to the rear member 416, which, in turn, is also coupled to the sideforms 413, 414. Central cross-member 419 is coupled to rear member 416 such that it is spaced apart from and disposed between side cross-members 417, 418. Front member 415 is configured to receive within its channel 491, and couple therewith, the neck-down ends of each of the sideforms 413, 414, and each of the cross-member 417, 418, 419 ends distal from the rear member 416. The reduced neck or notch portion 426 of each sideform 413, 414 is sized to provide a snug and generally flush fit with the front rail member 415 in both the horizontal and vertical planes. When so interconnected or assembled, the elongate members 413, 414, 415, 416, 419 define a seat support surface. Illustratively, the frame 410 couplings just described are accomplished by welding, however, other methods of coupling such as the use of bolts, rivets, or other fasteners may be used.

The frame assembly 410 may be attached to a frame support structure of a vehicle by one or more vehicle frame mounting members such as for example floor mount assembly 430 for mounting to the floor of the vehicle, or wall mount assembly or bracket 437 (FIGS. 26–28) for mounting to a sidewall of the vehicle, or a combination thereof. As best seen in FIG. 18, floor mount assembly 430 comprises a pedestal 431, and a pair of pedestal reinforcement brackets 432. Each pedestal 431 includes a plurality of frame-mount apertures 433 and a plurality of floor-mount apertures 434. Illustratively, there are four each of the frame-mount 433 and the floor-mount apertures 434, although a greater or fewer number could be used. Each of the pair of reinforcement brackets 432 likewise have a plurality of frame-mount 435 and floor mount 436 apertures corresponding to the respective pedestal apertures 433, 434. The reinforcement brackets 432 are sized to fit inside the pedestals 431 such that apertures 433 align with apertures 435 and apertures 434 align with apertures 436. The brackets and pedestals are coupled to the floor by a fastener, such as a bolt, rivet, screw, or nail, inserted through the aligned apertures 434, 436 into the vehicle floor. The seat frame 410 and floor mount assembly 430 are similarly attached together using fasteners, which are inserted through the aligned apertures 433, 435 and through frame-mount apertures 424 formed in each sideform 413, 414. In the illustrative embodiment of FIG. 18, there are only three frame-mount apertures 424. It will be appreciated, though, that there may be more or less than three. Illustratively, these apertures 424 are extruded for use with a bolt but without the need for a nut. Also, the pedestals 430 are non-handed in that they are interchangeable, and may include three or more floor mount assemblies 430 to mount the frame 410. In the alternative, the wall mount assembly or bracket 437, may be used with another wall mount or with one or more floor mount assemblies 430. Similar to the floor mount assemblies 430, the wall mount bracket 437 is non-handed and includes frame-mount apertures (not shown) adapted to couple the bracket 437 to whichever sideform 413, 414 will be attached to the side wall of the vehicle. The wall mount bracket 437 includes apertures 438 for coupling the bracket 437 to the wall of the vehicle using fasteners, such as bolts, rivets, screws or nails. The floor mount assembly 430 is configurable for use with vehicles using conventional track flooring. Similarly, the wall mount bracket 437 is configurable for use with vehicles equipped with side wall mounted tracks. It will be appreciated that other frame mounting members, such as for example the legs 126, 226, 301, 302 of FIGS. 1a–5c, 9, 15 and 16, or the pedestal assembly shown in FIG. 17, may be used to support and mount the frame assembly 410 in a vehicle. It will further be appreciated that any such frame mounting members and/or assemblies 126, 226, 301, 302, 430, 437, or combinations thereof may be mounted adjacent opposite ends of frame 410. All such support means preserve the under seat clearance for cleaning, maintenance and preserves other vehicle features.

Each of the components 411–419 of the frame assembly 410, illustratively, are either stamped, in the case of the posts 411 and 412, the sideforms 413 and 414, and the rails 415, 417 and 418, or rolled and seam welded, in the case of the tubes 416 and 419, from high-strength, low-alloy steel. Those skilled in the art, however, will realize that any portion of the frame assembly 410, the floor mount assembly 430, or the wall mount assembly 437 may be made from any other suitable metallic, non-metallic, or composite material, or combination thereof, using any manufacturing method appropriate to the material being used. For example, aluminum, titanium, KEVLAR, plastic, wood, bamboo, or resin may be used.

FIGS. 18, 21, 25, and 28 depict various aspects of restraint member or panel 440. Illustratively, restraint member 440 has a generally rectangular to square shape and is vacuum formed from twin sheets of plastic, such as, for example, high density polyethylene or other suitable plastic, including lightweight plastics, resulting in a hollow-shelled, structural restraint member or panel 440 having energy absorbing properties as will be explained. The restraint panel 440 includes a forwardly facing front surface 441 (FIGS. 18 and 28) and opposite thereto a rearwardly facing rear surface 442 (FIG. 21) with a generally hollow core 460 therebetween (FIG. 25) and a number of recesses and grooves defined therein and configured to import rigidity to selected regions of the panel 440. The top and side portions of forwardly facing surface 441 are generally coplanar with portions of the surface 441 being formed to include a number of recesses and protrusions. The panel's formation to define therein a number of recesses configured to selectively impart rigidity to the panel 440 will be further explained below.

Referring to FIG. 18, the forwardly facing surface 441 is formed to include recessed vertical side channels 451 and 452 and recessed lateral top channel 453, which surround one or more generally rectangular protrusions 464 formed in the central portion of the forwardly facing surface 441, and which are configured optionally to receive a seat back frame member or assembly 510, and/or a built-in child restraint system or integrated child seat or restraint assembly 605 as will be explained. The top channel 453 extends horizontally and is bounded horizontally along its top by inner top wall 455 and intermittently on its bottom by one of the protrusions 464. Outer top wall 456, which illustratively is the topmost portion of restraint member 440, is spaced apart from and is generally parallel to inner top wall 455. Top walls 455, 456, which generally extend horizontally across the substantial length of the top of the restraint panel 440, are generally perpendicular to the forwardly and rearwardly facing surfaces 441, 442. As described, top walls 455, 456 and forwardly and rearwardly facing surfaces 441, 442 define a portion of a head zone 461 (FIG. 21) having a hollow core 460 (FIG. 25) with a substantially rectangular cross section. It will be appreciated by those skilled in the art that the extent of the head zone 461 is determined by the size of the vehicle occupants as will be explained and as depicted in FIG. 17.

Inner side walls (FIGS. 18 and 25) vertically bound the ends of lateral channel 453 and the sides of vertical side or seat back frame channels 451, 452. The upper ends of vertical side channels 451, 452 are in overlapping relation with the lateral ends of channel 453 and vice versa. The vertical side channels 451, 452 extend vertically and are bounded along their outer sides by inner side walls 445 (FIGS. 18 and 25), which are generally perpendicular and intersect with, inner top wall 455. Channels 451, 452 are intermittently bounded along their inner sides by protrusions 464. Inner side walls are spaced apart from, and are generally parallel to outer side walls 446. Side walls 445, 446 generally extend along the substantial vertical length of the sides of the restraint panel 440, and are generally perpendicular to the forwardly and rearwardly facing surfaces 441, 442. As described, respective top walls 445, 446 and forwardly and rearwardly facing surfaces 441, 442 define vertically extending and open-ended upright-post channels 447 and 448 (FIGS. 18, 21, 25), which are open at their respective bottom ends and are configured to slidingly receive respective posts 411 and 412. Channels 447, 448 illustratively have a substantially rectangular cross section and generally define the vertical periphery of the restraint panel 440, and, as noted, define the outer vertical boundaries of the seat back frame channels 451, 452. It will be appreciated, however, that the channels 447, 448 need not be defined at opposite edges of panel 440, but rather may be defined adjacent to the opposite panel edges. The channels could also be formed with alternative cross-sections, such as circular or triangular, so long as they are configured to receive the posts 411, 412. Moreover, the channels 447, 448 may but need not be parallel one to the other.

The forward facing surface 441 further includes substantially circular recesses or dimples 449 spaced apart along the length of vertical channels 447, 448. These recesses 449 cooperate with outer side wall recesses or indentations 443, inner side wall recesses or indentations 465 and rearward facing surface recesses or indentations 450 (FIG. 21) to guide into their respective channels 447, 448, to nestle and retain within their respective channels 447, 448, and to cushion or protect from impact, as will be explained, posts 411, 412. Those skilled in the art will appreciate that the recesses 443, 449, 450 alternatively may be of different shapes including, for example, circular, triangular quadrilateral, polygonal, paraboloidal, conoidal, etc., and sizes so long as they are configured to guide and nestle the posts 411, 412. In addition to the snug fit of the posts 411, 412 within the channels 447, 448, the restraint member 440 optionally may be coupled to the frame assembly 410 by a connector (not shown) passed through an aperture (not shown) in the restraint member 440 and an aperture 468 in the side form. Such a connector may be a rivet, a screw, a bolt, a nail or other suitable connector.

Figure 25:
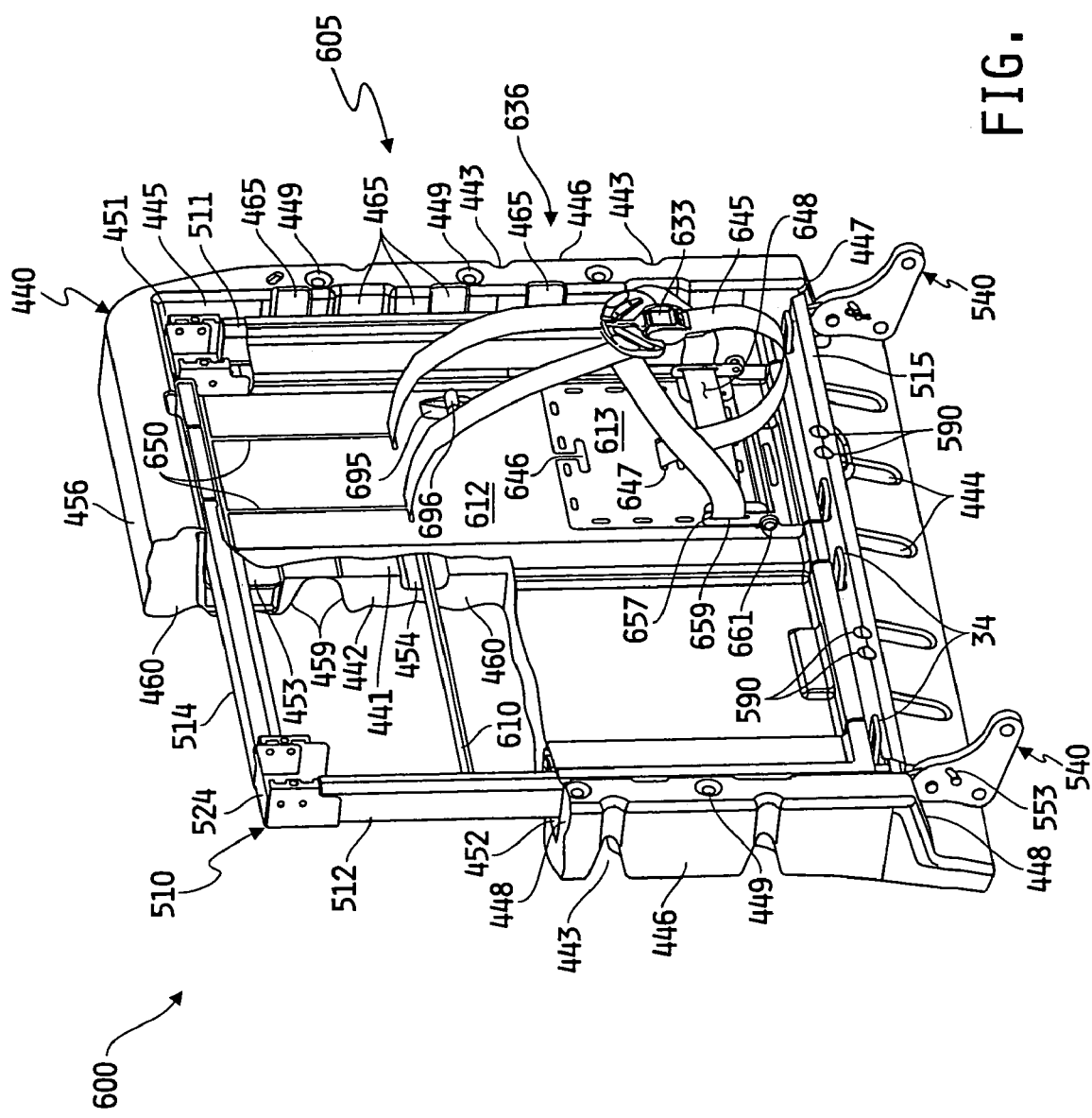
FIG. 25 is another perspective view of the illustrative embodiment of FIG. 24 including a mounting back panel and passive restraint back panel, both of which are partially cutaway.

The forwardly facing surface 441 further includes a plurality of recesses 444, which, illustratively, are generally oblong in shape and spaced apart along the bottom portion of the restraint member 440 (FIG. 18). It is within the teaching of the scope of this disclosure for the forward facing surface 441 to comprise additional recesses, indentations, protrusions, grooves and the like, such as those that are unspecified but illustrated in FIG. 18. Those skilled in the art will recognize that any grooves, recesses, and indentations, for example the enumerated and described recesses 443, 444, 449, 451–453, form supporting walls, such as for example walls 445 (FIG. 18), and knitting surfaces or walls 459 as best seen in FIGS. 21 and 25, which import upon the restraint member 440 selective rigidity and energy absorbing characteristics in cooperation with complimentary recesses and indentations which comprise the rearward facing portion 442 of the restraint member 440.

Figure 21:
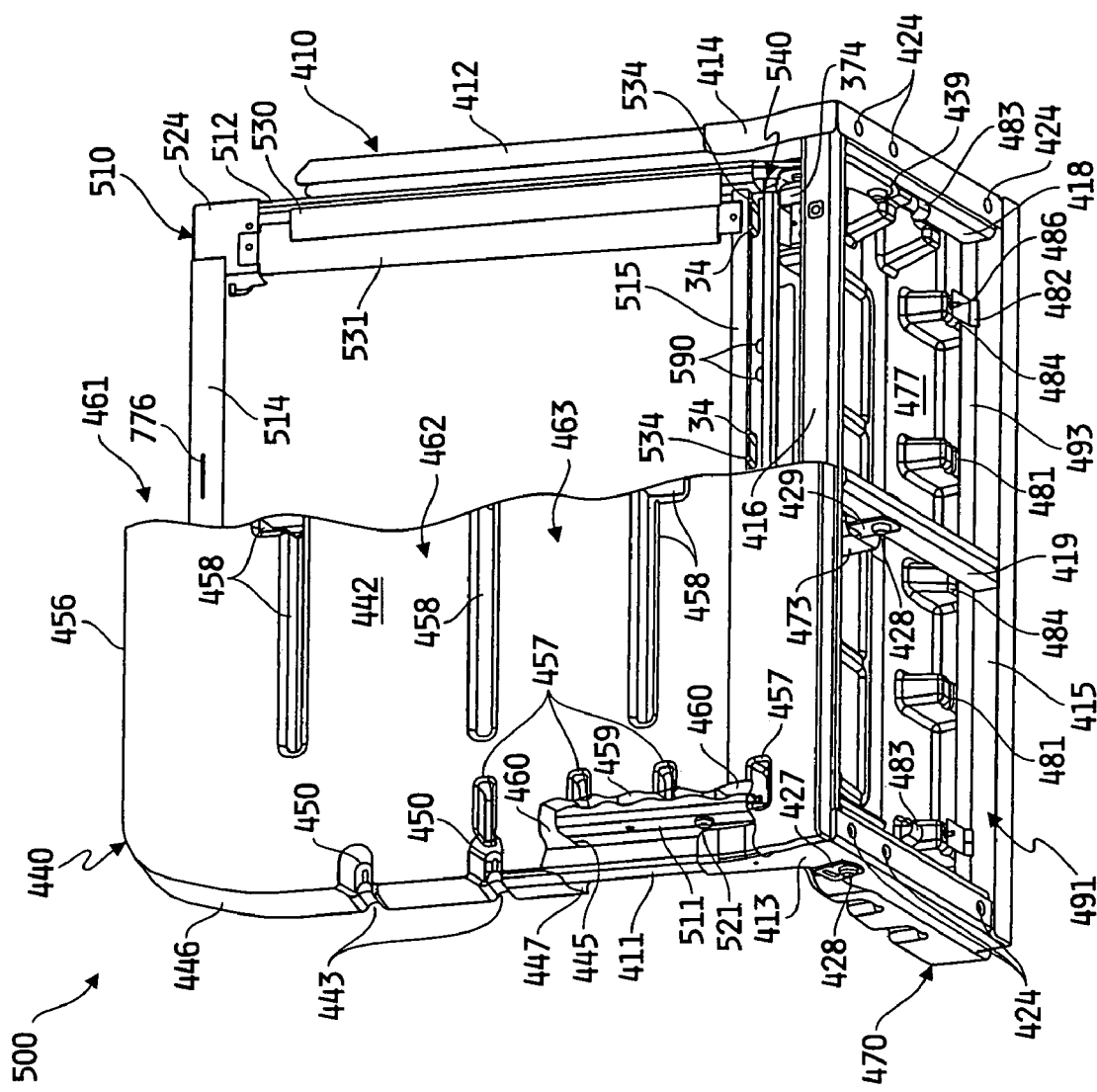
FIG. 21 is a rear perspective view of another illustrative embodiment of a seat providing active and passive restraint of a passenger and showing a partial cutaway of the passive restraint back panel.

Referring to FIG. 21, rearward facing portion 442 includes recesses or indentations 457 and 458, as well as the just discussed indentations 450. Recesses 458 are formed in various shapes, to include rectangular and oblong shapes, and sizes as best seen in FIG. 21. Indentations 457 have a substantially cone shape, but may, like indentations 458, be of varying shapes to include triangular and rectangular, and sizes. As noted above, these recesses 450, 457–459 cooperate to import upon the restraint member 440 selective rigidity and energy absorbing characteristics which may be varied for selected areas or energy absorbing crush zones of the restraint member 440 as dictated by private, industry, or government (local, state, or federal e.g. FMVSS 222) motor vehicle safety standards. More specifically, in addition to the previously described head zone 462, the restraint member 440 further comprises a chest or torso zone 462, and a knee zone 463 (FIG. 21).

Referring to FIGS. 18–21 and 28, seat member or seat pan 470 is depicted. Seat member 470 illustratively has a generally rectangular shape and is formed from a sheet of plastic, such as, for example, high density polyethylene or other suitable plastic, including lightweight plastics, into a concave support seat member 470. As will be explained below, the seat member 470 is formed to define therein a number of recesses configured to selectively impart rigidity to the seat member 470. As best seen in FIGS. 18 and 20, the seat member 470 comprises a rear portion 471 adjacent to the restraint member 470 when the vehicle seat restraint system is assembled, a front portion 472 parallel to and spaced apart from the rear portion 471, an upwardly facing top surface 476, and a downwardly facing bottom surface 477 (FIG. 20) on the concave side opposite the upwardly facing top surface 476. The upwardly top facing surface 476 is formed to include a downwardly extruded buckle aperture or channel 473, and a member of front indentations or recesses 474, side indentations or recesses 475, and channels or grooves 478. The indentations 474, 475 illustratively have a conoid cross section, although any convenient cross-section to include triangular, circular, rectangular and the like may be used. The indentations 474, 475 import selective rigidity and support characteristics to the seat member 470. It will be appreciated that a fewer or greater number of indentations 474, 475 may be provided. Similarly, grooves 478 also provide rigidity to the seat member 470. Rear portion 471 slopes upwardly away from the horizontal plane of the seat member 470 as seen in FIGS. 18 and 20.

Referring to FIG. 20, indentations 474, 475 define in the downwardly facing bottom surface a number of respective front protrusions 484 and side protrusions 485 which extend into the concave portion of the seat member 470. The protrusions 484, 485 include, respectively, grooves or notches 481, 480. Front rail retaining clips 482 are configured to couple or mount the seat member 470 to the seat frame 410 and illustratively are attached by rivets 486 to two of the front protrusions 484. In addition, two of the side protrusions 485, one on each side of the seat member 470, are provided with steel spring retaining clips 483 which also are adapted to couple or mount the seat member 470 to the seat frame 410. Together, the rail retaining clips 482 and the steel spring retaining clips 483 releasably mount the seat member 470 to the frame 410. As best seen in FIG. 21, the buckle mounting bracket 429 passes through channel 473. Upwardly sloping rear portion 471 includes cutouts 487 and a downwardly projecting appendage 488. The downwardly extruded portion of buckle channel 473, which includes a pair of spaced-apart notches 479, also extends into the concave portion of set member 470, and is configured to receive, guide and support optional belt buckles 343 (FIGS. 21 and 28), which are mounted to center cross-strut 419 by bolt 428 threaded through mounting bracket 429 and aperture 422. Alternative couplings, such as rivets, screws, or nails could also be used to mount the buckles 343. The notches 479 are configured to receive and straddle the center cross-strut 419 when the seat member 470 and seat frame assembly 410 are coupled together as will now be explained.

As best seen in FIG. 21, the seat member 470 is illustratively mounted to the seat frame 410 such that the protrusions 484 generally abut or contact front rail 415, with a portion of the front notches 481 positioned adjacent to or over a portion of the top lip 493 of the front rail member 415 and with the rail retaining clips 482 passing under a portion of the top lip 493 of the front member 415 in order to trap the top lip 493 between the retaining clips 482 and their respective protrusion 484. Similarly, the protrusions 485 abut sideforms 413, 414, with a portion of side notches 480 positioned adjacent to or over a portion of the sideforms 413, 414 and with spring retaining clips 483 releasably engaged with slots 439. Thus, the indentations 474, 475 and their respective protrusion portions not only provide rigidity to the seat member 470, but also support it on the frame assembly 410. When so mounted, the front surface 441 of the panel 440 is adjacent the seat member 470.

Figure 27:
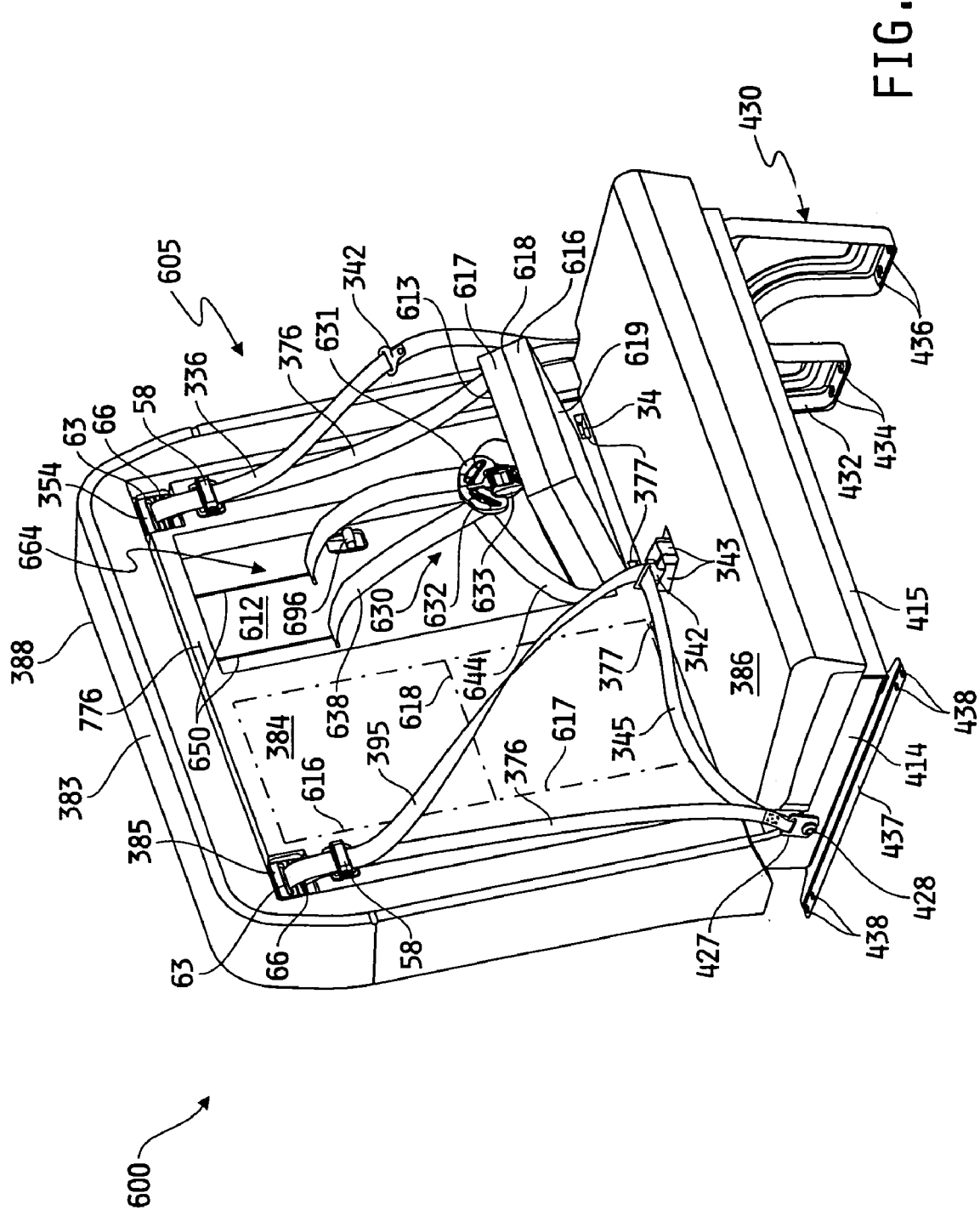
FIG. 27 is a perspective view of the illustrative embodiment of FIG. 24 including cushion members and active restraint web belts.
Figure 28:
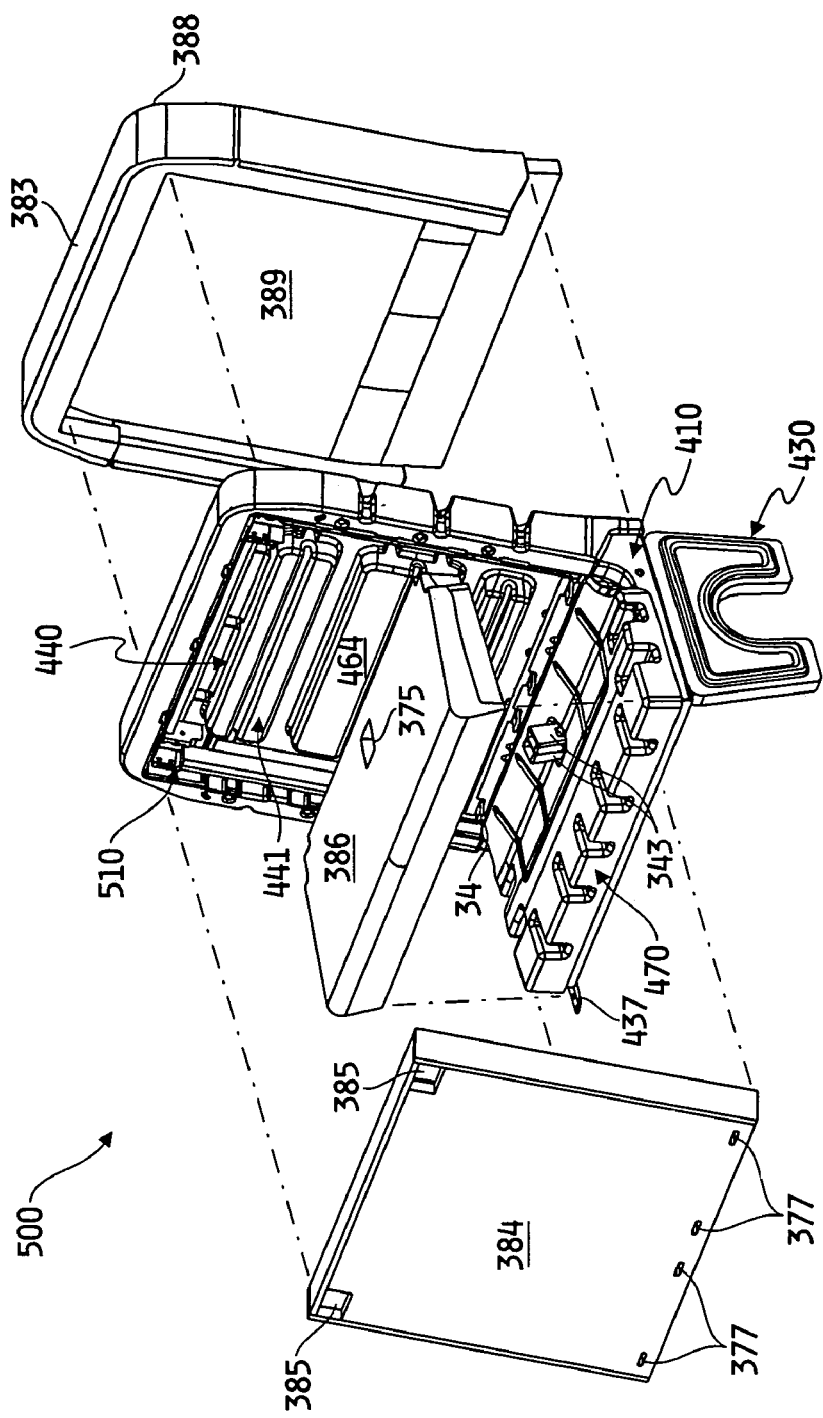
FIG. 28 is an exploded view of the cushion members of the embodiments of FIGS. 18, 21, 27 and 29
Figure 29:
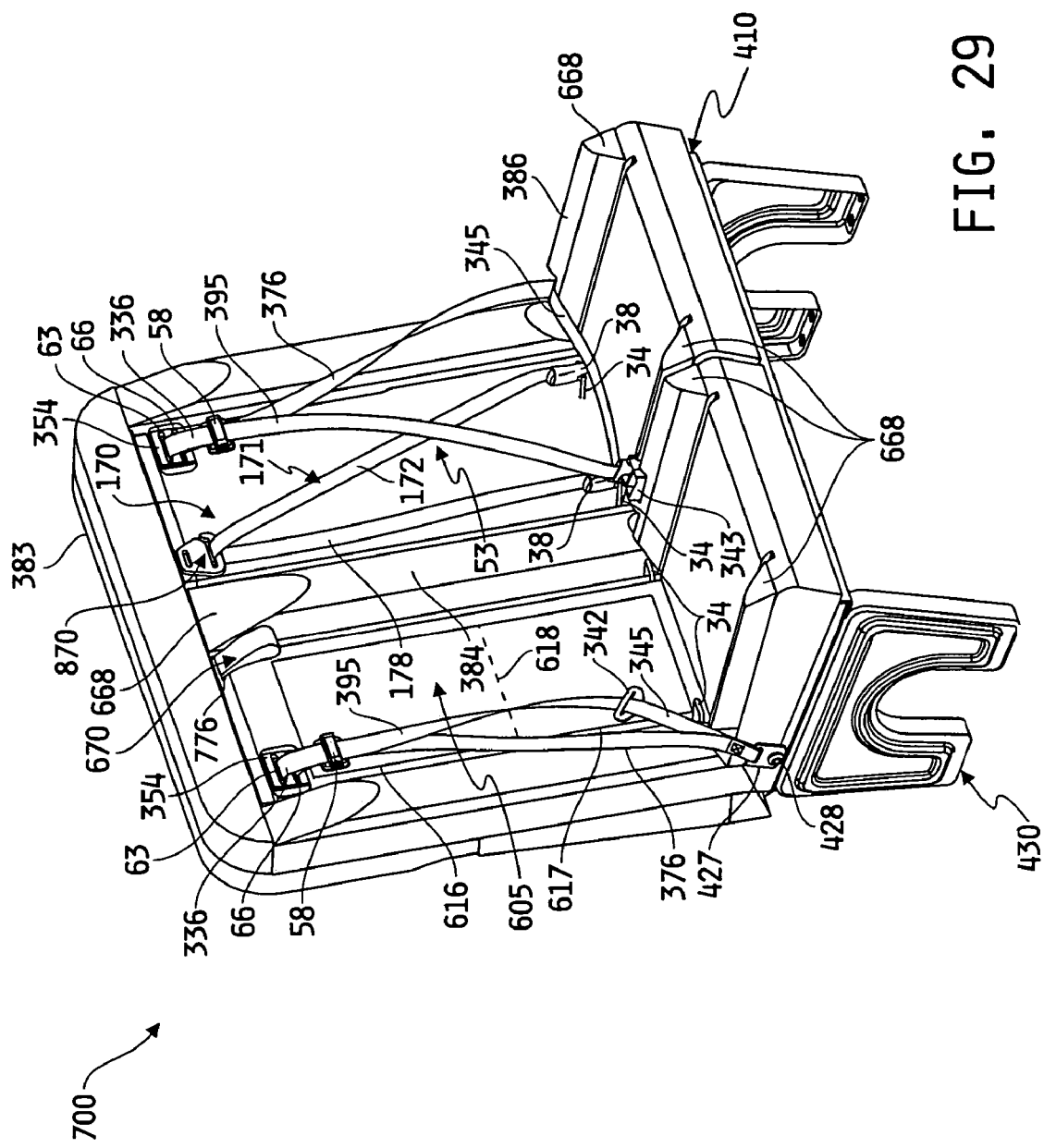
FIG. 29 is a perspective view of another illustrative embodiment of a seat restraint system.

Referring to FIGS. 15 and 27–29, illustrative cushion and upholstery components which are configured for use with the vehicle seat restraint system 400 are depicted. It will be appreciated that these components are configured for use with any of the prior described embodiments 120, 220, 300 and or any of the embodiments 500, 600, 700 disclosed herein below. Similar to seat 300 previously described in conjunction with FIG. 15, illustratively, seat cushion or other enclosure 386 is affixed to and covers or encloses at least a portion of seat member 470 and seat frame 410, passenger restraint cushion or other enclosure 383 is affixed to and covers or encloses at least a portion of to rear surface restraint member 440 and seat frame 410, and center cushion or other enclosure 384 is affixed to and covers or encloses at least a portion of the front surface restraint member 440 and seat frame 410 (FIGS. 27–29). Slots or apertures 385 are provided in cushion 384 for optional web webs to extend through (FIG. 28). Slots or apertures 377 are provided in cushion 384 for optional anchorage members, such as a rigid D-ring or round bar 34, to extend through (FIG. 28). Cushion 383 is indented to receive cushion 384 and restraint member 440 (FIG. 28). However, it will be appreciated that cushion 383 could be configured for use with vehicle seat restraint system 400 to envelope restraint member 440 including its forwardly facing surface 441 thereby eliminating the need for cushion 384 in this embodiment 400.

Each of the cushions 383, 384, 386 may include upholstery of any suitable natural or synthetic material, such as various weights of vinyl, cloth or other fabric, leather or plastic for example. Any such upholstery covering cushion 386 may be attached to inner walls 445, 446, 455 of back panel 440; to the sides, the front portion 472 and the appendage 488 of seat member 470, and to upholstery mounts 530 in the various illustrative embodiments incorporating a seat back frame 510 which will be discussed below, as by, for example, pine tree fasteners, snaps, hooks and loops, rivets, glue or other adhesive, or any other suitable fastener. In addition, the cushions 384, 386 alternatively may be generally flat (FIGS. 17, 27, 28), or may have additional padding or bolsters 668 selectively positioned on and relative to the horizontal seat cushion 386 (FIGS. 15, 16, 29), and/or the vertical seat back cushion 383, 384 (FIG. 29). It will be appreciated that such bolsters 668 generally partition a particular seat, for example seat 700, into a number of individual occupant sections and generally add additional comfort and support to the seat while encouraging positioning. The cushions 383, 384, 386 may be fashioned from any suitable material having cushioning characteristics, such as for example foam. The restraint member 440 and the seat pan 470 may be made of other suitable plastics as well as other suitable metallic, non-metallic, or composite materials using any manufacturing process suitable to the material used.

Thus, the vehicle seat restraint system 400 is a modular system comprising the previously described frame assembly 410, one or more floor mount assembly 430 and/or wall mount bracket 437, restraint panel assembly 440, seat pan 470, and cushions 383, 384, 386. Due to the modular nature of the system 400, individual components may be replaced one at a time in the field. For example, the seat pan member 470 may be disengaged from the frame 410 and a new member 470 coupled to the frame 410. Similarly, a new restraint panel assembly 440 could be slid on to the posts 411, 412 after sliding off an old restraint panel 440. So too, a replacement frame assembly 410 could be installed on vehicle and used with the restraint panel 440, seat member 470 and cushions 383, 384, 386 from the assembly 410 being replaced. Such is the nature with the componentry of below systems 500, 600 and 700.

In operation the vehicle seat restraint system 400 supports and restrains an occupant 397 sitting on the seat and restrains an occupant 396 (FIG. 17) located behind the seat restraint system 400 as follows. The seat member 470, typically in conjunction with cushion 386, defines a generally horizontal plane and supports any occupant 396, 397 sitting directly on the upwardly facing top surface 476 or on the cushion 386, which provides additional cushion and support (FIGS. 27–29). Due to the concave nature of the seat member 470, as a force or pressure is applied to the seat member 470, as from the weight or pressure of one or more occupants sitting on the upwardly facing surface 476, the upwardly facing surface 476 flexes or yields and the protrusions 484, 485 rotate outwardly toward and about respective sideforms 413, 414 and front rail member 415. Because the seat member 470 yields and rotates as described, the seat member 470 provides a certain amount of comfort and allows the thickness of cushion 386 either to be reduced relative to a seat member made from, for example, a flat piece of metal, wood, or particle board, or to be eliminated altogether if desired.

Restraint member 440 similarly supports an occupant, while allowing for reduced foam cushioning. Panel 440 with posts 411, 412 received within respective channels 447, 448 defines a seat back substantially in a generally vertical plane and typically in conjunction with cushion 384 provides support for the back of an occupant 396, 397 sitting on the seat member 470 and leaning back against restraint panel 440 or cushion 384. Forward facing surface 441 in general and the protrusions 464 in specific support the occupant directly or support the cushion 384 and the occupant. The rearwardly facing surface 442 of restraint member 440 typically in conjunction with rearwardly facing surface 388 of cushion 383 provides cushioning and restraint for an occupant 396, 397 sitting in any seat behind the rearwardly facing surfaces 388, 442. As with the seat member 470, the construction of the restraint member 440, with its yieldable plastic and hollow inner core, allows the thickness of cushions 384, 389 to be reduced, or perhaps even eliminated. Similarly, the construction of the restraint member 440 allows for the vertical portion of the frame assembly to comprise the upright posts 411, 412 without any type of upper cross-member or sheet metal which otherwise typically is encased in thick foam. Rather, the restraint member 440 provides sufficient support for the cushion 384, the upright posts 411, 412 and an occupant of the seat while providing sufficient restraint characteristics for an occupant behind the seat. The previously described channels 451–453 and associated walls 445, 446 along with the various protrusions 464, recesses, indentations and notches 443, 444, 449, 450, 457–459 provide rigidity to the restraint member and define respective head, chest and knee crush zones 461, 462, 463. The restraint member 440 is compliant with the passive restraint requirements of FMVSS 222 as will now be explained.

The longitudinally oriented row or system of seats 398 depicted in FIG. 17 is illustrative of seat system 400 similarly oriented. The cushion 383 together with enclosed frame 410 and restraint member 440 form a passenger restrainer for an unbelted passenger 396 or a belted passenger 397 sitting in any seat 300, 400 situated behind any other seat 400. Therefore, as explained above, when a passenger 396, 397 sitting behind a seat 400 applies a force forwardly toward rearwardly facing surface 388 of seat 400, as in the event of a forward-impact crash, then the restraint member 440 and perhaps the upright posts 411, 412 deform, thereby absorbing at least a portion of the energy of the forwardly moving passenger 396, 397. The phantom rendition of cushion 383 in FIG. 17 depicts the cushion 383 prior to contact by the forwardly moving passenger 396.

Thus, in operation, when a forwardly directed force is applied to the rearward facing portion of cushion 388, the restraint system 400 will deform to absorb and dissipate at least a portion of the force. For example, when a passenger or occupant 396 in a seat disposed behind (FIG. 17) a seat 400 equipped with restraint member 440 is forced forwardly, as by the occupant's vehicle crashing into a vehicle in front of the occupant's vehicle, into the rearward facing portion 388 of cushion 383 and continuing into the rearward facing portion of restraint member 440, the restraint member 440 deforms or yields at the point of impact to absorb at least a portion of the energy generated by the forward movement of the occupant 396. Depending on the amount of energy generated, the restraint member may continue to deform beyond the point of impact and eventually transfers the load to the upright posts 411, 412. Upright posts 411, 412 are sufficiently rigid to hold the restraint member 440 in a generally vertical position, but sufficiently weak to deform when sufficient force is applied thereto in compliance with the passive restraint deformability standards of FMVSS 222. Therefore, upright posts 411, 412 will deform, for example by bending or twisting, and further absorb and transfer at least a portion of any remaining energy to the floor mount assembly 430, which in turn will absorb and dissipate at least a portion of any remaining energy. Finally, any remaining energy would be transferred to and dissipated by the floor of the vehicle, and/or, if a wall mount 437 is used, the side wall of the vehicle.

In addition to restraining any rearward occupant 396 by generally absorbing and dissipating the energy of a forward moving occupant 396, the restraint member 440 protects the occupant 396 in the specified energy absorbing crush zones 461, 462, 463 through the use of recesses. Illustratively, the protrusions and recesses adjacent to the bottom of panel 440, which is opposite to top wall 456 of the panel 440 and which is movably adjacent seat member 470, define in the rear surface 442 a knee crush zone 465 with a particular energy absorbing characteristic. For example, recesses 450 not only guide and retain the posts 411, 412 in channels 447, 448, but also cushion the area so that an occupant's knees do not impact the posts 411, 412. Similarly, recesses 457 are located and constructed so as to provide impact protection between an occupant's knees and a seat back frame 510 which will be described below. Also, recesses 444 are positioned and constructed to provide impact protection between an occupant's knees and the lower portions of frame 410 as well as the lower portions of the to-be-discussed seat back frame 510. The top walls 455, 456 and forward and rearward facing surfaces 441, 442 adjacent the top of the panel 440 cooperate with each other and with the recesses 458 generally to define the head crush zone, which not only restrains an occupant's head, but also provides protection between the occupant 396 and a top cross-bar member 514 of the to-be-discussed seat back frame 510. The head crush zone may have energy absorbing characteristic different from that of the knee crush zone. In the event of a rear impact, an occupant 397 sitting on seat member 470 would be forced rearwardly into the restraint member 440, which similarly would deform to absorb some of the energy of the rearward moving occupant 397, and, depending on the amount of energy generated, would transfer any excess energy or load to the posts 411, 412, which in turn would deform and transfer any further excess energy to the floor mount assembly 430. In addition, because the restraint member 440 envelopes the upright posts 411, 412, restraint and frame 410 impact protection is provided for impacts with the side of the restraint member 440, for example, from a person standing or walking down the vehicle's aisle, or from a person sitting in a seat lateral or oblique to the restraint member 440. The chest crush zone 462 would be located between the head 461 and knee 463 crush zones and may have energy absorbing characteristics that may differ from either of the head 461 or knee 463 zone characteristics, all as established by the applicable standard, such as for example a private standard or a governmental standard such as FMVSS 222.

It will be appreciated that although the crush zones 461–463 have specific names, such as head zone 461, chest zone 462 and knee zone 463, the occupant's body part that is actually restrained or protected can vary depending on the size and orientation of the occupant 396 as partially illustrated in FIG. 17. Those skilled in the art will also appreciate that the restraint member 440 and the seat member 470 could be configured for use with the previously described systems 120, 220, 300 or with existing conventional vehicle seats.

In the below embodiments 500, 600, 700, similar passive energy management and dissipation will take place when a rearwardly directed force is applied to cushion 384, as when an occupant 396, 397 is forced against cushion 384 as in a rear impact. In such a case, the cushion 384 and restraint member 440 again will absorb at least a portion of the energy generated by the rearward movement of the occupant 396, 397. Depending on the amount of energy generated, the restraint member may continue to yield beyond the point of impact and eventually transfers the load to the upright posts 411, 412, which will yield as described above and further transfer at least a portion of any remaining energy to the floor mount assembly 430, which in turn will dissipate at least a portion of any remaining energy.

Figure 22:
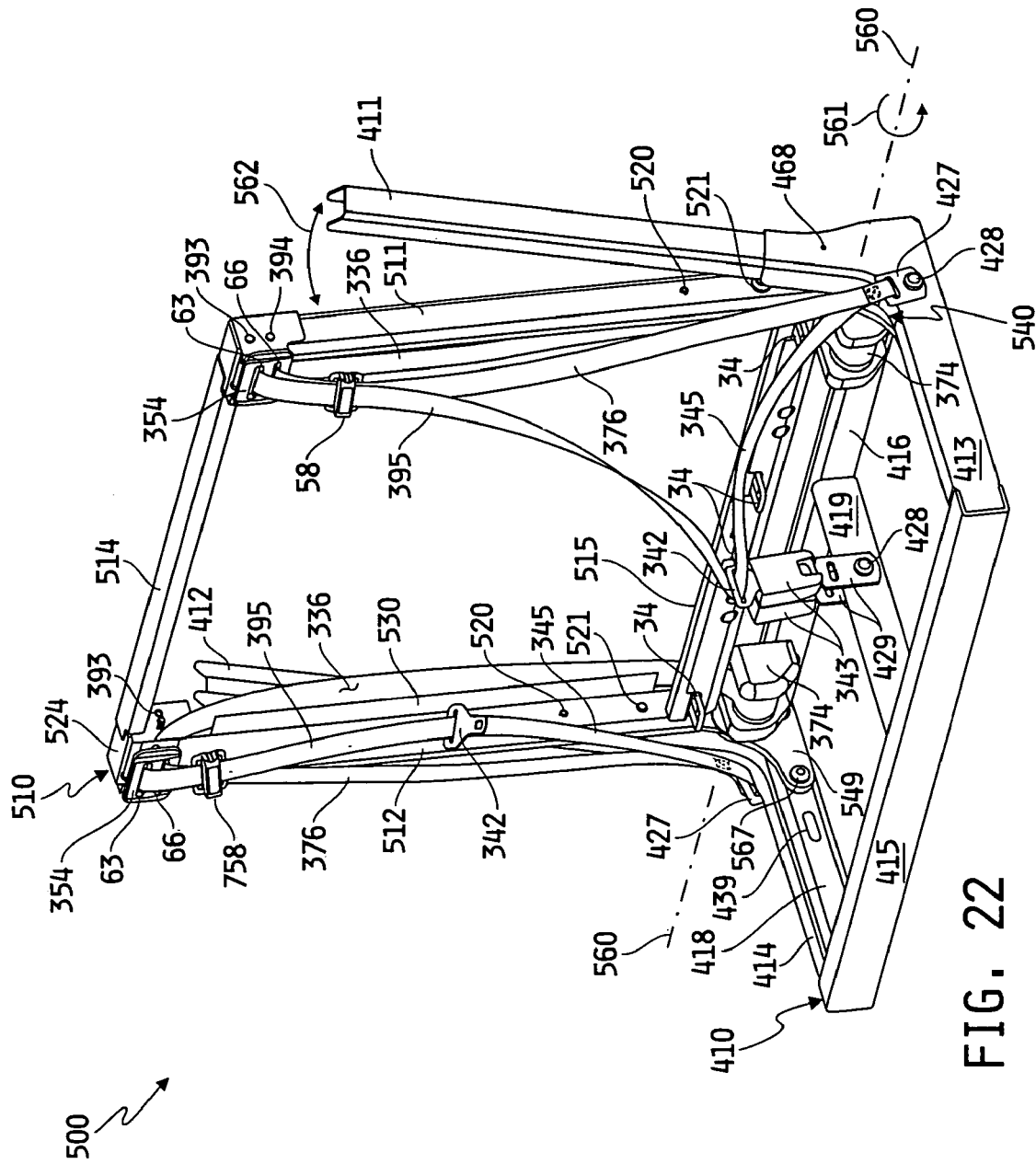
FIG. 22 is a front perspective view of the illustrative embodiment of FIG. 21.

As best seen in FIGS. 22 and 28, another embodiment of a vehicle restraint system 500, illustratively configured for use with passengers or occupants 396, 397 ranging in size from infants to children to adults or any combinations thereof, is depicted. Vehicle restraint seat system 500 comprises the previously described frame assembly 410, floor mount assembly 430, restraint member 440, seat member 470, passenger restraint cushion 383, center cushion 384, and seat cushion 386, all of which are constructed and operate substantially as explained above with respect to system 400. Accordingly, only those aspects of seat system 500 which differ from seat system 400 will now be described.

Vehicle restraint system 500 further comprises a seat back frame 510, one or more restraint web belts or harnesses 336 and an optional height-adjuster guide belt 376 and associated height adjuster 58. Seat back frame 510 illustratively comprises a pair of spaced-apart and parallel vertical upright members or tubes 511, 512, a top cross-bar member 514, a bottom cross-bar member 515 which is spaced apart from and generally parallel to top cross-bar 514, and a pair of open-faced box construction assemblies 524. One box construction 524 is coupled to the upper end of upright member 511 and one end of top cross-member 514. The other box construction 524 is coupled to the upper end of upright member 512 and another end of top cross-member 514. Opposing ends of bottom cross-bar member 515 are coupled one each to the respective lower ends of the upright members 511, 512. As assembled, cross-bars 514, 515 are generally perpendicular to and sandwiched between upright members 511, 512 thereby giving seat back frame 510 a generally square to rectangular shape. Each of the components 511, 512, 514, 515, 524 of the seat back frame 510 illustratively are coupled together using spot welds, although other couplings may be used such as seam welding, rivets, bolts, screws and the like.

Figure 24:
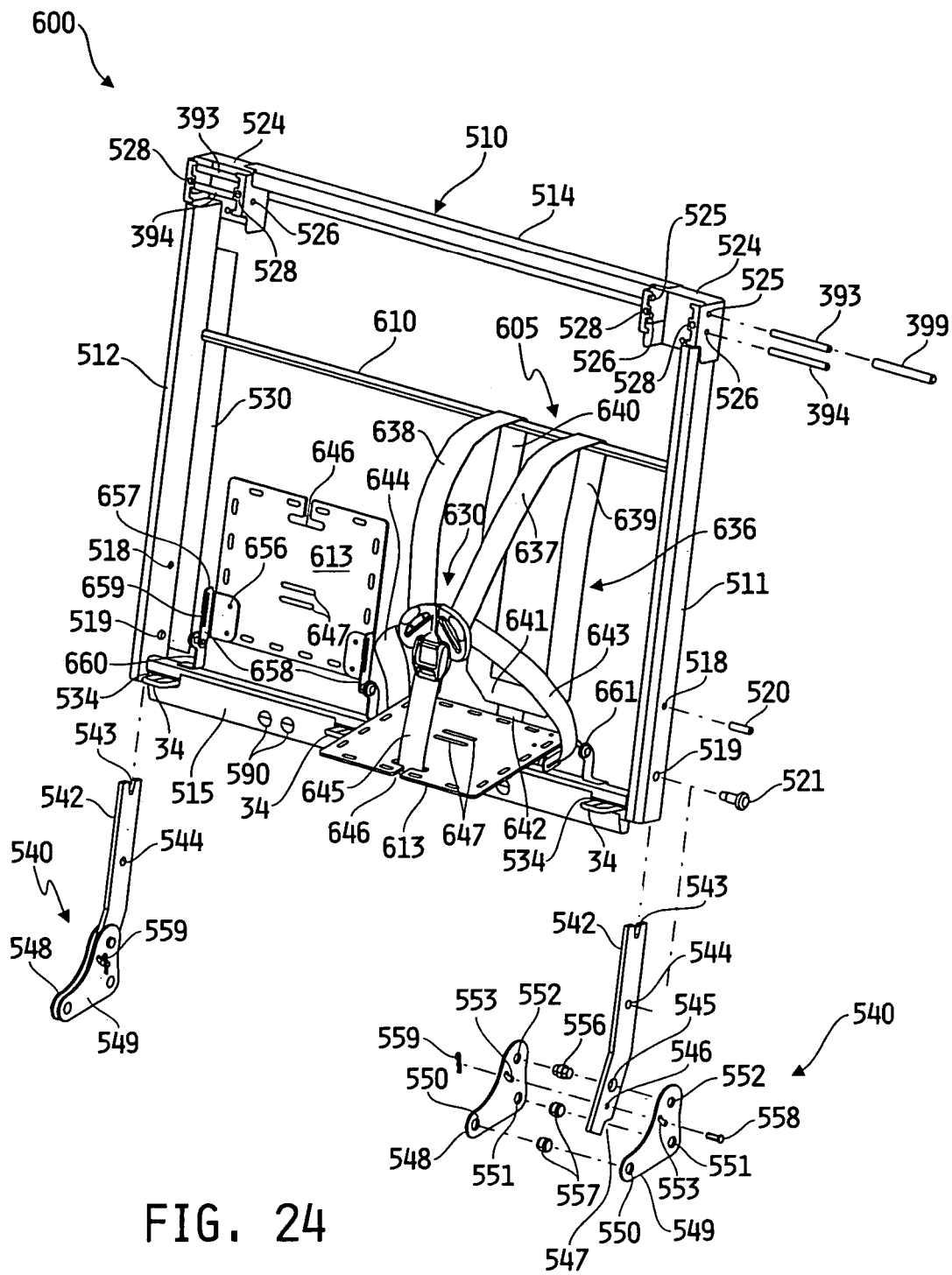
FIG. 24 is perspective view of another illustrative embodiment including a partial exploded view of the pivot mechanism of FIG. 23 and of a restraint mounting portion.

Illustratively, each of the upright members 511, 512 have a generally rectangular to ovate cross-section and are formed by rolling a high-strength, low-alloy steel, which is then seam welded to form the tubes 511, 512. The upright members 511, 512 each may include a plate or mounting member 530 configured to mount any upholstery covering cushion 384 and further includes apertures 518, 519 configured to mount the frame 510 to a pivot mechanism 540 (FIG. 24). Bottom cross-bar member 515 also has a generally rectangular to ovate cross-section and is formed by rolling and seam welding. It is illustratively fashioned out of low-carbon steel and includes anchorage mounting areas 534 configured to mount anchorages 34, such as for example a round bar or D-ring which may be compliant with FMVSS 225, and apertures 590 configured to mount a retractor 692 as will be explained. Anchorages 34, illustratively, are configured to transfer to the vehicle structure any loads generated by a child restraint system or other restraint system coupled to the anchorages, and are welded to the mounting areas 534, although alternative coupling methods may be used. Top cross-bar member 514 is illustratively stamped from stainless steal to form a generally rotated V-shaped member. The box construction 524 is stamped from a high-strength, low-alloy steel. It will be appreciated that the upright members 511, 512, the cross-members 514, 515, and the box construction may be made of any other suitable metallic, non-metallic, or composite material by any method of manufacture suitable for the material being used.

Each box construction assembly 524 is configured to mount restraint harness webs 336, 376 and formed to include an open face, an open bottom, upper and lower side apertures 525, 526, and front apertures 528 (FIG. 24). Upper aperture 525 is configured to receive bearing member 393. A movable member or roller member 399 is configured to fit over bearing member 393 to facilitate movement of belt 336 over bearing member 393. Lower aperture 526 is adapted to receive mounting member 394. Illustratively, bearing member 393 and mounting member 394 have a circular cross-section and may be, for example, a pin, peg, dowel, or spindle, although other mounting pieces of suitable shape and size may be utilized.

Referring to FIG. 22, restraint harness 336 optionally is affixed or mounted on either or both sides of frame 410 and seat back frame 510 as follows. A web retractor 374 is attached via apertures 421 to rear tubular member 416 using any suitable coupling, such as a bolt, rivet or screw, etc. (FIG. 22). A suitable retractor 374, for example, is an RLS-80 Retractor available from Indiana Mills & Manufacturing, Inc. under part number A35021. The retractor houses web belt 336, which extends upwardly away therefrom and through an optional web guide 531 (FIG. 21). The optional web guide 531 is mounted to seat back frame 510, vertically extending between box construction 524 and bottom crossbar member 515, and is configured to encase and guide web 336 to and from the retractor 374. In the alternative, seat frame channels 451, 452 are also configured to guide web 336 to and from the web retractor 374. In either event, web 336 continues upwardly and around movable member 399 which encases bearing member 393 (FIG. 24) and outwardly through slot 63 in bezel plate 354 (FIG. 22). Web 336 continues downwardly from the bezel plate 354 until its distal end attaches to frame assembly 410 using web mounting plate 427 and bolt 428, or other suitable coupling such as a screw, rivet or nail. Tongue 342 is slidably mounted to web 336 and is lockingly engagable with buckle 343, in turn attached by buckle mounting member 429 and bolt 428, or other suitable coupling, to cross-strut member 419. Mounting member 429 illustratively is a metal plate, although other suitable non-metallic or composite members, such as a length of web, could be used to couple the buckle 343 to cross-strut 419. An optional guide web 376 is also mounted by web mounting plate 427 and bolt 428 or other suitable coupling to frame assembly 410 at either of the sideforms 413, 414. Web 376 extends from mounting plate 427 upwardly through slot 66, around mounting member 394 and back on itself in order to mount to mounting member 394 by, for example, stitching, melting, glue, hook and loop, snaps, or other suitable coupling means. Restraints 336 and 376 may be affixed or mounted to the seat frame 410 and seat back frame member 510 in other suitable ways as well. For example, the web 336 may proceed downwardly from bearing member 393 and through an aperture in mounting plate 427 and then upwardly away therefrom and back on itself for stitching to itself, with the end of web 376 distal from mounting member 394 sandwiched and stitched between the two portions of web 336.

Height adjuster 58 is slidably mounted to and associates together restraint harness webs 336 and 376. Height adjuster 58 is configured to associate belts 336 and 376 and slides up and down their length to adjust the position of the belts 336 and 376 about the occupant's shoulder. As depicted on the right side of seat back frame 510 illustrated in FIG. 22, when tongue 342 and buckle 343 are releasably and lockingly engaged, they form a three-point restraint system. Referring to the left side of FIG. 27 and the right side of FIG. 29, then, engaging the tongue 342 and the buckle 343 forces the web 336 across the torso and the lap of an occupant 397 (FIG. 17) in order to restrain the occupant and maintain the occupant in a secured relation with the frame 410 and the seat back frame 510 upon impact of the vehicle. Restraint 336 therefore comprises a lap portion 345 and a torso or chest portion 395. Other conventional web restraint systems fall within the scope of this disclosure.

Figure 23:
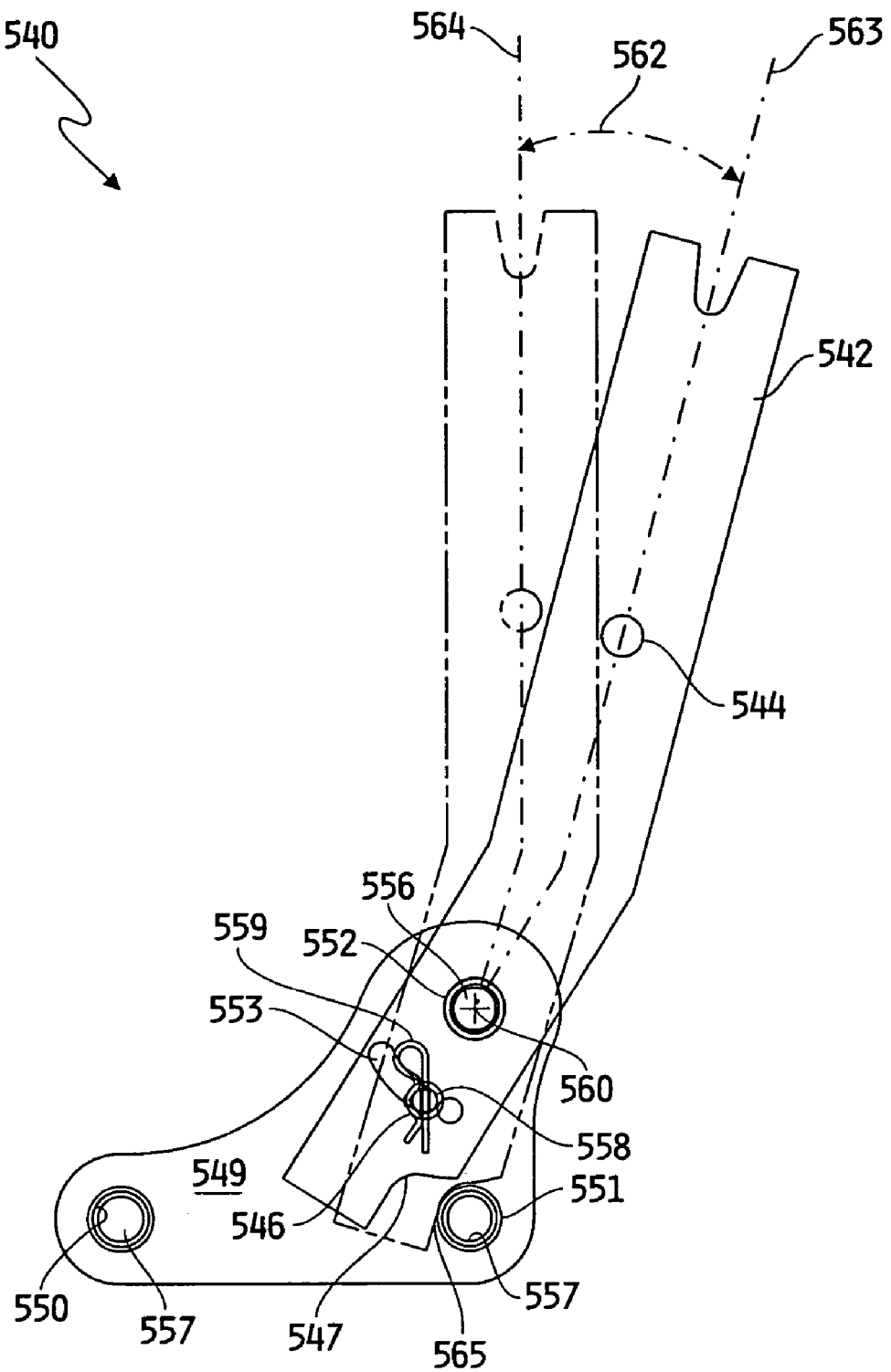
FIG. 23 is a side schematic view of an illustrative pivot mechanism of the illustrative embodiment of FIGS. 21 and 22.

Referring to FIGS. 23 and 24, pivot mechanism 540 comprises strut 542 and a pair of spaced-apart plates 548, 549. Strut 542, illustratively is formed from any suitable metallic material into a generally elongated but elbow-like shape and formed to include a notch 543, a stop portion or shoulder 547, and apertures 544–546. Each plate 548, 549 is formed from any suitable metallic material into a generally L-shaped piece including a plurality of apertures 550–552 and an arcuate slot or channel 553. The strut 542 is movably coupled to and sandwiched between the plates 548, 549 as follows. A rivet 556 passes through aperture 552 of each plate 548, 549 and through aperture 545 of strut 542 to movably mount the strut 542 to the plates 548, 549. Each strut 542 moves on rivet 556 about its axis 560. Movement of strut 542 relative to plates 548, 549 is restricted, as will be explained, by the restraint member 440 and by a frangible retaining member or shear pin 558, which passes through the channel 553 of each plate 548, 549 and through aperture 546 of strut 542. Shear pin 558, which illustratively will yield or shear under a force of about 700 pounds, is held in position by cotter or bridge pin 559. Hollow mounting rivets 557 pass through apertures 550, 551 in each of the plates to further couple the plates 548, 549 together. It will be appreciated that other frangible stop means may be used such as described above.

As noted above, the pivot mechanism includes axis 560 (FIG. 22) generally defined through solid rivet 556 (FIGS. 22 and 23). As best seen in FIG. 23, in the normal configuration the shear pin 558 is disposed in the lower end of arcuate channel 553 thereby restricting forward movement 561 (FIG. 22) of the strut 542 relative to the plates 548, 549. When sufficient forwardly force is applied to the strut 542, the shear pin ruptures and allows the strut to move in a forwardly direction 561 (FIG. 22) about axis 560 until the stop portion 547 contacts the rivet 557 disposed in stop aperture 551 as shown in phantom in FIG. 23. Thus, the maximum angle 562 of forward travel between the normal position 563 of the strut's longitudinal axis and its forwardmost position 564 substantially is determined by the configuration and disposition of the stop portion 547 and the stop aperture 551. It is desirable for this angle of movement, typically a pivot angle 562, to be an acute angle. For example, an angle of between about 10 to 22 degrees is desirable. It may be more desirable to have a pivot angle of about 15 degrees. When a reawardly directed force is applied to the strut 542, the strut 542 moves rearwardly about axis 560 as the shear pin 558 moves to the upper end of the arcuate channel until the shear pin contacts the end of the channel 553. Depending on the magnitude of the rearwardly directed force, the shear pin 558 will either halt the rearward movement of the strut 542 upon making contact with the end of the channel, or will rupture, allowing the strut to continue to move rearwardly about the axis 560 until the strut 542 contacts (not shown) the opposite side of rivet 557. As will be explained, this rearward movement is modified somewhat when the pivot mechanism 540 is integrated into the restraint system 500.

The integration of the pivot mechanism 540 will now be described. As best seen in FIG. 24, the seat back frame member or assembly 510 is coupled to the pivot mechanism 540 by slipping the upright members 511, 512 over the struts 542 until a spring pin 520, which is lodged in apertures 518 in each upright 511, 512, makes contact with notch 543. The spring pin 520 defines the degree to which the struts 542 may be inserted within the uprights 511, 512, and thereby aligns aperture 519 in each upright member 511, 512 with aperture 544 in each respective strut 542. Self-tapping bolt 521 is inserted through aligned aperture 519 in respective upright member 511, 512 and aperture 544 in each strut to couple together the seat back frame 510 and the pivot mechanism 540. The strut 542 and the plates 548, 549 are non-handed, in that plate 548 is interchangeable with plate 549, and the pivot mechanism 540 may be mounted either to right upright member 511 or to left upright member 512. It will be appreciated that the plates 548, 549 and the strut 542 may be made from any suitable metallic, non-metallic, or composite material using any manufacturing method suitable to the chosen material. Similarly, the above described couplings could be accomplished with any suitable coupler, such as for example, a bolt, screw, nail, rivet and the like.

Referring to FIGS. 21 and 22, the attaching together of frame assembly 410, via pivot mechanism 540, and seat back frame 510 is depicted. Illustratively, a mounting coupling, such as for example a bolt 567, is inserted through each of the hollow mounting rivets 557 (FIG. 24) and into apertures 423 (FIG. 19) of cross-struts 417, 418. Apertures 423 may be extruded such that no nut is needed. Alternative couplers, such as a rivet, screw, or nut and bolt may be used. When so attached, the seat back frame 510 normally lies substantially in the plane defined by upright members 411, 412 (FIG. 26) and extends through the horizontal plane defined the sideforms 413, 414, it being appreciated the seat back frame 510 could be configured for use with other embodiments described herein. Because frame 510 and pivot mechanism 540 are coupled together, frame 510 is movably attached to frame 410 and will move or pivot in a forwardly direction 561 about axis 560 away from front surface 441 and toward seat member 470 in an amount substantially depicted by angle 562 and relative to frame 410 upon a vehicle impact of sufficient severity. The front surface 441 of restraint panel 440 is configured to receive therein the seat back frame 510.

Referring to FIGS. 21, 25 and 28, when seat back frame 510 is in its normal position, it is disposed adjacent to and forward of restraint member 440 with upright members 511, 512 generally disposed within respective channels 447, 448 and top crossbar member 514 generally disposed within channel 453. It will be appreciated therefore, that the previously described rearward movement of the struts 542, and hence the seat back frame 510, initially is restricted by the restraint member 440 as supported by upright posts 411, 412. As previously described, the restraint member 440 is formed with indentations and recesses, for example cone indentations 457, that cushion the frame 510 from impact. Substantially as previously described with seat system 400, cushions 383, 384, 386 also cushion and support passengers and cushion the frame 510 and the other components of seat system 500 as illustrated, for example in FIGS. 27 and 29. Cushion 384 covers the front surface 441 and seat back frame 510. However, as best seen in FIG. 28, in seat system 500 cushion 384 is further configured to enclose frame 510 and move substantially as a unit therewith in substantially the same manner as depicted and described in FIGS. 16 and 17, and as will now be explained further.

The longitudinally oriented row or system of seats 398 depicted in FIG. 17 is illustrative of seat systems 500 similarly oriented. As described with seat restraint system 400, which is included within seat system 500 and operates substantially in the same manner therein, the cushion 383 together with enclosed frame 410 and restraint member 440 form a passenger restrainer for an unbelted passenger 396 or a belted passenger 397 sitting in any seat 300, 400, 500 situated behind any other seat 500. Therefore, as explained above, when a passenger 396, 397 sitting behind a seat 500 applies a force forwardly toward rearwardly facing surface 388 of seat 500, as for example in the event of a forward-impact crash, then the restraint member 440 and perhaps the upright posts 411, 412 deform, thereby absorbing at least a portion of the energy of the forwardly moving passenger 396, 397.

As previously explained, and as represented by FIGS. 16 and 17, if a forwardly moving passenger 397 is wearing a seat belt restraint 336, then the force of a crash will lock the deceleration-sensing retractors 374 and move the passenger 397 against web belt 336 with force sufficient to rupture shear pin 558, or other frangible retaining means known to one skilled in the art, allowing seat back frame 510 and associated enclosing cushion 384 to pivot forwardly independent of frame 410 and restraint member 440 until a stop mechanism, such as the stop portion 547 of each strut 542 contacting the rivet 557, stops the forward movement of seat back frame 510 and cushion 384. As previously noted, although the belt 336 absorbs some of the passenger's 397 forward momentum, it will be appreciated that, depending on the size of belted passenger 397 and the force that passenger 397 applies on the web 336, the passenger 397 may or may not impact surface 388 in a crash. It will also be appreciated that the frangible retaining means 558 may be designed to rupture at varying amounts of force other than the illustrative 700 pounds noted above. The illustrative 700 pounds typically may be generated by a six-year old of average weight being moved by a frontal impact forwardly against a web 336 of an engaged 3-point restraint system. Also, because the forward movement of frame 510 and cushion 384 is independent of frame 410 and restraint member 440, frame 410, restraint member 440 and associated cushion 383 remain in place to absorb at least a portion of the energy of a passenger 396 or 397, whether belted or not, sitting in the seat behind the seat of a belted passenger 397. The phantom rendition of cushion 383 in FIG. 17 depicts the cushion 383 prior to contact by the forwardly moving passenger 396.

Seat restraint system 500 will not cause substantial additional stiffness to the seat back when the occupant of seat 500 is unbelted or the seat 500 is unoccupied and thus, maintains the passive energy management capability embodied in seat 400 for any occupant 396, 397 located behind seat 500. Thus, if a passenger 396 is not wearing a belt 336, then a crash will not force the passenger 396 against the web 336 and the retaining means 558 will therefore not break. In such a case, seat back frame 510 and cushion 384 will remain substantially within restraint member 440 and cushion 383 thereby pivoting forwardly with restraint member 440 and upright posts 411, 412 and cushion 383 in the event that a passenger sitting behind impacts the rearwardly facing surface 388. Similarly, if a passenger is sitting behind an empty seat 500 and applies forward pressure against the rearwardly facing surface 388 of that empty seat, then frame 510 and cushion 384 will remain substantially within restraint member 440 and cushion 383 and will not substantially impede the movement of, but rather, will move forward with, restraint member 440 and upright posts 411, 412. Neither will the frame 510 and cushion 383 substantially impede rearward movement of the restraint panel 440 when the restrained or unrestrained occupant is forced rearward into the seat back during impact. Rather, the seat back frame 510 and cushion 384 will remain substantially within restraint member 440 and cushion 383 and will not substantially impede any rearwardly movement of, but rather will move rearwardly with, restraint member or panel 440 and upright posts 411, 412 in the event of a passenger being forced against cushion 384 by a rear impact crash of sufficient force. Moreover, once a rearwardly directed force is applied to the seat back frame 510, the frame 510 will move rearwardly without adding appreciable resistance to the coincident rearward movement because of the fact that the arcuate shaped channel 553 allows the shear pin 558 to move freely therein until reaching the end of the channel 553. If the rearward force is sufficient to move the seat back frame 510 and restraint member 440 rearwardly such that illustrative shear pin 558 moves to the upper portion of channel 553, then the shear pin will break with any force in excess of said sufficient force and continue rearwardly until stopped as described above, or by upright posts 411, 412.

As just described, seat restraint system 500 maintains the passive restraint characteristics of seat restraint system 400 and combines it with the active restraint characteristics offered by the harness 336 and movable seat back frame 510. As with seat restraint system 400, the seat restraint system 500 also preserves the under seat clearance for cleaning, maintenance and other vehicle features. Those skilled in the art will appreciate that the seat back frame 510 and harness 336 could be configured for use with the previously described systems 120, 220, 300 or with existing vehicle seats.

FIGS. 24–27 and 29, depict another embodiment of the invention. Vehicle seat restraint system 600 comprises the previously described frame assembly 410, vehicle mounts 430, 437, restraint member 440, seat member 470, passenger restraint cushion 383, center cushion 384, seat cushion 386, seat back frame 510, one or more restraint web belts 336, and the optional height-adjuster guide belt 376 and associated height adjuster 58, all of which are constructed and operate in conjunction with vehicle seat restraint system 600 substantially as explained above with respect to vehicle seat restraint system 500. Accordingly, only those aspects of seat system 600 which differ from seat system 500 will now be described.

Figure 26:
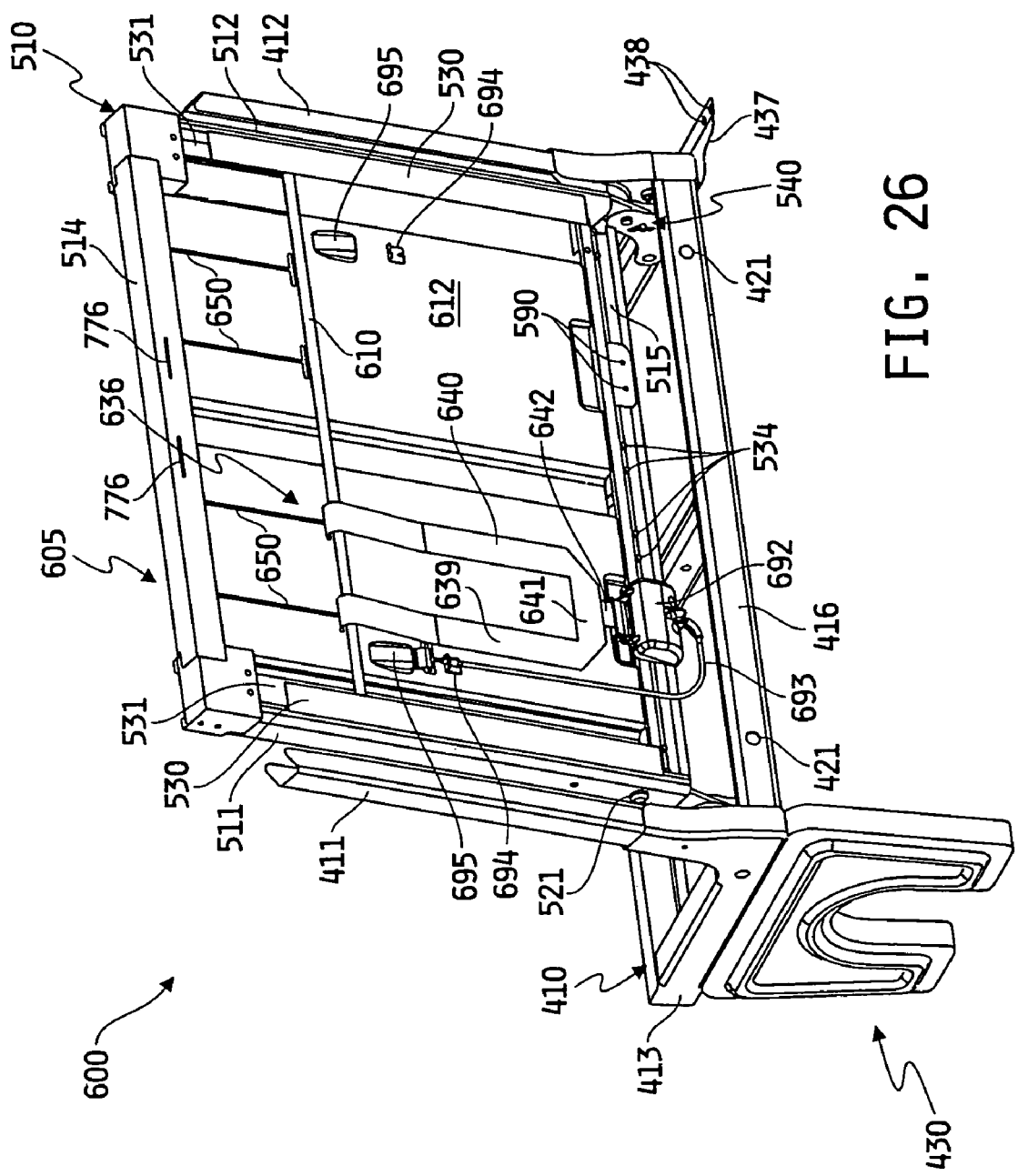
FIG. 26 is a back perspective view of the illustrative embodiment of FIG. 24.

Seat restraint system 600 further comprises an integrated child seat or built-in child restraint system 605, which illustratively is configured to restrain a child ranging in size from about 17 to 55 pounds. Referring to FIG. 24, a seat back frame 510 is illustrated showing portions of two child restraint systems 605. As best seen in FIGS. 24–26, integrated child restraint system 605 comprises a child restraint harness 636, a child-restraint harness support crossbar 610, a child restraint harness mounting back member 612, a seat base or portion 613, a retractor 692, a release mechanism or cable 696, upper cushion cut-out portion 616, and lower cushion cut-out portion 617 (FIGS. 27 and 29). Support crossbar or transverse bar 610 and back member 612 are provided on seat back frame 510 and are configured, in cooperation with seat base 613, to mount and support a portion of the child restraint harness 636 between the seat back frame 510 and the seat base 613 (FIGS. 24–26). Transverse bar 610 is affixed to opposite ends of this seat back frame member 510 and may be disposed in another horizontal channel 454 formed in restraint member 440. It will be appreciated that the front surface 441 of panel 440 is configured to receive therein seat base 613 and back member 612, but may have to be modified as would be apparent to and within the capacity of one skilled in the art in order to accommodate the back member 612.

As best seen in FIG. 24, seat base 613 illustratively is formed from plastic into a generally square shape having crotch-web guide aperture 646 and crotch-belt mounting apertures 647. Additional apertures may be formed around the periphery of the seat base 613 and configured to attach upholstery. It will be appreciated that seat base 613 may be of other sizes and shapes and fashioned out of any other suitable metallic, non-metallic, or composite material. A mounting plate 656 is mounted to each side of the seat base 613 distal from the crotch aperture 646. Each mounting plate 656 is coupled by pivot pin 661 to respective pivot brackets 660 mounted to bottom crossbar member 515 of seat back frame 510, and includes an ear 658 having a belt guide aperture 659. Brackets 660 may be mounted to the bottom crossbar member 515 by any suitable coupling including, for example, rivets, nuts and bolts, welding, screws, nails, snaps, and pine-tree fasteners. Thus, seat member 613 is movably mounted to seat back frame 510 adjacent its seat member 470, illustratively pivoting about pivot pins 661 relative to seat back frame 510. For example, FIGS. 24 and 25 show the seat base in an up or retracted position, with its upwardly facing surface adjacent and generally parallel to back member 612 (FIG. 25). FIG. 24 further shows an additional seat base 613, only in the down or extended position, wherein its upwardly facing surface is generally perpendicular to back member 612. FIG. 27 illustratively depicts the seat base 613 in transition between the retracted and extended positions moving for example downwardly toward the adjacent seat member 470 to form a child seat.

Referring to FIGS. 24–27, restraint harness 636 is affixed to seat base 613 and to seat back frame 510 and comprises coupling assembly 630 and one or more restraint webs conceptually divided into two shoulder portions 637, 638, two back portions 639, 640, a transition portion 641, retractor portion 642, two lap portions 643, 644, transition portion 648, and a crotch portion 645. Retractor 692 operatively houses web portion 642, which proceeds upwardly away therefrom and is coupled to transition portion 641. Back portions 639, 640 are coupled to opposite ends of transition portion 641 and proceed upwardly away therefrom and up and over transverse cross-bar 610 and through inverted T-shaped mounting apertures or slots 650 in mounting back member 612 (FIG. 26). Shoulder or torso portions 637, 638 proceed downwardly away from mounting back member 612 and through respective tongues 631, 632 (FIG. 27), which are slidingly disposed on the web. Lap portions 643, 644 proceed downwardly away from the tongues 631, 632 and through respective guide apertures 659 formed in ears 658 included in flange 657 of mounting plate 656 on the bottom of seat portion 613 (FIGS. 24–25). Once under seat portion 613, the lap portions 643, 644 are coupled by transition portion 648 (FIG. 25). It will be appreciated by those skilled in the art, that the web portions could be one or more webs coupled together, or, excluding retractor portion 642, could be a single web in an endless loop. A crotch belt or web 645 is mounted at one end to seat base 613 by looping through apertures 647 back on itself for coupling by, for example, stitching, or other suitable means such as hook and loop, glue, cement, rivets, or melting. Alternatively, the web 645 may loop back and be coupled (not shown) to the transition portion 648 as by, for example stitching. The other end of crotch web 645 is connected to a buckle 632 (FIG. 27).

When the seat base is in the retracted position, the crotch belt generally hangs loosely from the apertures 647 (FIG. 25). When the seat base 613 is in the extended position the crotch web 645 extends from the apertures 647 up through the generally T-shaped guide aperture 646. The coupling assembly 630 comprises the tongues 631, 632 and the buckle 632, which are lockingly and releasably engageable with one another. A suitable coupling assembly is, for example, an CBRX-HS system available from Indiana Mills & Manufacturing, Inc. under part number A30950B. As just described, the restraint harness 636 comprises a five-point restraint harness system which maintains an occupant of the child seat secured to seat base 613 and to seat back frame member 510 upon impact of the vehicle. It will be appreciated that a four-point restraint system or other multiple-point harness restraining system falls within the teaching of the embodiment. Such systems 605 are typically configured for child occupants weighing in a range of about 17 to 55 pounds for use with the restraint harness 636. Because the restraint harness 636 is mounted to the seat back frame 510, if an occupant of the child restraint system 605 were thrown against the harness 636 with sufficient force, as would occur for example in a crash, then the seat back frame 510 and cushion 384 would move forwardly about the axis 560 as described for seat system 500 above, while leaving in place the restraint member 440, and the upright posts 411, 412. Otherwise, the operation and functioning of the seat back frame 510 and the restraint member 440, etc. are as described above in conjunction with seat system 500.

Referring to FIG. 27, the embodiment of FIG. 24 is shown with the cushions 383, 384, 386 operationally attached as previously described for restraint systems 400 and 500. Shown in phantom on the left side of FIG. 27 are the cushion cut-out portions 616, 617 of cushion 384 affixed to the retracted seat base 613 shown on the left side of the seat in FIG. 24. More specifically, upper cushion 616, having an inwardly facing surface 619, and lower cushion 617 are substantially square to rectangular in shape and are adjacent one to the other, coupled by, for example a fabric hinge 618, which may be created by upholstering the cut-outs 616, 617 with a single piece of upholstery as known to those skilled in the art. In operation, upper cushion 616 folds or pivots about hinge 618 down over lower cushion 617, with its normally outwardly facing surface adjacent to the normally outwardly facing surface of cushion 617. Next, the substantially coextensive cushions 616, 617 continue to pivot downwardly about pivot pin 561 until the normally inwardly facing surface 619 of upper cushion 616 is resting upon cushion 386. In this extended configuration, the restraint harness 630 is deployed for operational use on an occupant, and the depth of the deployed cushion portions 616, 617, extending from the seat bight outwardly away therefrom, is illustratively about 12 to 13 inches, it being appreciated that the depth of the cushion portions could be lesser or greater. In the restraint system's 605 retracted position, the seat base 613 is received within the cushion 384 and the seat back frame 510, the cushion cut-out portions are stowed in a generally flush relationship with the rest of cushion 384 and the restraint harness 630 is stowed beneath the cushion portions 616, 617 as seen in the left side of the seat in FIG. 27 and the left side of the seat depicted in FIG. 29. It will be appreciated that portions of the restraint system 605 may also be received within the back panel 440, or that the thickness of the back panel may be modified as necessary and as within the ken of one skilled in the art. Those skilled in the art will realize that the cushion cut-out portions could be fashioned, stowed, and/or deployed in other suitable ways.

Figure 45:
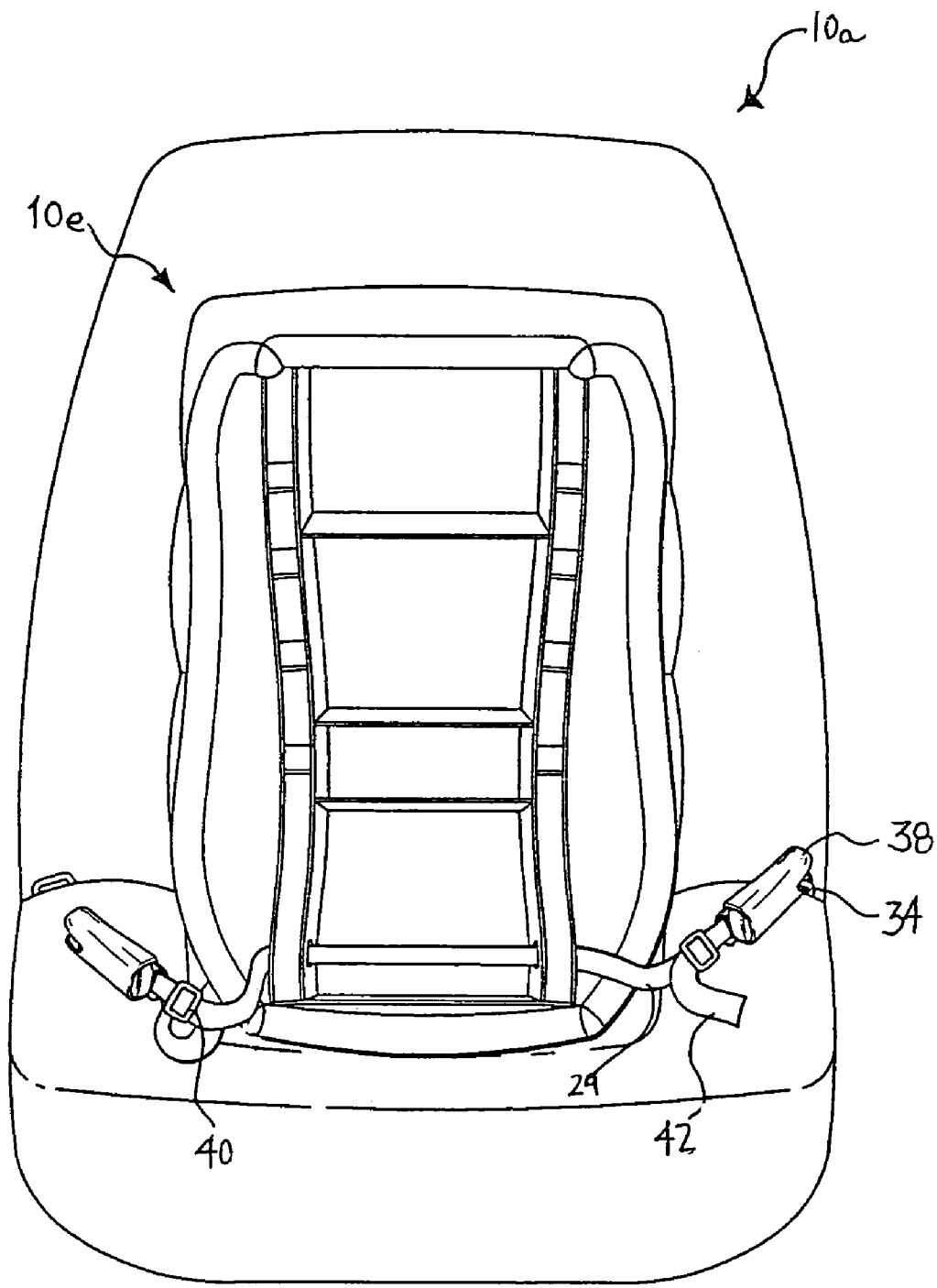
FIG. 45 is a front view of a vehicle seat having a child restraint seat mounted rearwardly thereon according to one embodiment of the present invention.

It will be appreciated that the seat base 613 may also be deployed and configured in a booster-seat mode to support an occupant for use with the vehicle's restraint system. In such a booster-seat configuration, the occupant, which may weigh in excess of about 40 pounds, would use the vehicle's restraint system, for example three-point restraint web 336, while harness 636 remains stowed behind the occupant. In addition, with the seat base 613 in the stowed position, an occupant may be supported on cushion 386 in a number of alternative ways. For example, an occupant may sit directly on cushion 386 and/or seat member 470 and use restraint web 336 (FIG. 17). In another configuration, an add-on child restraint system such as a booster seat or a portable child restraint seat may be supported on the seat portions 386, 470 (FIGS. 39, 40, 45), as is also the case with seat 500, with seat base 613 in the stowed position. The portable child restraint seat, which may have its own restraint system 460 (FIGS. 39–40), illustratively would be releasably coupled using one or more anchorages 32, 34, 136, 236, 670, 770, 870, 970, alone or in combination as described herein below, and would typically be for use with an occupant weighing less than about 55 pounds. It may be desirable to mount the portable child restraint seat 10e, as for example in the case where the child occupant weighs less than about 20 pounds, in a rear facing orientation such that the occupant faces in the direction opposite to the normal direction of travel of the vehicle (FIG. 45). Similarly, the add-on child restraint booster seat (not shown) would be for use with an occupant weighing less than about 55 pounds. In addition, an unrestricted booster seat (not shown) configured for use with an occupant weighing in excess of about 40 pounds may be supported on the seat portions 386, 470. In all events, whether the booster seat is configured as seat base 613, is configured as said add-on child restraint booster seat, or is configured as said unrestricted booster seat, the booster seat will be configured for use with the vehicle's restraint web 336. It will be appreciated that any combination of the above fall within the scope of the invention. For example, on a single seat 600, 700, a first occupant, for example a child, may be supported on seat base 613, a second occupant, for example an adult, may be supported directly on seat portions 386, 470, and a third occupant, for example an infant or another child, may be supported in an add-on child restraint system which in turn is supported on seat portions 386, 470. Illustratively, the add-on child restraint system may be a portable child seat for use with an infant or child, or it may be a booster seat for use with a child. As noted, a positioning harness could also be used in conjunction with the restraint harness 336.

A suitable retractor 692 illustratively is an ALR 1.5 Cable-Actuated Retractor available from Indiana Mills & Manufacturing, Inc. under part number A30952 and disclosed in U.S. Pat. No. 5,380,066. Such a retractor 692 is a positive locking retractor that must be released by a release mechanism. FIGS. 25 and 27 illustratively depict a release tab 696, which is attached to cable 693 which proceeds through back member 612 at aperture or housing 695 formed in the back member 612 and proceeds through bracket 694 downwardly to retractor 692 (FIG. 26). Pulling on tab 696 releases the retractor 692, allowing it to pay out web 642. A suitable release mechanism as just described, for example, includes a cable web-pull assembly available from Indiana Mills & Manufacturing, Inc. under part number A30954.

As just described, and as with system 500, seat restraint system 600 maintains the passive restraint characteristics of seat restraint system 400 and combines it with the active restraint characteristics offered by the harness 336, movable seat back frame 510 and integrated child restraint system 605. Those skilled in the art will appreciate that the integrated child restraint system 605 could be configured for use with the previously described systems 120, 220, 300. It further will be appreciated that the integrated child restraint system 605 is adaptable for use with a conventional seat or with vehicle seat restraint system 400. However, in such a system the restraint system 605 would have to be mounted on frame 410 or restraint member 440 and the passive energy management and restraint aspects required by FMVSS might be compromised. As with seat restraint system is 400, 500, the seat restraint system 600 preserves the under seat clearance for cleaning, maintenance and other vehicle features.

Referring to FIG. 29 another illustrative vehicle seat restraint system 700 is depicted. Seat 700 incorporates all of the structure and function of seat system 600. FIG. 29 also shows cushion bolsters 668, which may also be used with any of the seats 120, 220, 300, 400, 500, 600, 700 depicted and described herein. More specifically, vehicle seat restraint system 700 comprises the previously described frame assembly 410, mounting assemblies 430, 437, restraint member 440, seat member 470, passenger restraint cushion 383, center cushion 384, seat cushion 386, seat back frame 510, a pair of restraint web belts 336, a pair of height-adjuster guide belts 376 and associated height adjusters 58, and integrated child restraint system 605, all of which are constructed and operate in conjunction with vehicle seat 700 substantially as explained above with respect to vehicle seat restraint system 600. Accordingly, only those aspects of seat system 700 which differ from seat system 600 will now be described.

Seat 700 further comprises one or more upper anchorages or mount systems 32, 136, 236 and/or tether anchorages or mount systems 670, 770, 870, 970, alone or in combination. Illustratively, the upper anchorages 32, 136, 236 and tether mount systems or anchorages 670, 770, 870, 970 are mounted to the seat back frame 510 in order to maintain both the passive restraint characteristics of seat 400 and the active restraint characteristics offered by the harness 336, movable seat back frame 510 and the optional integrated child restraint system 605. The anchorages and mounts are also configurable for use with seats 120, 220, 300. It will be appreciated, that the upper anchorages and mounts further may be configured for use with seat 400 or for use with a conventional vehicle seat if retention of passive restraint characteristics is not desired.

The upper tether anchorage systems 670, 770, 870, 970 alter or redirect the direction of a web in substantially the same manner using either a loop of web 672 or a D-ring 680, or other suitable device. For example, the upper tether systems 670, 770, 810, 970 may receive a tether strap or web 27 (FIGS. 32 and 40) proceeding upwardly from a portable child restraint system or seat 10d and redirect the upward path of said strap 27 downwardly toward a lower anchorage 34 for coupling therewith in substantially the same manner as with web 171 shown in FIG. 29. In such a case, the lower anchorage 34 will transfer loads from the tether strap to the vehicle structure. It will be appreciated that the tether 27 could also be routed through an upper anchorage 32 and downwardly to the lower anchorage 34 for anchoring. In either case, the illustrative route is depicted in FIG. 29 in conjunction with a positioning harness 171 which will be discussed below.

Figure 30:
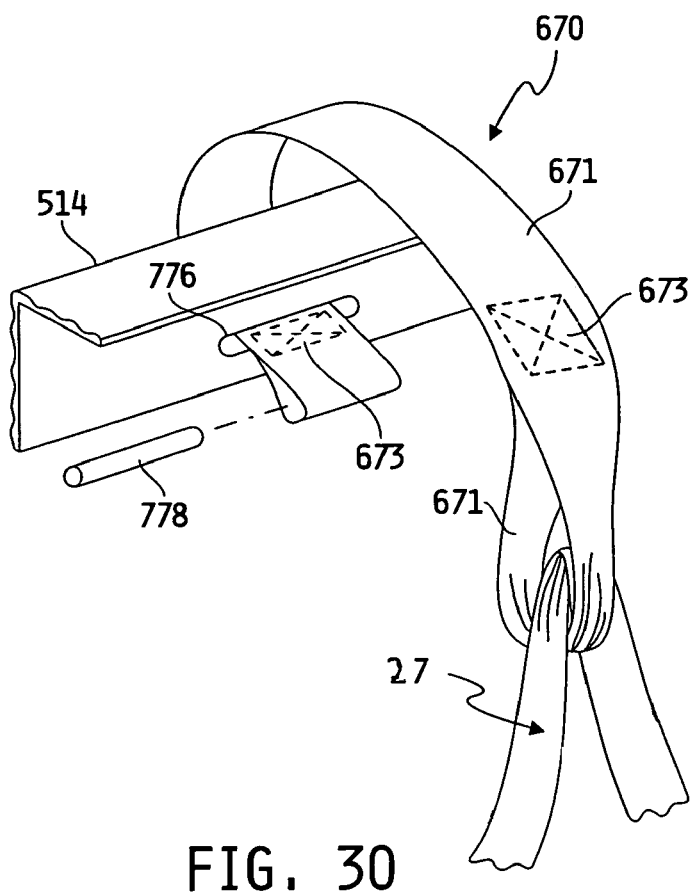
FIG. 30 is a perspective view of an illustrative web path-altering device.

The illustrative tether anchorage systems 670, 770, 870, 970 will now be described. Illustratively, upper tether system 670 comprises a length of web 671 formed into a routing loop 672 at one end by doubling one end of the web 671 back on, and coupling it to, itself as by, for example, stitching 673 (FIG. 30). The other end of the length of web 671 is mounted or attached by any suitable method to the seat back frame 510 thereby retaining the passive restraint characteristics of restraint system 400, 500, 600, 700. One illustrative method of mounting the tether system 670 is by stitching. For example, the other end of web 671 could have a loop formed by stitching (FIG. 30) and configured to receive a retaining member 778. The web 671 could be threaded through aperture 776 in top crossbar member 514 and then coupled thereto by inserting the retaining member 778 through the loop as depicted in FIG. 30. It will be appreciated that system 670 and each of the other illustrative tether mount systems 770, 870, 970, which will now be explained, may use other suitable mounting methods. It also will be appreciated that web 171 could be threaded through loop 671 in the same manner as tether 27 in FIG. 30, and in such a case, could be mounted to seat 700 as depicted in FIG. 29, or to other seats 500, 600 having upper anchorages.

Figure 31:
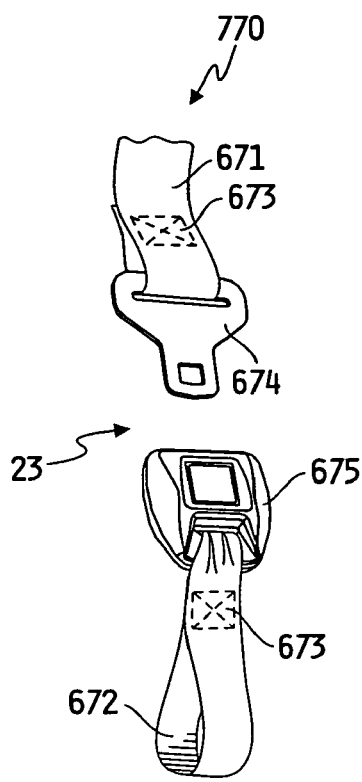
FIG. 31 is a perspective view of another illustrative web path-altering device.

In another illustrative embodiment, upper loop tether system 770 comprises a length of web 671 coupled at one end to a metal latch plate or tongue 674 (FIG. 31). The upper tether mount system 770 further comprises a buckle 675 and a web loop 672 coupled to said buckle 675 as by, for example, stitching 673. The tongue 674 and the buckle 675 are configured for releasable engagement with each other. The other end of the length of web 671 is attached to the seat back frame 510 by any suitable method, such as for example the already explained retaining member 778, thereby retaining the passive restraint characteristics of restraint system 400, 500, 600, 700. The tether 27 is routed through upper tether mount system 770 in the same manner as with tether system 670.

Figure 32:
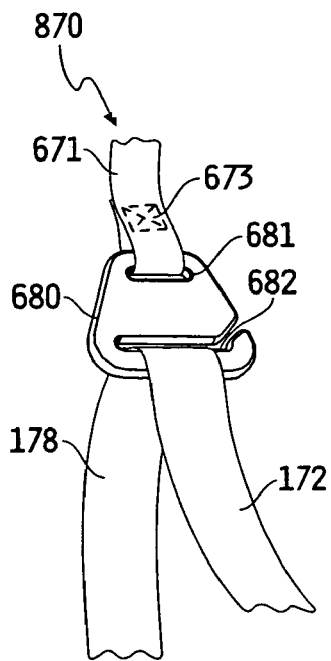
FIG. 32 is a perspective view of another illustrative web path-altering device.

Referring to FIG. 32, another illustrative upper tether anchorage system 870 comprises a length of web 671 coupled at one end to a metal D-ring 680. D-ring 680 is formed to include an open-ended web routing aperture 682 and a web mounting aperture 681, through which the web 671 is threaded and looped back on itself to couple the web 671 and D-ring 680 together by, for example, stitching 673. The web 171 or tether 27 is routed through the aperture 682 to direct its path downwardly for coupling with the lower anchorage 32. The other end of web 671 is mounted to seat back frame 510 by any suitable method, such as for example the already explained retaining member 778, thereby retaining the passive restraint characteristics of restraint system 400, 500, 600, 700.

Figure 33:
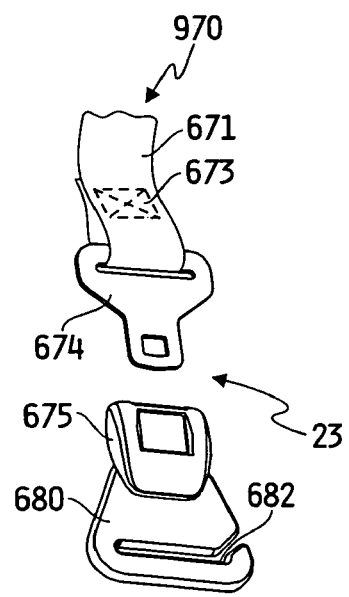
FIG. 33 is a perspective view of another illustrative web path-altering device.

Another illustrative embodiment is depicted in FIG. 33. Upper tether anchorage system 970 illustratively comprises a length of web 671 coupled at one end to a metal latch plate or tongue 674. The upper loop tether system 970 further comprises a metal D-ring 680 coupled to said buckle 675 as by, for example, rivets, it being appreciated that an intervening web (not shown) could couple the buckle 675 and the D-ring 680 together, as by, for example, stitching. D-ring 680 is formed to include an open-ended web routing aperture 682 through which a web, such as web 171 or tether 27 (FIG. 40), is routed in order to change the direction of any such web 27. The tongue 674 and the buckle 675 are configured for releasable engagement with each other. The other end of the length of web 671 is attached to the seat back frame 510 by any suitable method, such as for example stitching, thereby retaining the passive restraint characteristics of restraint system 400, 500, 600, 700.

It will be appreciated that the D-ring 682 may be made of any suitable metallic material, such as die-cast from zinc or stamped from steel, and that it may be overmolded with another material, such as plastic, to protect any web, such as tether 27 or the below explained web 171, from sharp edges. Alternatively, the D-ring 682 may be fashioned out of any suitable metallic, non-metallic or composite material or combination thereof. Each of the couplings and attachments mentioned above in conjunction with systems 670, 770, 870, 970 could be accomplished using not only the illustrative retaining member 778 already described, but also any suitable method including, for example, rivet, screw, nail, glue, stitching or melting.

Figure 39:
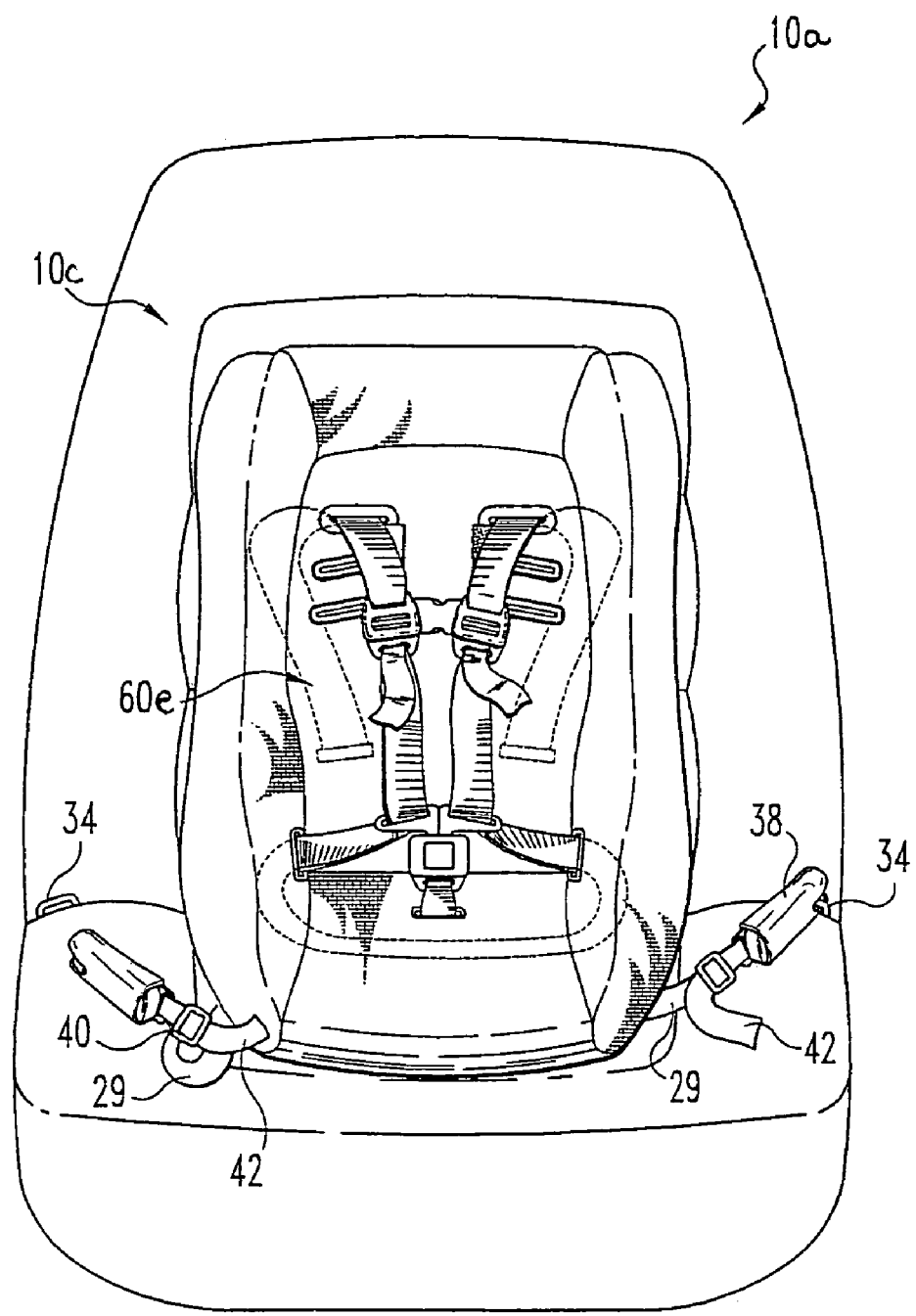
FIG. 39 is a front view of a child seat mounted to a vehicle seat incorporating one illustrative embodiment incorporating the present invention.
Figure 40:
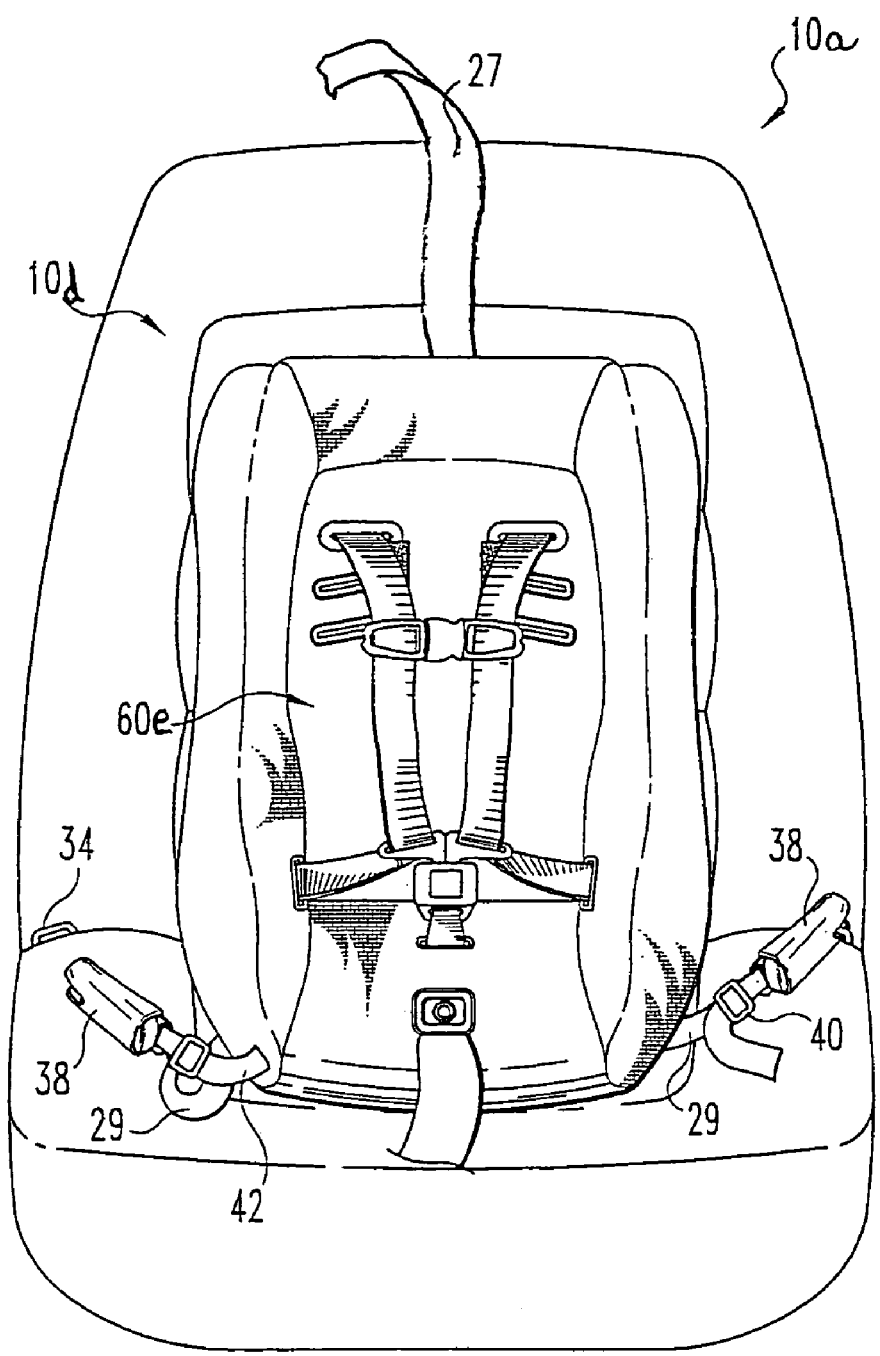
FIG. 40 is a front view of a child seat mounted to a vehicle seat incorporating one illustrative embodiment incorporating the present invention.

Referring now to FIGS. 39, 40, and 45, illustrative embodiments of add-on child restraint systems, illustratively portable child seats 10c, 10d and 10e, are depicted mounted to a vehicle seat 10a as described herein and as adaptable for use with any of systems 300, 400, 500, 600, 700. The portable child restraint seats 10c–10e illustratively include a child restraint anchorage system comprising the above mentioned upper tether strap 27 (FIG. 40) and two lower anchor straps 29. As just described, the upper tether mounts 670, 770, 870, 970 and anchorages 32 are configured for use with tether strap 27. Alternatively, the strap may be equipped with a connector assembly 38 as described herein to provide releasable engagement with an upper anchorage 32. In any event, tether strap 27 may be equipped with a mid-belt or integrated adjuster (not shown) to provide proper fit to the strap 27 in operational engagement. It will be appreciated that although rear facing seat 10e may have a tether strap 27, it typically is not used when the seat 10e is mounted in the rear facing orientation. Moreover, the tether strap need not be used in mounting any of the portable child seats 10c–10e, and likely will not be used when mounting to seat 400 in order to retain the passive restraint characteristics of seat 400. The mounting of the add-on child seats 10c–10e is completed by coupling the lower anchor straps with lower anchorages 34 as follows. The lower anchor straps 29 are attached, either fixedly or removably, to the seats 10c, 10d. The distal end of each strap 29 is configured with a connector assembly 38, which lockingly engages anchorages 34 to mount the portable seat 10c–10e to seat 10a or to any of systems 300, 400, 500, 600, 700. Web adjusters 40, which may be in-line mid-belt adjusters or adjusters integrated into connectors 38, are used to provide proper fit of straps 29 in operational engagement by, for example, decreasing the length of connecting straps 29 when adjustment portions 42 are pulled away from the adjusters 40 thereby firmly securing the seat 10c–10e to the seat 10a, 10b, 300, 400, 500, 600, 700.

Figure 44:
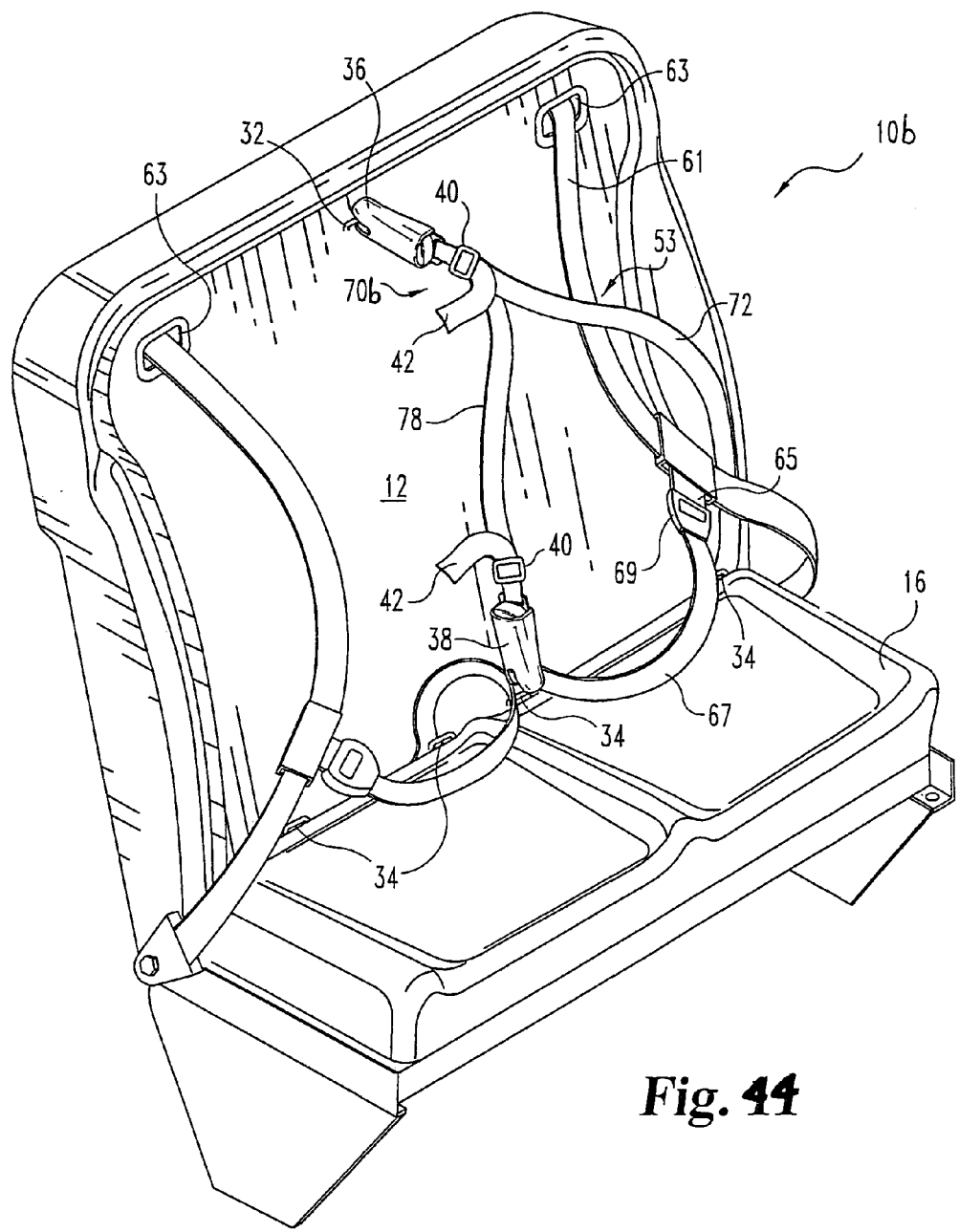
FIG. 44 is a perspective view of a vehicle seat incorporating one illustrative embodiment of a positioning harness system according to the present invention.

Thus, portable child seat 10c–10e may be mounted to any vehicle seat 10a, including the bus seat 10b depicted in FIG. 44 and any of seat systems 300, 400, 500, 600, 700 as just described. The restraint of the occupant of the portable child seat 10c–10e is provided by the restraint system 60d, 60e integral to the particular seat 10c, 10d and 10e (not shown). Also, either of the portable child seats 10c and 10d may be mounted in a rear-facing orientation as depicted with portable child seat 10e in FIG. 45. The rear facing mounting is typically for use with children weighing less than 20 pounds, and may be similarly mounted to the vehicle seat, but, as noted without using the upper tether 27.

Seat 700 may further comprise a harness positioning system 170 configured for mounting to seat 700 using any one of upper tether system mounts 670, 770, 870, 970 or anchorages 32, 136, 236. Positioning harness 170 comprises a length of web 171 having a chest or torso portion 172, a back portion 178, and opposite ends each coupled to a connector 38. The positioning harness 170 is releasably engaged or mounted on the seat as follows. The connector 38 coupled to one end of the web 171 is releasably engaged with the anchorage 34 distal from buckle 343. The web 171 then proceeds from said distal anchorage 34 upwardly and diagonally toward upper tether mount 870 (FIGS. 29, 32) or other illustrative upper tether system mount 670, 770, 970 (FIGS. 29–33) continuing therethrough and downwardly away therefrom continuing downwardly along the cushion 384 to the anchorage 34 proximal to buckle 343 where the connector 38 on the other end of web 171 is releasably engaged with said proximal anchorage 34. A height adjuster (not shown) similar to height adjuster 58 may be slidingly mounted to torso portion 172 and back portion 179. It will be appreciated that the connector 38 at either end of the web 171 may be engaged with its respective round bar or other anchorage 34 first, or that they may be connected at the same time.

Harness 170 is operationally engaged about a passenger (not shown) as follows. One end of web 171 is releasably engaged with the distal anchorage 34. The web 171 then proceeds upwardly over the torso of an occupant or passenger and through the upper tether system mount 670, 770, 870, 970 and downwardly away therefrom continuing downwardly behind the passenger to releasably engage the other connector 38 with the proximal anchorage 34. Then, the previously described three-point restraint web 336, or other conventional restraint web, is releasably engaged about the passenger, crossing over the positioning harness 170 generally at point 53. It will be appreciated, that the order of engagement and/or the crossing of the webs 171 and 336 may be reversed. For example, the illustrative positioning harness depicted in FIG. 37 and explained below shows a positioning harness 70b passing beneath the vehicle harness 61. When so engaged about a passenger, the positioning harness 170 will position a passenger for beneficial use of harness 336, and accordingly, the positioning harness 170 will not alter the previous descriptions of the use of the harness 336 in conjunction with the passive restraint of seat restraint system 400 or the combination passive and active restraint of seat restraint systems 500, 600. Those skilled in the art will further appreciate that a crotch belt could be added to web 336 as, for example, is shown and described in FIG. 38 below.

Web 171 and portable child restraint seats 10c, 10d may also be mounted to the vehicle seat using other suitable anchorage systems such as for example systems 136, 236. For example, referring to FIG. 34, connector 136, which comprises a snap hook or other connector configured to mount to a length of web 171, 27 either directly or through another length of web coupled with a web adjuster 31, may be used to couple web 171, 27 to an upper anchorage 32. Web portion 172 illustratively could be mounted through an adjuster 31 and extends therefrom downwardly behind a passenger or occupant (not shown) for coupling with anchorage 34 as described above. It will be appreciated that the connector 36 disclosed above could be configured for use as depicted with web 171 in FIG. 34 and used in substantially the same way with tether 27. Similarly, coupling assembly or connector 236 comprises a conventional tongue attached to the vehicle seat back frame 510, or other suitable frame or portion of a vehicle seat, and configured to releasably couple with a buckle attached to a length of web such as web 171, 27 either directly or through another length of web coupled with a web adjuster 31. Web portion 172 is threaded through adjuster 31 and extends therefrom downwardly behind an occupant (not shown) for coupling with anchorage 34 as described above. Coupling assembly 236 is also configurable for use with tether 27 described above. These connectors 136, 236 are configurable for use with vehicle restraint system seat 120, 220, 300, 400, 500, 600, 700, as well as the restraint systems 20*a*–*c* and alternative positioning harnesses 70*a*–*c* described below. Moreover, these connectors 136, 236 may be used in conjunction with upper tether mounts 670, 770, 870, 970. For example, the tongue of connector 236 could be attached, as by sewing, to web 671 of one of the upper tether mounts 670, 770, 870, 970. In such a case, a positioning harness, such as positioning harnesses 70*a*–70*c* described below, could be configured with a buckle to engage the tongue as described above, and a tether 27 could be configured for use with the tether mount.

As just described, and as with seat restraint systems 500, 600, seat restraint system 700, even with portable child restraint seats 10*c*–10*e*, harness positioning system 171, the below described harness positioning systems 70*a*–70*c*, or the below described harnesses 20*a*–20*c* attached, maintains the passive restraint characteristics of seat restraint system 400. Those skilled in the art will appreciate that the restraint system 700 could also be configured for use with the previously described systems 120, 220, 300. It further will be appreciated that the restraint system 170 is adaptable for use with a conventional seat. As with seat restraint systems 400, 500, 600 the seat restraint system 700 preserves the under seat clearance for cleaning, maintenance and other vehicle features.

It further will be appreciated that alternative harness positioning systems fall within the scope of this disclosure and may be configured either for use with upper loop tether systems 670, 770, 870, 970, or with alternative means of operative engagement with vehicle seats 120, 220, 300, 400, 500, 600, 700 such as the above mentioned alternative anchorages 32, 136, 236. For example, referring to FIGS. 36–38, and 44, additional illustrative embodiments of harness positioning systems 70*a*–70*c* for use with vehicle seats 10*a*, 10*b*, 120, 220, 300, 400, 500, 600, 700, and with any other conventional original equipment manufactured restraint systems are depicted. Vehicle seat 10*a* herein below represents a conventional vehicle-seat, or one-half or one-third respectively of a two-passenger or three-passenger seat, such as for example seats 120, 220, 300, 400, 500, 600, 700, and having a generally vertically extending back portion 12 and a generally horizontally extending seat portion 16. The illustrative embodiment depicted in FIG. 36 shows conventional restraint system 60*a* having a belt or web 61 including a chest portion 62 and a lap portion 64. Web 62 is fixedly secured at its proximal end (not shown) to seat 10*a*, which may be any conventional seat or any of the seats 300, 400, 500, 600, 700 described herein, and extends outwardly away from aperture 63 and downwardly away therefrom across the torso of the occupant (not shown). A conventional belt buckle tongue 65 is slidably coupled to web 62 and is lockingly engageable with seat belt buckle 69. Buckle 69, in turn, is attached by web 67 to seat 10*a*. Lap portion 64 of web 62 extends laterally away from tongue 65 and is fixedly secured at its distal end (not shown) to seat 10*a*. Thus, tongue 65 may lockingly engage buckle 69 thereby forcing the torso portion 62 across the shoulder and chest of the occupant residing on the seat and the lap portion 64 across the lap of the occupant. Restraint system 60*a* may be equipped with a belt retractor assembly (not shown) or with one or more web adjusters (not shown) configured to adjust the fit of the belt 61 on the occupant. Positioning system 70*a* comprises belt or web 72 extending from attachment point or anchor 73, which may be coupled, for example, to seat back frame 510, downwardly away and transversely across toward connector assembly 79. Connector 79 illustratively has an integrated web adjuster configured to adjust the length of web 72 by pulling on adjustment end or portion 42 to shorten the length. As shown, fixed attachment point 73 comprises a bracket bolted to the seat frame (not shown) and connector assembly 79 is a conventional tongue and buckle configuration; however, it will be recognized that any suitable configuration, such as shown in FIGS. 34–35, may be used. For example, attachment 73 and connection 79 may be configured to take advantage of an upper anchorage 32 cooperating with a connector 36, 136, 236. Restraint system 60*a* and positioning system 70*a* cross the occupant as generally indicated by point 53 in order to provide cooperating positioning and restraint to the occupant. It is equally acceptable for web 72 to cross over the top of web 61, or for web 61 to cross over the top of web 72.

Figure 37:
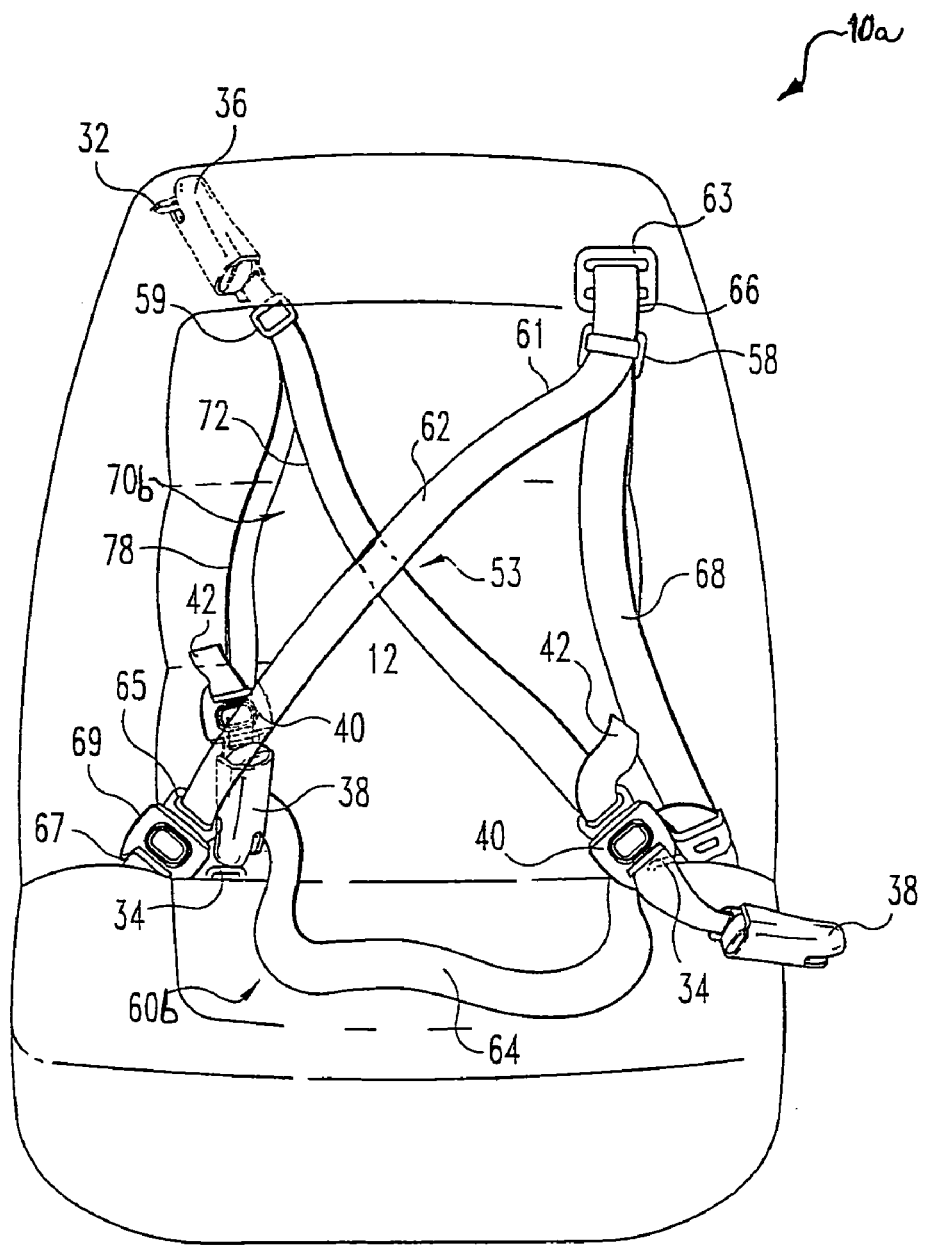
FIG. 37 is a front view of a seat having one illustrative embodiment of a supplemental restraint incorporating the present invention mounted thereto.

The illustrative embodiments depicted in FIGS. 37 and 44 are substantially similar to each other in operation and construction. The embodiment depicted in FIG. 37 shows the positioning system 70*b* configured on a seat 10*a* generic to any vehicle in general or on a seat 10*a* representing a half or a third of a two-or three-passenger seat, such as vehicle seats 300, 400, 500, 600, 700. The embodiment depicted in FIG. 44 shows more specifically the positioning harness system 70*b* specifically adapted to a two-passenger seat 10*b*, as for example, any vehicle seat 300, 400, 500, 600, 700 disclosed in this application Referring to FIGS. 37 and 44 reveals a conventional restraint system 60*b* having a belt or web 61 including a chest portion 62 and a lap portion 64. Web 62 is fixedly secured at its proximal end (not shown) to seat 10*a* and extends outwardly away from aperture 63 and downwardly away therefrom across the torso of the wearer. A conventional belt buckle tongue 65 is slidably coupled to web 62 and is lockingly engageable with seat belt buckle 69. Buckle 69, in turn, is attached by web 67 to seat 10*a*. Lap portion 64 of web 62 extends laterally away from tongue 65 and is fixedly secured at its distal end (not shown) to seat 10*a*. Thus, tongue 65 may lockingly engage buckle 69 thereby forcing the torso portion 62 across the shoulder and chest of the occupant residing on the seat and the lap portion 64 across the lap of the occupant. Restraint system 60*b* may be equipped with a belt retractor assembly (not shown) or with one or more web adjusters (not shown) configured to adjust the fit of the belt 61 on the occupant. Restraint harness 60*b* further includes a height guide web or belt 68 extending from aperture 66 downwardly toward the bight of the seat, where belt 68 is fixedly attached to, for example, the frame of seat 10*a*. Slidably mounted to belts 61 and 58 is height adjuster 58. Height adjuster 58 is configured to associate belts 61 and 68 and slides up and down their length to adjust the position of the belts 61 and 68 on the wearer's shoulder. When properly configured on a wearer, web portion 62 falls over the wearer's chest and web 68 falls over the wearer's back.

Seat 10*a* is depicted with a pair of spaced apart anchorages 34 which illustratively are rigid members or D-ring anchorages 34 mounted in the bight of the seat 10*a* between the back 12 and seat 16 portions. As noted, anchorages 34 may conform to FMVSS 225. Also depicted are upper anchorages 32, which may also serve as an upper tether anchorage or redirection member that receives and redirects toward a lower anchorage 34 a tether strap or web 27. Positioning system 70a comprises belt or web 72 having opposing ends. Upper opposing end is attached to three-bar slide 59 and lower opposing end is attached to connector assembly 38. Web 72 extends downwardly away from slide 59 transversely across back portion 12 to anchorage 34, which is releasably engaged by connector 38. Slide 59 is slidably coupled to height guide web or belt 78, and slidably associates webs 72 and 78. Web 78 has opposing ends having connector assemblies 36 and 38 attached respectively thereto. Connector assembly 38 releasably engages anchor point 32, and connector assembly 38 releasably engages anchorage 34. Web 78 extends downwardly from anchor point 32 longitudinally downward toward anchorage 34. The illustrative embodiment of FIG. 37 depicts each connector 38 in the unengaged position, and the illustrative embodiment of FIG. 44 depicts the connector 38 of web 78 in the unengaged position. Connectors 36 and 38 may have an integrated web adjuster (not shown) or may have an in-line adjuster 40 configured to adjust the lengths of web 72 and 78 by pulling on adjustment portion 42 to shorten the length of web 72 and 78. When properly configured on a wearer, web portion 72 falls over the wearer's chest and web 78 falls down the wearer's back. Restraint system 60a and positioning system 70a cross the occupant as generally indicated by location 53 in order to provide cooperating support and restraint to the occupant. When properly configured on the wearer, belts 62 and 72 will fall over the wearer's chest, and belts 68 and 78 will fall down the wearer's back, with height adjuster 58 and slide 59 being positioned near to the wearer's shoulders, thereby forming a four-point restraint. It will be appreciated that restraint system 70b, in whole or in part, may either underlie or overlie restraint system 60b and vice versa.

Figure 38:
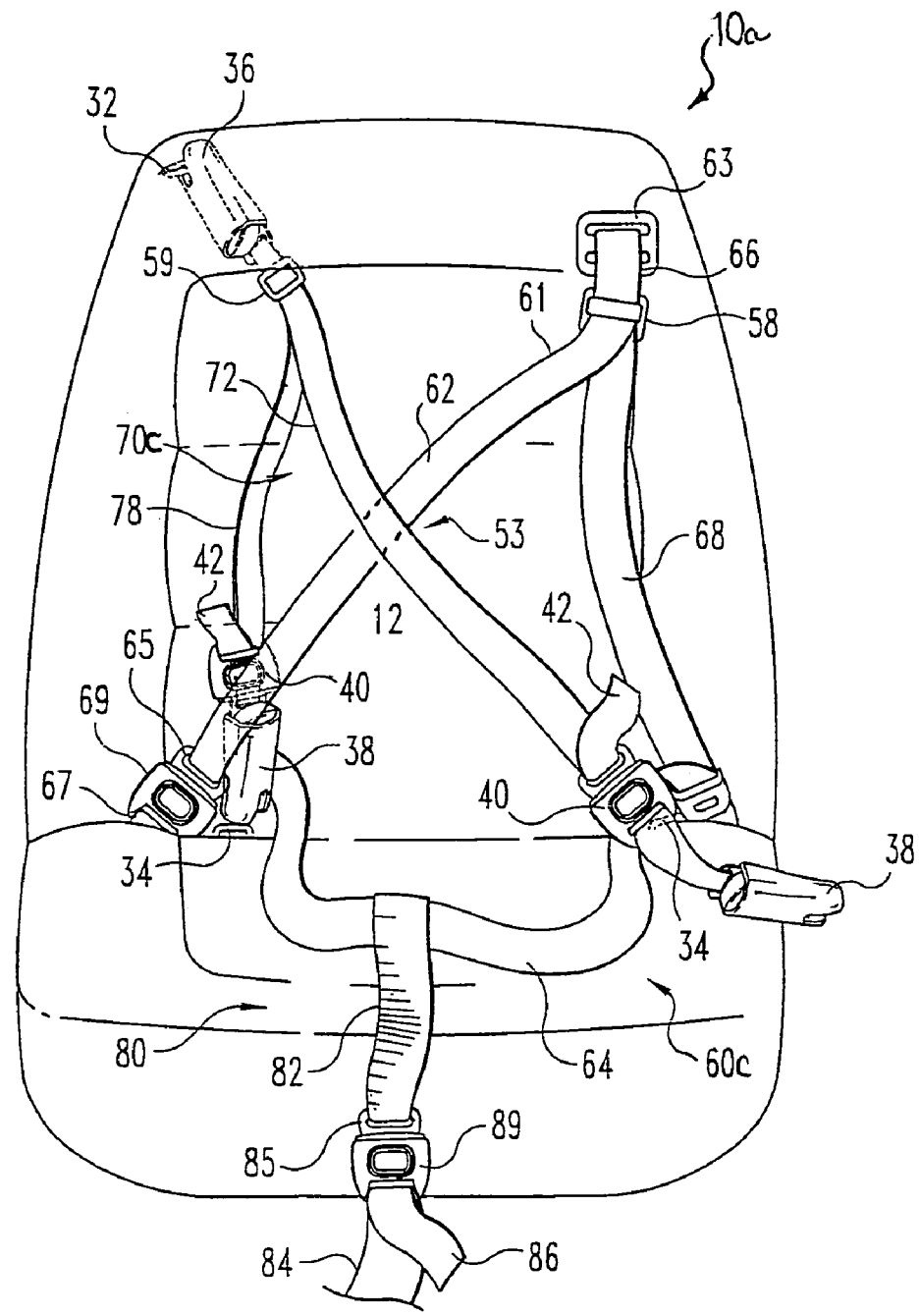
FIG. 38 is a front view of a seat having one illustrative embodiment of a supplemental restraint incorporating the present invention mounted thereto.

Referring to FIG. 38, another illustrative embodiment is depicted. Harness positioning system 70c is substantially similar in operation to positioning system 70b described and depicted in FIGS. 37 and 44. Restraint system 70c, further comprises a crotch assembly 80 having a crotch belt 82 slidably disposed on lap belt or portion 64 and extending longitudinally downwardly therefrom to tongue 85, which is fixedly connected to the distal end of belt 82. Tongue 85 is lockingly engageable with belt buckle 89, which, in turn, is attached (not shown) by web 84 to seat 10a. Web 84 may also be attached to the vehicle's floor, the child's seat, or other suitable anchor point. Web 82 lies between the wearer's legs, and has its length, or fit on the wearer, adjusted by pulling on web portion 86. Crotch assembly 80 cooperates with the previously described restraint assemblies 60c and 70c to form a five-point restraint system suitable for use with wearers weighing less than about fifty pounds. This positioning harness system 70c could also be adapted for use on any vehicle, including the school bus seat 10b depicted in FIG. 44, or vehicle seats 300, 400, 500, 600, 700. Also, any of the other herein described four-point restraint systems 70a, 70b, 170 may be configured as a five-point system by adding the crotch assembly 80 thereto.

Illustratively, web 72 of the harness positioning systems 70b, 70c (FIGS. 37, 38, 44) has a fully extended length measured from the slide 59 to the lower adjuster 40 of between about 35 to 45 inches, and typically about 40 inches. The length of web 78 from the connector 36 down to the web adjuster 40 is between about 20 to 25 inches, and typically about 23 inches fully extended. The length between the web adjusters 40 and the connectors 38 on both webs 78, 72 is in a range from about two to five inches, and typically about three inches. It will be appreciated that other suitable lengths may be used. As noted each of the harness positioning systems 171, 70a–c, may be operably mounted over or under the vehicle's restraint harness as best seen with positioning harness 70b depicted mounted under the vehicle harness 61 in FIG. 37 and over the vehicle harness 61 in FIG. 44.

Figure 41:
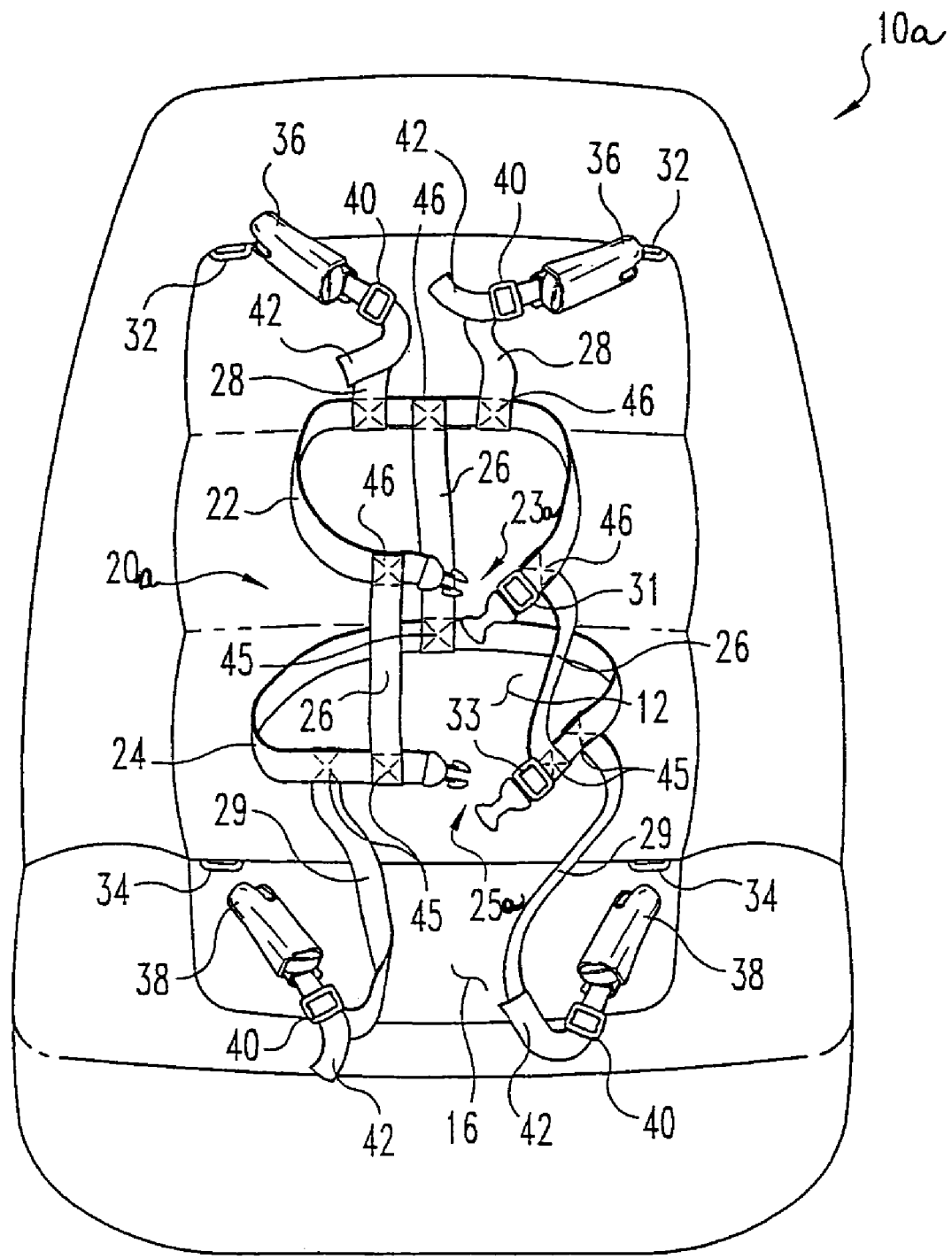
FIG. 41 is a front view of a seat having one illustrative embodiment of a restraint harness incorporating the present invention mounted thereto.

Referring to FIG. 41, an illustrative embodiment of another harness positioning system 20a in accordance with the present invention is depicted. The illustrative system 20a is configured for use with a vehicle seat 10a having a generally vertically extending back portion 12 and a generally horizontally extending seat portion 16 and is adaptable for use with any of systems 300, 400, 500, 600, 700. Positioning harness 20a comprises a pair of spaced apart body straps or web belts 22 and 24, which extend around the body of a wearer of the harness 20a. Upper body strap 22 and lower body strap 24 are generally parallel one to the other and with the seat portion 16. Generally vertically extending and spaced apart connecting straps 26 connect upper strap 22 with lower strap 24. The connecting straps 26 are generally parallel to each other and are generally perpendicular to body straps 22 and 24 and to seat 16. While three connecting straps 26 are shown, alternative embodiments, for example FIG. 42, may use a fewer or a greater number of connecting straps. Similarly, a harness 20a equipped with more than two body straps falls within the scope of the invention. Connecting straps 26 are attached to body strap 24 at attachment points 45 and extend longitudinally upwardly away therefrom to attachment points 46 on body strap 22. Each body strap 22 and 24 is equipped with a connector assembly 23a and 25a, which is located at the front of the restraint harness 20a, and which is used to secure the opposing ends of respective straps 22 and 24 together in order to mount the harness 20a to the wearer. The connector assembly 23a and 25a may also be located at the back (23b and 25b in FIG. 42) or on the side of the body strap 22 and 24. Body straps 22 and 24 each further includes a web adjuster 31 slidably mounted to straps 22 and 24 and configured to adjust the fit of the harness 20a on the wearer. Web adjusters 31 and 33 may be included as a part of the respective connector assembly 23a and 25a, or may be mid-belt web adjusters separate from the respective connector assembly 23a and 25a. Although not shown, it will be appreciated that connecting straps 26 may also be equipped with web adjusters adapted to adjust the vertical spacing between body straps 22 and 24 in order to further adjust the harness 20a to fit the wearer as known to those skilled in the art.

A pair of spaced apart upper anchor straps 28 are attached to upper body strap 22 at connection points 46 and extend upwardly away therefrom. A pair of spaced apart lower anchor straps 29 are attached to lower body strap 24 at connection points 45 and extend generally downwardly away therefrom. Each anchor strap 28 and 29 has at its end distal from the respective body strap 22 and 24 a coupling mechanism 36 and 38 for releasably mounting the harness 20a to the seat 10a.

Connectors 36 and 38 releasably and lockingly engage anchorages 32 and 34 to mount the restraint system 20a to the seat 10. Each anchor strap 28 and 29 also includes a web adjuster 40 either slidably mounted to the strap 28 and 29 as a mid-belt adjuster, as shown, or integrated into the connector 36 and 38. In operation, each adjustment end or portion 42 of each connector strap 28 and 29 is pulled away from the adjuster 40 in order to reduce the operable length of the connector strap 28 and 29. The upper portions of straps 28 may be configured to fall over the shoulders of the wearer, or under the arms.

Figure 42:
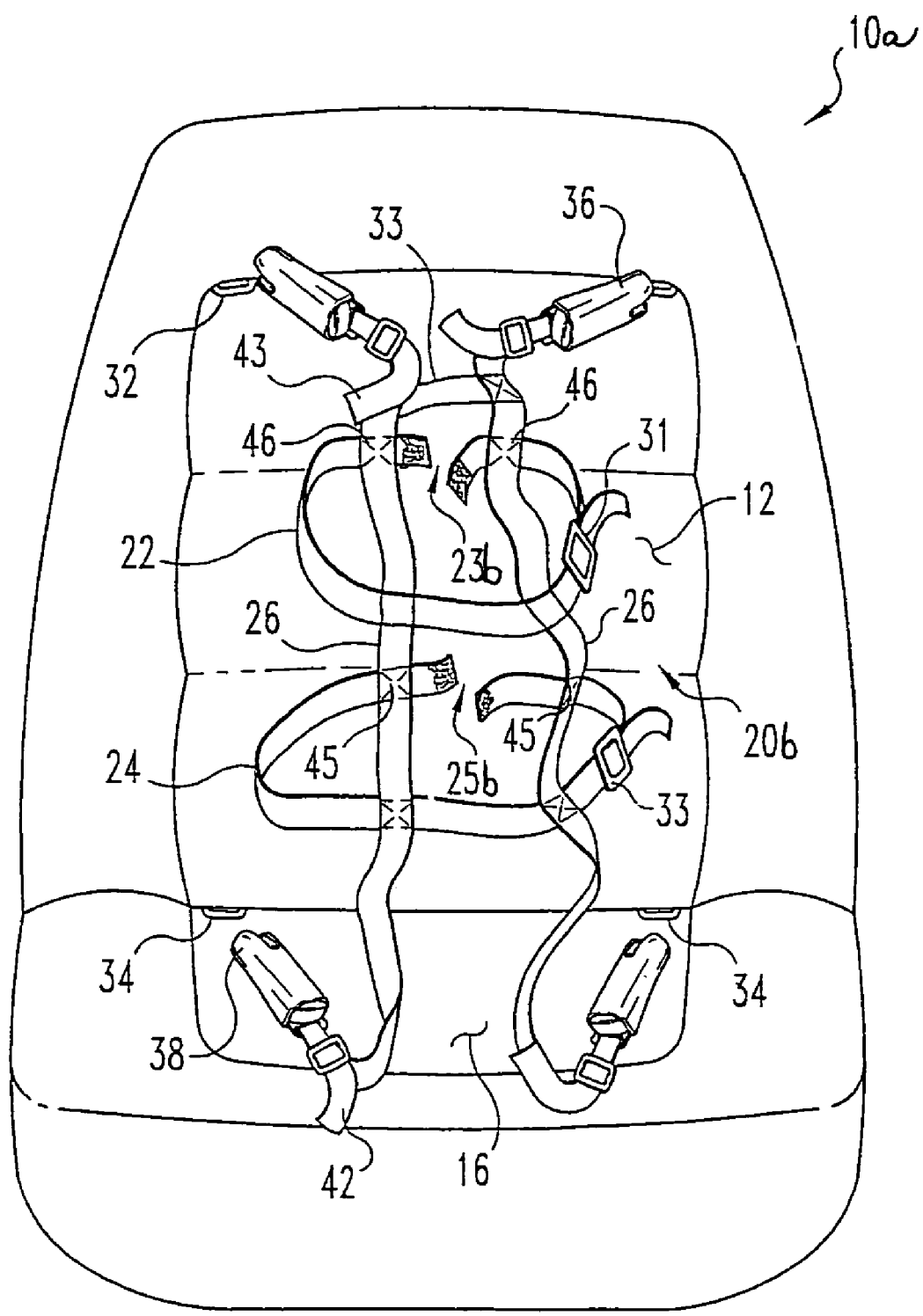
FIG. 42 is a front view of a seat having one illustrative embodiment of a restraint harness incorporating the present invention mounted thereto.

Referring now to FIG. 42, another illustrative embodiment of a harness positioning system is depicted. Positioning harness 20b is operably substantially similar to harness 20a. The illustrative positioning system 20b is configured for use with a vehicle seat 10a as described above having a generally vertically extending back portion 12 and a generally horizontally extending seat portion 16 and is adaptable for use with any of systems 300, 400, 500, 600, 700. Restraint harness 20b comprises a pair of spaced apart body straps or web belts 22 and 24, which extend around the body of a wearer of the harness 20b. Upper body strap 22 and lower body strap 24 are generally parallel one to the other and with the seat portion 16. Generally vertically extending and spaced apart connecting straps 26 connect upper strap 22 with lower strap 24. The connecting straps 26 are generally parallel to each other and are generally perpendicular to body straps 22 and 24 and to seat 16. While two connecting straps 26 are shown, alternative embodiments may use a greater number of connecting straps. If additional straps 26 are used in this restraint harness, however, they may or may not extend past the body straps 22 and 24. A harness 20b equipped with more than two body straps similarly falls within the scope of the invention. Connecting straps 26 are attached to body strap 24 at attachment points 45 and extend longitudinally upwardly away therefrom to attachment points 46 on body strap 22. Connecting straps 26 continue upwardly from attachment points 46 and downwardly from attachment points 45. Mounted to each opposing end of each connecting strap 26 is a connector 36, 38 configured to lockingly engage corresponding anchorage 32, 34. Each body strap 22 and 24 is also equipped with a connector assembly 23b and 25b, which is located at the back of the restraint harness 20b proximate to back portion 12, and which is used to secure the opposing ends of respective straps 22 and 24 together in order to mount the harness 20b to the wearer. Each connector assembly 23b and 25b may also be located at the front (FIG. 41) or on the side of the body strap 22 and 24. Body straps 22 and 24 each further includes a web adjuster 31 slidably mounted to straps 22 and 24 and configured to adjust the fit of the harness 20b on the wearer. Web adjusters 131 and 133 may be included as a part of the respective connector assembly 23b and 25b or may be mid-belt web adjusters separate from the respective connector assembly 23b and 25b. Although not shown, it will be appreciated that connecting straps 26 may also be equipped with web adjusters adapted to adjust the vertical spacing between body straps 22 and 24 in order to further adjust the harness 20b to fit the wearer. In such cases, body straps 22 and 24 would be slidably mounted to straps 26 as opposed to fixedly mounted as by stitching. Harness 20b further includes a generally horizontal strap 33 extending laterally between and attached to connecting straps 26. The upper portions of straps 26 may be configured to fall over the shoulders of the wearer, or under the arms.

Figure 43:
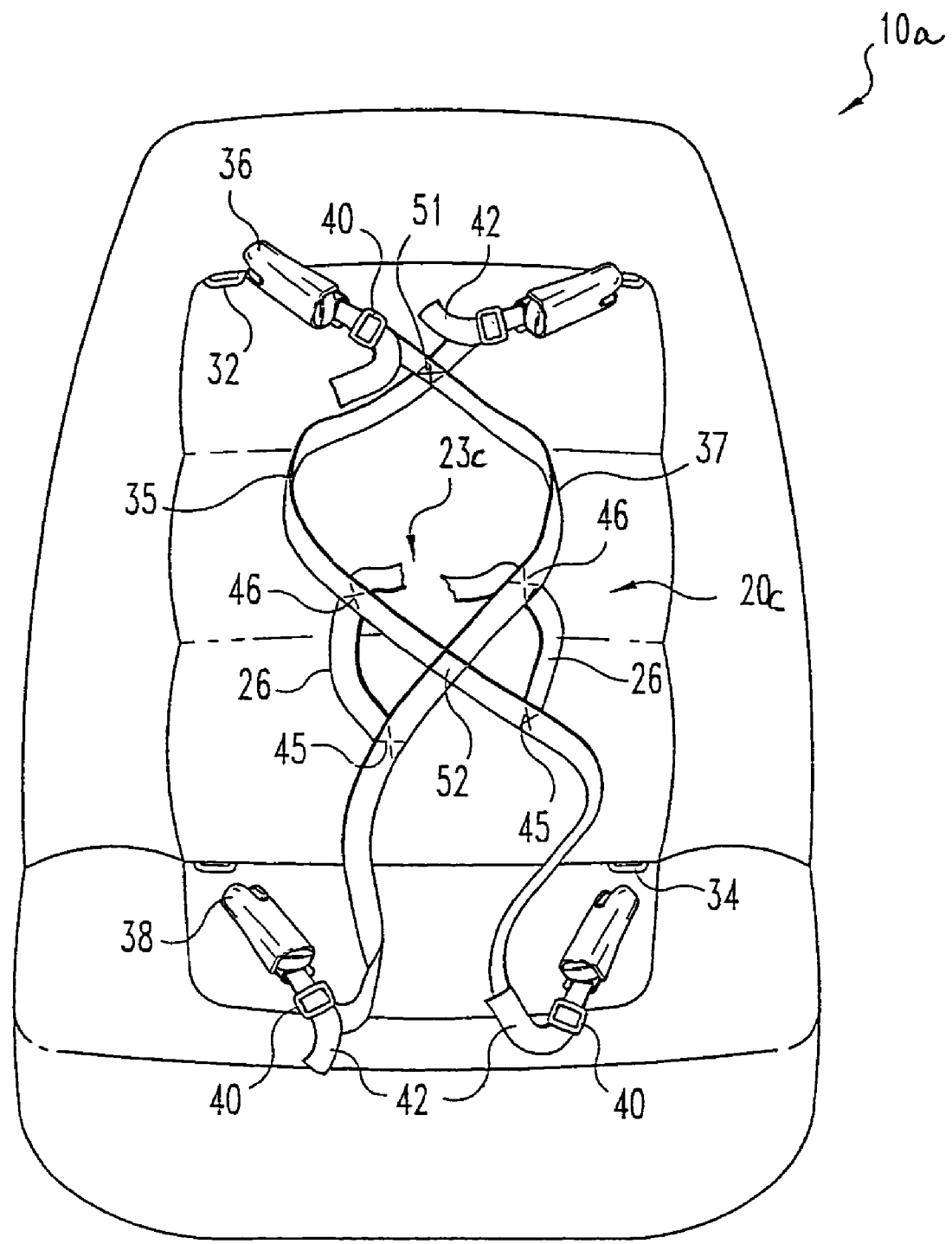
FIG. 43 is a front view of a seat having one illustrative embodiment of a restraint harness incorporating the present invention mounted thereto.

Referring to FIG. 43, another illustrative embodiment of a harness positioning system 20c is depicted. The illustrative positioning system 20c is configured for use with a vehicle seat 10a as described above having a generally vertically extending back portion 12 and a generally horizontally extending seat portion 16 and is adaptable for use with any of systems 300, 400, 500, 600, 700. Restraint harness 20c comprises a pair of continuous body straps or web belts 35 and 37, which extend around the body of a wearer of the harness 20c. Each opposing end of each Strap 35 and 37 is equipped with coupling mechanisms or connectors 36 and 38 which are lockingly engageable with anchorage 32 and 34. Strap 35 crosses and is connected to strap 37 at upper location 51 and lower location 52. In addition, straps 35 and 37 are connected at points 45 and 46 by generally longitudinally extending connecting straps 26. Each body strap 35 and 37 is also equipped with a connector assembly 23c, which is used to secure the straps 35 and 37 together in order to mount the harness 20b to the wearer. Body straps 35 and 37 each include web adjusters 40 slidably mounted to straps 35 and 37 or integrated with connector assemblies 36 and 38 and configured to adjust the fit of the harness 20b on the wearer. Although not shown, it will be appreciated that connecting straps 26 may also be equipped with web adjusters adapted to adjust the vertical spacing between body straps 35 and 37 in order to further adjust the harness 20b to fit the wearer. In such cases, body straps 35 and 37 would be slidably coupled to straps 26 as opposed to fixedly mounted as by the depicted stitching 45 and 46. The upper portions of straps 30 and 31 may be configured to fall over the shoulders of the wearer, or under the arms.

Referring to FIGS. 41–43, the straps 22, 24, 26, 28, 29, 35 and 37 are connected at the respective connection points 45, 46, 51 and 52 using stitching. One skilled in the art will appreciate, however, that alternate connections may be used. For example, hook and loop, rivets, zippers, glue, staples, melting or other suitable connecting structures may be used. Similarly, although the connector assembly (23a, 25a) depicted in the illustrative embodiment of FIG. 41 is a standard quick disconnect connector, other connectors, such as, for example, hook and loop (FIGS. 42, 43), snaps, tongue and buckle, zippers, clamp, or other suitable coupling structures may be used. So too, alternative connectors may be used, such as for example, the mini-connector 36, 38 depicted in FIGS. 41–43 and described herein above, snap hooks (FIG. 34), tongue and buckle (FIG. 35), upper tether mounts 770, 970 (FIGS. 31, 33), or even some type of fixed attachment such as rivets, bolts, brackets and the like (FIG. 36). Moreover, a combination of different types of connectors may be used. For example, the mini-connector depicted in FIG. 41 may be used for the lower attachments and a snap hook or permanent attachment may be used for the upper attachments. The harnesses 20a, 20b, 20c, 70a, 70b, 70c, 170 may be mounted to a car seat, a boat seat, an airplane seat, a van seat, a bus seat, or the seat 10a of any other vehicle. Finally, although not shown, harnesses 20a, 20b, 20c may be equipped with separate conventional shoulder webs or straps such as restraint 60a–60c.

As noted, FIGS. 34 and 35 depict alternative connector assemblies 136 and 236 for use with either anchor point 32 or 38 of the illustrative embodiments described and shown in FIGS. 41–43. Similarly, connector assemblies 36, 38, 136, and 236 are adaptable for use with the above described harness positioning systems 70a (FIG. 36), 70b (FIGS. 37 and 44), and 70c (FIG. 38), and with the restraint systems described above and depicted in FIGS. 42, 43, 45. In addition, each of the harnesses positioning systems 171, 70a–70c, 20a–20c upper tether systems 670, 770, 870, 970, and portable child restraint seats 10c–10d described herein are configurable for use with any of the seat systems 120, 220, 300, 400, 500, 600, 700 described herein. It further will be appreciated that any of the seats 300, 500, 600, 700 are compatible for use with an add-on child restraint system booster seat (not shown) including any backless child restraint system or belt-positioning seat as those terms are defined by FMVSS 213, typically for use with children weighing less than about 50 pounds and an unrestricted booster seat typically for use with children ranging in size from about 40 to 80 pounds or more.

An example of a suitable web adjuster 31, 33, 40 described herein for use with any of the above systems illustratively may be of the kind disclosed in commonly owned U.S. patent application Ser. No. 10/206,660 filed by Woodard et al. on Jul. 26, 2002, the disclosure of which is no expressly incorporated herein by reference. An example of a suitable connector 36, 38 described herein for use with any of the above systems illustratively may be of the kind disclosed in commonly owned U.S. patent application Ser. No. 10/206,603 filed by Wiseman et al. on Jul. 26, 2002, which is now expressly incorporated herein by reference. Any other suitable conventional connector may be used as well.

The interchangeability of the components of the illustrative embodiments described herein will be appreciated by those skilled in the art. It will also be appreciated that the anchorages 32 and 34 may be removable or integral to the vehicle seat, and that the restraint systems mounted thereto and described and depicted herein may also be either removable or integral to the vehicle seat.

The above described systems are configurable for use in any number of vehicles including mini-vans, mini-buses, and school buses, and in various seat sizes. For example, the seats 300, 400, 500, 600, 700 illustratively may be about 40 to 50 inches high, and typically will be about 44 inches high from the floor to the top of the cushion 383. The width of the seats 300, 400, 500, 600, 700 may range from about 20 to about 45 inches with typical embodiments being about 30 inches, 34 inches, 36 inches, and 45 inches wide. The depth of the seats from the top of the cushion 383 to the front of the seat cushion 386 ranges from about 23 to 30 inches. A typical embodiment will be about 27 inches deep. Illustratively, the floor mount module 430 is about 8 to 14 inches high, and is typically about 11 inches high. The height of the seat cushion 386 from the floor may be about 15 to 25 inches and it typically about 20 inches.

Thus, it is seen that the modular nature of the above described restraint systems 20a–c, 70a–c, 300, 400, 500, 600, 700, allows for fashioning a number of optional combinations and permutations in both dimensions and restraint systems. The following examples illustrate some, but not all of the possible combinations and permutations that fall within the scope of the disclosure, such examples are not intended to be limiting. For example, each vehicle restraint system 300, 400, 500, 600, 700 could come in a 30 inch, a 33 inch and a 36 inch wide version. Vehicle seat restraint system 400 could then add one or more pairs of anchorages 34 to frame 410 so that add-on child restraint systems such as portable child seats 10c, 10d (FIGS. 39, 40, 45) could be added, even while retaining the passive restraint characteristics of seat 400. So too, a restraint harness 336, 60a–60c, could be added to seat restraint system 400, and then upper tether mounts 670, 770, 870, 970 configured to accommodate any of the positioning harnesses 170, 70a–70c, 20a–20c, albeit perhaps at the diminished functioning of the passive restraint characteristics of seat 400.

Similarly, vehicle seat restraint system 500 may be configured: (1) with one restraint harness; (2) with two restraint harnesses; (3) with a three-passenger seat having two restraint harnesses 336, 60a–60c and/or two pairs of anchorages 34; (4) with two restraint harnesses and two anchorages 34 for mounting an add-on child restraint system such as a portable child seat 10c, 10d (FIGS. 39, 40, 45) or a booster seat; (5) two restraint harnesses, two pairs of anchorages 34, and two upper tether mounts 670, 770, 870, 970 alone or in combination with two anchorages 32, 136, 236 configured to mount up to two positioning harnesses 170, 70a–70c, 20a–20c, and/or up to two add-on child restraint systems such as portable child seats 10c, 10d (FIGS. 39, 40, 45) or two booster seats; and (6) two restraint harnesses, two pairs of anchorages 34, and one or more integrated child restraint systems 605, which would be substantially equivalent to vehicle seat restraint system 600 depicted in FIG. 27. Vehicle restraint system 600, in turn, illustratively could be equipped with upper tether mounts configured to mount up to two positioning harnesses 170, 70a–70c, 20a–20c, and/or up to two add-on child restraint systems such as child restraint seats 10c, 10d (FIGS. 39, 40, 45) or booster seats, which would be substantially equivalent to vehicle seat restraint system 700 depicted in FIG. 29, which comprises movable frame 510, two passenger restraint harnesses 336, 60a–60c, one or two integrated child restraint systems 605, one or two booster seats (not shown), one or two pairs of lower anchors 34 configured to mount one or two add-on child restraint systems such as portable child seats 10c, 10d (FIGS. 39, 40, 45), one or two upper tether mounts 670, 770, 870, 970 configured to mount, in conjunction with the lower anchorages 34, one or two positioning harnesses 170, 70a–70c, 20a–20c, and/or up to two portable child restraint seats 10c, 10d. In addition, each of the just mentioned examples may further vary by cushion and upholstery type, connectors, construction material, vehicle mounting means, and the like as has been described herein above and as would be apparent to one skilled in the art. Finally, any of the above examples may further be configured for use with a child booster seat using the anchorages 34 and the restraint harness 336. These, examples are meant to be illustrative rather than limiting in nature. It will be appreciated that the modular nature of the illustrative embodiments also allows for the above combinations and permutations to be configured and deconfigured by changing components in and out as needed without the need to replace an entire seat.

While the invention has been illustrated and described in detail in the drawings and foregoing description, the same is to be considered as illustrative and not restrictive in character, it being understood that all changes and modifications that come within the spirit of the invention are desired to be protected.

What is claimed is:

1. A vehicle seat comprising:
    a frame rigidly mounted to a vehicle, the frame supporting a seat member and a seat back, the seat back including a stationary seat back member rigidly mounted to the frame and a seat back frame member movably mounted to the frame, the seat back frame member configured to move relative to the frame in a direction away from the stationary seat back member;
    a seat base movably mounted to said seat back frame member adjacent said seat member, said seat base movable downwardly toward said seat member to form a child seat; and
    a restraint harness affixed to said seat base and to said seat back frame member, said restraint harness maintaining an occupant of said child seat secured to said seat base and to said seat back frame member.

2. The vehicle seat of claim 1 wherein said restraint harness is a multiple-point harness restraining system.

3. The vehicle seat of claim 1 further including a transverse bar affixed to opposite ends of said seat back frame member, said transverse bar supporting said restraint harness between said seat back frame member and said seat base.

4. The vehicle seat of claim 1 further including a cushion affixed to said seat base.

5. A vehicle seat comprising:
   a frame defining a seat support surface, said frame configured for mounting to a frame support structure of a vehicle;
   first and second posts extending away from said seat support surface of said frame adjacent opposite ends thereof;
   a seat member mounted to said seat support surface of said frame;
   a panel mounted to said first and second posts and defining a seat back, said panel having a front surface adjacent said seat member;
   a seat back frame member movably attached to said frame adjacent said opposite ends thereof; and
   a seat base movably mounted to said seat back frame adjacent said seat member, said seat base movable downwardly toward said seat member to form a child seat;
   wherein said seat back frame member and said seat base are movable away from said front surface of said panel toward said seat member in response to a rapid deceleration of the vehicle.

6. The vehicle seat of claim 5 wherein said seat member is formed of a lightweight plastic material.

7. The vehicle seat of claim 6 wherein said light weight plastic material defines therein a number of recesses configured to impart rigidity to selected regions of said seat member.

8. The vehicle seat of claim 5 wherein said panel is deformable to absorb energy resulting from an impact therewith.

9. The vehicle seat of claim 8 wherein said first and second posts are deformable to absorb energy resulting from an impact with said panel.

10. The vehicle seat of claim 9 wherein first and second posts and said panel are together sufficiently deformable to satisfy a predefined deformability standard.

11. The vehicle seat of claim 9 wherein said panel defines first and second channels adjacent opposite edges thereof, said first and second posts received within said first and second channels respectively.

12. The vehicle seat of claim 5 wherein said panel is formed of a lightweight plastic material.

13. The vehicle seat of claim 12 wherein said light weight plastic material defines therein a number of recesses and grooves configured to impart rigidity to selected regions of said panel.

14. The vehicle seat of claim 5 further including a first restraint harness affixed to said seat base and to said seat back frame member, said first restraint harness maintaining a first occupant of said child seat secured to said seat base and to said seat back frame member upon impact of the vehicle.

15. The vehicle seat of claim 14 wherein said first restraint harness is a multiple-point harness restraining system.

16. The vehicle seat of claim 14 further including a transverse bar affixed to opposite ends of said seat back frame member, said transverse bar supporting said first restraint harness between said seat back frame member and said seat base.

17. The vehicle seat of claim 14 further including a cushion affixed to said seat base.

18. The vehicle seat of claim 14 wherein said first occupant weighs between about 20 and 50 pounds.

19. The vehicle seat of claim 14 further comprising a second restraint harness affixed to said frame and to said seat back member.

20. A vehicle seat comprising:
   a frame rigidly mounted to a vehicle, the frame supporting a seat bottom and a seat back, the seat back including a first seat back member movably mounted to the frame and a second seat back member fixedly mounted to the frame, the second seat back member having a front surface extending upwardly away from the seat bottom and configured to receive the first seat back member; and
   a seat base movably mounted to the first seat back member, the seat base movable between a stowed position with the seat base received by the first seat back member adjacent to the front surface of the second seat back member and a seating position with the seat base moved away from the stowed position toward the seat bottom to form a child seat, the vehicle seat configured to receive a first occupant supported by the seat bottom when the seat base is in the stowed position, and to receive a second occupant supported by the seat base when the seat base is in the seating position.

21. The vehicle seat of claim 20 wherein the second occupant weighs between about 20 and 50 pounds.

22. The vehicle seat of claim 21 wherein the first occupant weighs greater than about 50 pounds.

23. The vehicle seat of claim 20 further including a first restraint harness configured to restrain the first occupant in the vehicle seat.

24. The vehicle seat of claim 23 wherein the first restraint harness comprises a restraining web having a first end mounted to either of the frame and the vehicle and a second end, and a buckle member mounted to either of the frame and the vehicle, the second end of the web configured for releasable engagement with the buckle member to releasably restrain the first occupant in the vehicle seat.

25. The vehicle seat of claim 23 further including a second restraint harness configured to restrain the second occupant in the seat base.

26. The vehicle seat of claim 25 wherein the second restraint harness is affixed to said seat base and to the first seat back member, the second restraint harness configured to releasably restrain the second occupant in the seat base.

27. The vehicle seat of claim 26 further including a transverse bar affixed to opposite ends of the first seat back member, the transverse bar supporting the second restraint harness between the first seat back member and the seat base.

28. The vehicle seat of claim 25 wherein the second restraint harness is positioned between the seat base and the front surface of the second seat back member when the seat base is in the stowed position.

29. The vehicle seat of claim 20 wherein the vehicle seat defines a first occupant location configured for occupation by only the first occupant, and a second occupant location beside the first occupant location, the seat base positioned relative to the vehicle seat to move to the seating position over the second occupant location, the second occupant location thereby configured for occupation by the first occupant when the seat base is in the stowed position, and by the second occupant when the seat base is in the seating position.

30. The vehicle seat of claim 29 further including a first restraint harness configured to restrain the first occupant in the first occupant location.

31. The vehicle seat of claim 30 wherein the first restraint harness comprises a restraining web having a first end mounted to either of the frame and the vehicle and a second end, and a buckle member mounted to either of the frame and the vehicle, the second end of the web configured for releasable engagement with the buckle member to releasably restrain the first occupant in the first occupant location.

32. The vehicle seat of claim 30 further including a second restraint harness configured to restrain the first occupant in the second occupant location.

33. The vehicle seat of claim 32 wherein the second restraint harness comprises a restraining web having a first end mounted to either of the frame and the vehicle and a second end, and a buckle member mounted to either of the frame and the vehicle, the second end of the web configured for releasable engagement with the buckle member to releasably restrain the first occupant in the second occupant location.

34. The vehicle seat of claim 32 further including a third restraint harness configured to restrain the second occupant in the seat base when the seat base is in the seating position over the second occupant location.

35. The vehicle seat of claim 34 wherein the third restraint harness is affixed to said seat base and to the first seat back member, the third restraint harness configured to releasably restrain the second occupant in the seat base.

36. The vehicle seat of claim 35 further including a transverse bar affixed to opposite ends of said first seat back member, said transverse bar supporting said third restraint harness between said first seat back member and said seat base.

37. The vehicle seat of claim 34 wherein the third restraint harness is positioned between the seat base and the front surface of the second seat back member when the seat base is in the stowed position.

38. The vehicle seat of claim 20 wherein the vehicle seat defines first and second side-by-side occupant locations,
and wherein a first seat base is positioned relative to the vehicle seat to move to the seating position over the first occupant location, the first occupant location thereby configured for occupation by the first occupant when the first seat base is in the stowed position and by the second occupant when the first seat base is in the seating position over the first seating location,
and wherein a second seat base is positioned relative to the vehicle seat to move to the seating position over the second occupant location, the second occupant location thereby configured for occupation by the first occupant when the second seat base is in the stowed position and by the second occupant when the second seat base is in the seating position over the second occupant location.

39. The vehicle seat of claim 38 further including a first restraint harness configured to restrain the first occupant in the first occupant location.

40. The vehicle seat of claim 39 wherein the first restraint harness comprises a restraining web having a first end mounted to either of the frame and the vehicle and a second end, and a buckle member mounted to either of the frame and the vehicle, the second end of the web configured for releasable engagement with the buckle member to releasably restrain the first occupant in the first occupant location.

41. The vehicle seat of claim 39 further including a second restraint harness configured to restrain the second occupant in the first seat base when the first seat base is in the seating position over the first occupant location.

42. The vehicle seat of claim 41 wherein the second restraint harness is affixed to said first seat base and to the first seat back member, the second restraint harness configured to releasably restrain the second occupant in the first seat base.

43. The vehicle seat of claim 42 further including a transverse bar affixed to opposite ends of said first seat back member, said transverse bar supporting said second restraint harness between said first seat back member and said seat base.

44. The vehicle seat of claim 41 wherein the second restraint harness is positioned between the first seat base and the front surface of the second seat back member when the first seat base is in the stowed position.

45. The vehicle seat of claim 41 further including a third restraint harness configured to restrain the first occupant in the second occupant location.

46. The vehicle seat of claim 45 wherein the third restraint harness comprises a restraining web having a first end mounted to either of the frame and the vehicle and a second end, and a buckle member mounted to either of the frame and the vehicle, the second end of the web configured for releasable engagement with the buckle member to releasably restrain the first occupant in the second occupant location.

47. The vehicle seat of claim 45 further including a fourth restraint harness configured to restrain the second occupant in the second seat base when the second seat base is in the seating position over the second occupant location.

48. The vehicle seat of claim 47 wherein the fourth restraint harness is affixed to said second seat base and to the first seat back member, the fourth restraint harness configured to releasably restrain the second occupant in the second seat base.

49. The vehicle seat of claim 48 further including a transverse bar affixed to opposite ends of said first seat back member, said transverse bar supporting said fourth restraint harness between said first seat back member and said seat base.

50. The vehicle seat of claim 47 wherein the fourth restraint harness is positioned between the second seat base and the front surface of the second seat back member when the second seat base is in the stowed position.

51. The vehicle seat of claim 20 further including a restraint harness configured to restrain either of the first occupant in the vehicle seat and the second occupant in the seat base.

52. The vehicle seat of claim 51 wherein the seat base acts as a booster seat with the second occupant weighing more than about 40 pounds and the first occupant weighing more than about 50 pounds.

* * * * *